(12) United States Patent
Miyajima

(10) Patent No.: US 7,515,354 B2
(45) Date of Patent: Apr. 7, 2009

(54) ZOOMS LENS SYSTEM AND ELECTRONIC IMAGE PICKUP APPARATUS USING THE SAME

(75) Inventor: Toru Miyajima, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/985,530

(22) Filed: Nov. 14, 2007

(65) Prior Publication Data
US 2008/0112062 A1 May 15, 2008

(30) Foreign Application Priority Data
Nov. 15, 2006 (JP) .............................. 2006-309658

(51) Int. Cl.
*G02B 15/14* (2006.01)

(52) U.S. Cl. ................. 359/690; 359/683; 359/684; 359/685; 359/716; 359/740; 359/785

(58) Field of Classification Search ......... 359/683–685, 359/690, 716, 740, 785
See application file for complete search history.

(56) References Cited

U.S. PATENT DOCUMENTS 5,061,053 A * 10/1991 Hirakawa ................... 359/690

6,721,105 B2 4/2004 Ohtake et al.
6,975,461 B2 12/2005 Eguchi

FOREIGN PATENT DOCUMENTS

JP 2003-177317 6/2003
JP 2003-315676 11/2003

* cited by examiner

*Primary Examiner*—Evelyn A. Lester
(74) *Attorney, Agent, or Firm*—Kenyon & Kenyon LLP

(57) ABSTRACT

A zoom lens system includes, in order from an object side, a first lens unit G1 having a positive refracting power, a second lens unit G2 having a negative refracting power, a third lens unit G3 having a positive refracting power, and a fourth lens unit G4 having a positive refracting power, and at the time of zooming from a wide angle end to a telephoto end, a space between the lens units changes, and the first lens unit includes two lenses namely, a negative lens and a positive lens, and satisfies the following conditional expression $$-0.75 < SF_{1p} < -0.1 \quad (1)$$

where, $SF_{1p}$ is defined as $SF_{1p}=(R_{1pf}+R_{1pr})/(R_{1pf}-R_{1pr})$, when $R_{1pf}$ is a paraxial radius of curvature of a surface on the object side, of the positive lens in the first lens unit, and $R_{1pr}$ is a paraxial radius of curvature of a surface on an image side, of the positive lens in the first lens unit.

60 Claims, 23 Drawing Sheets

ZOOMS LENS SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2006-309658 filed on Nov. 15, 2006; the entire contents of which are incorporated herein by reference.

BACKGROUND OF THE INVENTION

1. Field of the Invention

The present invention relates to a zoom lens system and an electronic image pickup apparatus using the same, and particularly to an electronic image pickup apparatus such as a video camera and a digital camera.

2. Description of the Related Art

In recent years, replacing a silver-salt film camera, a digital camera in which an object is photographed by using an electronic image pickup element such as a CCD (Charge Coupled Device) and a CMOS (Complementary Metal Oxide Semiconductor) has become a mainstream. Furthermore, there are several categories of digital cameras in a wide range, from high-function type for professional use to a compact popular type.

A user of the popular type digital camera seeks to enjoy photography anywhere at any time with a wide range of scenes. In light of this, a small size camera, particularly a slim digital camera which can be accommodated easily in a pocket of clothes or a bag, and carried conveniently has been preferred. On the other hand, while a magnification ratio of about 3 for a digital camera of a compact type has been common, a camera of a higher magnification ratio than the conventional one for widening a photography area has been sought.

On the other hand, since a thickness of a camera is determined by a size of a lens barrel, for achieving a slimming of the camera, slimming of the lens barrel is effective.

Recently, a so-called collapsible barrel in which, when the camera is in use, the lens barrel is pushed out from a camera body, and is used while carrying the camera while not in use has been generally used. Therefore, taking into consideration the slimming of the lens barrel when collapsed, a zoom lens has been sought.

A compact zoom lens system in which a comparatively high magnification ratio is secured by forming a type, including in order from an object side, a first lens unit having a positive refracting power, a second lens unit having a negative refracting power, a third lens unit having a positive refracting power, and a fourth lens unit having a positive refractive power, and the first lens unit is formed by one or two lenses has been known in Japanese Patent Laid-open Publication No. 2003-315676.

In the zoom lens system disclosed in Japanese Patent Application Laid-open Publication No. 2003-315676, an idea has been devised to decrease a thickness of the first lens unit by decreasing the number of lenses in the first lens unit. Particularly, since a height from an optical axis of off-axis rays is increased in the first lens unit, when an attempt is made to secure a necessary amount of an edge thickness of a lens, an axial edge thickness tends to increase remarkably. Furthermore, when the number of lenses in the first lens unit increases, since a position of entrance pupil incidence becomes distant as viewed from the object side, the height of the off-axis rays passing through the first lens unit increases more and more, and the longitudinal thickness for securing the edge thickness is required to be even more. As a matter of course, the longitudinal thickness is increased in accordance with an increase in the number of lenses.

Consequently, with the increase in the number of lenses, a size in a radial direction and the longitudinal thickness of this unit is increased to be more than required, and even in the collapsed state, the lens barrel cannot be made sufficiently compact. From this viewpoint, letting the structure such that the first lens unit is made of a large number of lenses is preferable for an object of making the (lens) barrel compact.

SUMMARY OF THE INVENTION

According to the first inventions, there is provided a zoom lens system at one side surface including, in order from an object side a first lens unit having a positive refracting power,
a second lens unit having a negative refracting power,
a third lens unit having a positive refracting power, and
at a time of zooming from a wide angle end to a telephoto end, a space between the lens-unit changes, and
the first lens unit includes a negative lens and a positive lens, and the total number of lenses in the first lens unit is two, and
the zoom lens system satisfies the following conditional Expression $$-0.75 < SF_{1p} < -0.1 \quad (1)$$

where, $SF_{1p}$ is defined as $SF_{1p} = (R_{1pf} + R_{1pr})/(R_{1pf} - R_{1pr})$, when $R_{1pf}$ is a paraxial radius of curvature of a surface on an object side, of the positive lens in the first lens unit, and $R_{1pr}$ is a paraxial radius of curvature of a surface on an image side, of the positive lens in the first lens unit.

Moreover, according the present invention, there is provided on the other side surface, an electronic image pickup apparatus including the above mentioned zoom lens system, and
an electronic image pickup element which is disposed at an image side of the zoom lens system, and which converts an image formed by the zoom lens system, to an electric signal.

BRIEF DESCRIPTION OF THE DRAWINGS

FIG. 1A shows a state at a wide angle end, FIG. 1B shows an intermediate state, and FIG. 1C shows a state at a telephoto end;

FIG. 10A shows a state at the wide angle end, FIG. 10B shows an intermediate state, and FIG. 10C shows a state at the telephoto end;

DETAILED DESCRIPTION OF THE INVENTION

Figure 1A:
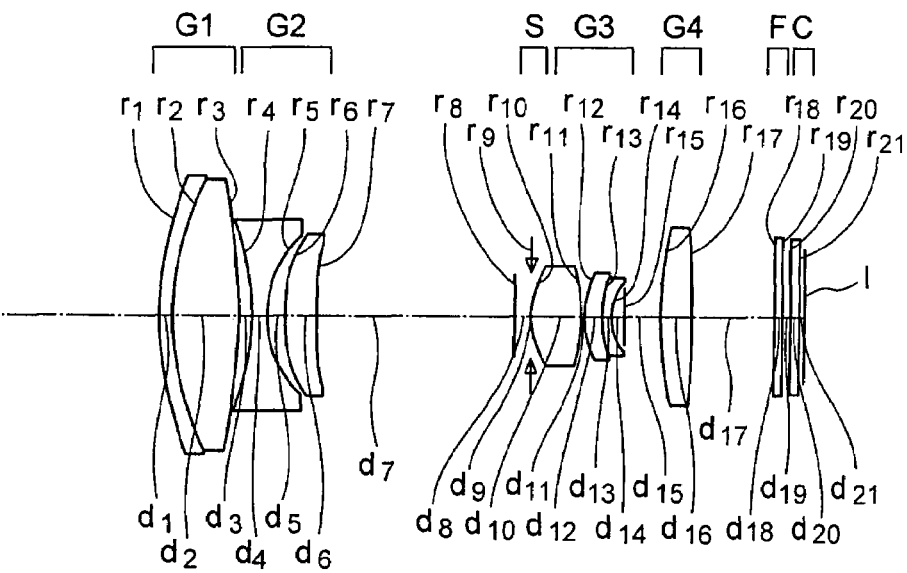
FIG. 1A, FIG. 1B, and FIG. 1C are cross-sectional views along an optical axis showing an optical arrangement at a time of an infinite object focusing according to a first embodiment of a zoom lens system of the present invention, where.

The zoom lens system according to the present invention includes, in order from an object side, a first lens unit having a positive refracting power, a second lens unit having a negative refracting power, and a third lens unit having a positive refracting power, and at a time of zooming from a wide angle end to a telephoto end, a space between the lens unit changes, and the first lens unit is made of two lenses namely a negative lens and a positive lens, and the zoom lens system satisfies the following conditional expression.

$$-0.75 < SF_{1p} < -0.1 \quad (1)$$

where, $SF_{1p}$ is defined as $SF_{1p}=(R_{1pf}+R_{1pr})/(R_{1pf}-R_{1pr})$, when $R_{1pf}$ is a paraxial radius of curvature of a surface on an object side, of the positive lens in the first lens unit, and $R_{1pr}$ is a paraxial radius of curvature of a surface on an image side, of the positive lens in the first lens unit.

It is preferable that the zoom lens system includes, in order from the object side, the first lens unit, the second lens unit, the third lens unit, and a fourth lens unit having a positive refracting power.

A reason for and an effect of having the abovementioned arrangement in the zoom lens system will be described below. For easing securing of the magnification ratio in the present invention, an arrangement which includes, in order from the object side, the first lens unit having a positive refracting power, the second lens unit having a negative refracting power, and the third lens unit having a positive refracting power, and in which the zooming is carried out by changing a space between the lens units has been adapted. By making such an arrangement, an optical system has been made compact, preventing an increase in an amount of movement of each unit while suppressing a fluctuation in aberration at the time of zooming by effectively dividing a load of zooming on each unit.

The first lens unit is structured to be formed of two lenses, namely the negative lens and the positive lens, in order that this arrangement is advantageous for making compact the barrel in the collapsed form. By forming the first lens unit by the two lenses, namely the negative lens and the positive lens, it is possible to decrease a thickness of the unit, and to make small an outer diameter.

The reason for making the structure compact is as follows. Since a height from the optical axis of the off-axis rays becomes high in the first lens unit, when an attempt is made to secure a required amount of edge thickness of a lens, a longitudinal thickness is susceptible to increase remarkably. When the number of lenses in the first lens unit increases, since an entrance pupil position is far when viewed from the object side, the height of the off-axis rays passing through the first lens unit becomes increasingly higher, and the longitudinal thickness for securing the edge thickness is required to be even more. Naturally, the amount of increase in the number of lenses increases the longitudinal thickness.

Consequently, with an increase in the number of lenses, the size in the direction of diameter of the lens unit and the longitudinal thickness is increased to be more than necessary, and even when the lens is let to be in the collapsed state, the lens barrel cannot be made sufficiently compact. From this viewpoint, letting the first lens unit to be formed by less number of lenses, in other words, two lenses, contributes substantially to making the lens barrel compact.

Moreover, to achieve compactness and high zooming, the first lens unit is required to have a substantial positive refracting power, and for correcting in balanced manner at both surfaces of the positive lens, an aberration which has occurred, particularly, an off-axis aberration which is susceptible to occur at a wide angle side, and a spherical aberration which is susceptible to occur at a telephoto side when the zooming ratio is let to be high, it is preferable to let a biconvex shape which satisfies conditional expression (1).

Making an arrangement such that an upper limit in the conditional expression (1) is not surpassed is advantageous for correction of an aberration such as an image-plane curvature which occurs at a lens-image side surface.

On the other hand, making an arrangement such that a lower limit in the conditional expression (1) is not surpassed is advantageous for correction of a spherical aberration at the telephoto end, and for making the zooming ratio high. Moreover, position of principal points of the first lens unit is suppressed from being at the object side, and distance between principal points of the first lens unit and the second lens unit at the wide angle end is susceptible to be closer, and it is easy to decrease the height of light rays even when the desired image angle is secured. Consequently, even when the edge thickness of the lens in the first lens unit is secured, longitudinal thickness can be decreased, which is advantageous for making the size small.

It is more preferable that the zoom lens system satisfies the following conditional expression.

$$-0.50 < SF_{1p} < 0.11 \tag{1'}$$

It is even more preferable that the zoom lens system satisfies the following conditional expression.

$$-0.35 < SF_{1p} < -0.13 \tag{1''}$$

By satisfying the conditional expressions (1') and (1"), it is possible to have the abovementioned effect.

Moreover, it is preferable that the zoom lens system includes, in order from the object side, a first lens unit having a positive refracting power, a second lens unit having a negative refracting power, and a third lens unit having a positive refracting power, and at a time of zooming from a wide angle end to a telephoto end, a space between the lens units changes, and the first lens unit includes two lenses namely a negative lens and a positive lens, and the zoom lens system satisfies the following conditional expression.

$$38.0 < v_{d1p} - v_{d1n} \tag{2}$$

where, $v_{d1p}$ denotes an Abbe's number for a d-line of the positive lens in the first lens unit, and $v_{d1n}$ denotes an Abbe's number for a d-line of the negative lens in the first lens unit.

Further, it is preferable that the zoom lens system includes, in order from the object side, the first lens unit, the second lens unit, the third lens unit, and a fourth lens unit having a positive refracting power.

A reason for and an effect of having the abovementioned arrangement in the zoom lens system will be described below. The conditional expression (2) is related to a correction of a longitudinal chromatic aberration, and a correction of an off-axis chromatic aberration of magnification. For correcting favorably in the unit, the chromatic aberration which occurs due to substantial positive power of the first lens unit, it is preferable to use a material having a low chromatic dispersibility for the positive lens, and a material having a high chromatic dispersibility for the negative lens. Concretely, it is preferable that the conditional expression (2) which regulates a difference between an Abbe's number for the two lenses.

Making an arrangement such that a lower limit in the conditional expression (2) is not surpassed is advantageous for achieving a favorable correction of the chromatic aberration, and securing the zooming ratio.

It is more preferable that the zoom lens system satisfies the following conditional expression.

$$47.0 < v_{d1p} - v_{d1n} \tag{2'}$$

It is even more preferable that the zoom lens system satisfies the following conditional expression.

$$58.0 < v_{d1p} - v_{d1n} \tag{2''}$$

By satisfying the conditional expressions (2') and (2"), it is possible to show further the abovementioned effect.

Moreover, it is preferable that the zoom lens system satisfies the following conditional expression.

$$38.0 < v_{d1p} - v_{d1n} \tag{2}$$

where, $v_{d1p}$ denotes an Abbe's number for a d-line of the positive lens in the first lens unit, and $v_{d1n}$ denotes an Abbe's number for a d-line of the negative lens in the first lens unit.

Accordingly, it is advantageous for making the zoom lens system small, and it is possible to provide a zoom lens system in which, a fluctuation in the spherical aberration can be easily suppressed even when the magnification ratio is increased. Moreover, it is advantageous for making the zoom lens system small, and it is possible to provide a zoom lens system in which a fluctuation in the chromatic aberration can be easily suppressed even when the magnification ratio is increased.

For improving the compactness and the high magnification ratio, and securing the optical performance, it is preferable to make the following arrangement in addition to the abovementioned arrangement.

It is preferable that the zoom lens system satisfies the following conditional expression for the (refracting) power of the first lens unit.

$$0.40 < f_1/f_t < 0.90 \tag{3}$$

where, $f_1$ denotes a focal length of the first lens unit, and $f_t$ denotes a focal length of the entire zoom lens system at a telephoto end.

Making an arrangement such that an upper limit in the conditional expression (3) is not surpassed is advantageous for compactness of the lens barrel by suppressing a change in an overall length of the entire zoom lens system. Moreover, a zooming load on the second lens unit can be secured easily, and it is advantageous for the compactness and the reduction in aberration in the second lens unit.

By making an arrangement such that a lower limit in the conditional expression (3) is not surpassed, the power of the first lens unit is suppressed, an occurrence of the spherical aberration and a comatic aberration at the telephoto end is suppressed, and it is easy to secure a favorable optical performance.

It is more preferable that the zoom lens system satisfies the following conditional expression.

$$0.50 < f_1/f_2 < 0.80 \tag{3'}$$

It is even more preferable that the zoom lens system satisfies the following conditional expression.

$$0.55 < f_1/f_2 < 0.70 \tag{3''}$$

By satisfying the conditional expressions (3') and (3"), it is possible to show further the abovementioned effect.

Moreover, it is preferable that the zoom lens system satisfies the following conditional expression for the power of the second lens unit.

$$0.10<|f_2/f_t|<0.20 \quad (4)$$

where, $f_2$ denotes a focal length of the second lens unit, and
$f_t$ denotes a focal length of the entire zoom lens system at a telephoto end.

By making an arrangement such that an upper limit in the conditional expression (4) is not surpassed, the power of the second lens unit is secured, and an amount of change in a distance between the lens units for magnification is suppressed, and it is advantageous for making the lens barrel compact. Moreover, the zooming load can be easily achieved even when the power of the first lens unit is suppressed, and it is advantageous for a reduction in the spherical aberration in the first lens unit.

By making an arrangement such that a lower limit in the conditional expression (4) is not surpassed, the refracting power is suppressed moderately, and it is easy to suppress the occurrence of aberration. Moreover, a longitudinal magnification is suppressed from being excessively small, and it is advantageous for securing a magnification ratio for the amount of change in the distance.

It is more preferable that the zoom lens system satisfies the following conditional expression.

$$0.12<|f_2/f_t|<0.19 \quad (4')$$

It is even more preferable that the zoom lens system satisfies the following conditional expression.

$$0.15<|f_2/f_t|<0.18 \quad (4'')$$

By satisfying the conditional expressions (4') and (4''), it is possible to show further the abovementioned effect.

It is preferable that the zoom lens system satisfies the following conditional expression for the power of the third lens unit.

$$0.10<f_3/f_t<0.30 \quad (5)$$

where, $f_3$ denotes a focal length of the third lens unit, and
$f_t$ denotes a focal length of the entire zoom lens system at a telephoto end.

When an arrangement is made such that an upper limit in the conditional expression (5) is not surpassed, it is easy to secure the power and to suppress an amount of change in the distance between the lens units, for the magnification.

By making an arrangement such that a lower limit in the conditional expression (5) is not surpassed, it is easy to suppress the occurrence of aberration in the third lens unit. Moreover, the longitudinal magnification is suppressed from being excessively small, and it is advantageous for securing the magnification ratio for the amount of change in the distance.

It is more preferable that the zoom lens system satisfies the following conditional expression.

$$0.15<f_3/f_t<0.28 \quad (5')$$

It is even more preferable that the zoom lens system satisfies the following conditional expression.

$$0.20<f_3/f_t<0.25 \quad (5'')$$

By satisfying the conditional expressions (5') and (5''), it is possible to show further the abovementioned effect.

Moreover, it is preferable that the zoom lens system satisfies the following conditional expression for the power of the fourth lens unit.

$$0.10<f_4/f_t<0.70 \quad (6)$$

where, $f_4$ denotes a focal length of the fourth lens unit, and $f_t$ denotes a focal length of the entire zoom lens system at a telephoto end.

By making an arrangement such that an upper limit in the conditional expression (6) is not surpassed, the power of the fourth lens unit is secured, and a lack of correction of an astigmatism and a distortion in the entire zooming range is suppressed.

By making an arrangement such that a lower limit in the conditional expression (6) is not surpassed, the power of the fourth lens unit is suppressed moderately, and excessive correction of the astigmatism and the distortion in the entire zooming range is suppressed.

It is more preferable that the zoom lens system satisfies the following conditional expression.

$$0.30<f_4/f_t<0.65 \quad (6')$$

It is even more preferable that the zoom lens system satisfies the following conditional expression.

$$0.45<f_4/f_t<0.60 \quad (6'')$$

By satisfying the conditional expressions (6') and (6''), it is possible to show further the abovementioned effect.

Moreover, the fourth lens unit may be formed by a plastic material. Particularly, it is preferable to have a one-lens structure for the fourth lens unit. In a case of using an electronic image pickup element such as a CCD and a CMOS, it is preferable to let the fourth lens unit have a function of allowing light rays to be incident effectively on the imaging element by disposing an exit pupil position at an appropriate position. For carrying out such function, when the power is set in a range described in the conditional expression (6), no comparatively substantial power is required, and it is possible to structure by using a glass material such as plastic, having a low refractive-index.

Moreover, when plastic is used in the fourth lens unit, a cost is suppressed to be low, and it is possible to provide a cheaper zoom lens system.

Moreover, it is preferable that the zoom lens system satisfies the following conditional expression for the positive lens in the first lens unit.

$$62.0<v_{d1p}<95.0 \quad (7)$$

where, $v_{d1p}$ denotes an Abbe's number for a d-line of the positive lens in the first lens unit.

By making an arrangement such that an upper limit in the conditional expression (7) is not surpassed, a mass production and a procurement of the material becomes easy, and it is advantageous for the cost reduction.

By making an arrangement such that a lower limit in the conditional expression (7) is not surpassed, the color dispersion is suppressed, and it is advantageous for reducing the chromatic aberration.

It is more preferable that the zoom lens system satisfies the following conditional expression.

$$65.0<v_{d1p}<93.0 \quad (7')$$

It is even more preferable that the zoom lens system satisfies the following conditional expression.

$$80.0<v_{d1p}<90.0 \quad (7'')$$

By satisfying the conditional expressions (7') and (7''), it is possible to show further the abovementioned effect.

Moreover, in the zoom lens system, it is preferable that the third lens unit includes a positive lens which satisfies the following conditional expression.

$$62.0<v_{d3p}<95.0 \quad (8)$$

where, $\nu_{d3p}$ denotes an Abbe's number for a d-line of the positive lens in the third lens unit.

By making an arrangement such that an upper limit in the conditional expression (8) is not surpassed, the mass production and the procurement of the material becomes easy, and it is effective for the cost reduction.

By making an arrangement such that a lower limit in the conditional expression (8) is not surpassed, the chromatic dispersion is suppressed, the longitudinal chromatic aberration is reduced, and it is easy to achieve favorable optical performance over the entire zooming range.

It is more preferable that the zoom lens system satisfies the following conditional expression.

$$65.0 < \nu_{d3p} < 93.0 \quad (8')$$

It is even more preferable that the zoom lens system satisfies the following conditional expression.

$$80.0 < \nu_{d3p} < 90.0 \quad (8'')$$

By satisfying the conditional expressions (8') and (8''), it is possible to show further the abovementioned effect.

Moreover, in the zoom lens system, it is preferable that the positive lens is a positive single lens which is disposed nearest to the object side, in the third lens unit.

A reason for and an effect of having the abovementioned arrangement in the zoom lens system will be described below. A longitudinal light beam diverged from the second lens unit is incident on the third lens unit. Therefore, letting the lens in the third lens unit, nearest to the object side to be the positive single lens is advantageous for making small the third lens unit by imparting a convergence effect on the diverged light beam.

In this case, for suppressing efficiently an effect of the chromatic aberration in this lens, it is preferable that the lens satisfies the abovementioned conditional expressions (8), (8'), and (8'').

Moreover, in the zoom lens system, it is preferable that the following conditional expression is satisfied for the negative lens in the first lens unit.

$$1.85 < n_{d1n} < 2.10 \quad (9)$$

where, $n_{d1n}$ denotes a refractive index for a d-line, of the negative lens in the first lens unit.

By making an arrangement such that an upper limit in the conditional expression (9) is not surpassed, the mass production and the procurement of the material becomes easy, and it is advantageous for the cost reduction.

By making an arrangement such that a lower limit in the conditional expression (9) is not surpassed, an absolute value of a curvature of a lens surface is suppressed to be small even when the desired refracting power is achieved, and it is possible to reduce an occurrence of distortion and an image plane curvature at the wide angle end, and the comatic aberration at the wide angle end and the telephoto end.

It is more preferable that the zoom lens system satisfies the following conditional expression.

$$1.90 < n_{d1f} < 2.05 \quad (9')$$

It is even more preferable that the zoom lens system satisfies the following conditional expression.

$$1.95 < n_{d1n} < 2.05 \quad (9'')$$

By satisfying the conditional expressions (9') and (9''), it is possible to show further the abovementioned effect.

Moreover, in the zoom lens system, it is preferable that the second lens unit includes a negative lens which satisfies the following conditional expression.

$$1.76 < n_{d2n} < 2.00 \quad (10)$$

where, $n_{d2n}$ denotes a refractive index for a d-line, of the negative lens in the second lens unit.

By making an arrangement such that an upper limit in the conditional expression (10) is not surpassed, the mass production and the procurement of the material becomes easy, and it is advantageous for the cost reduction. By making an arrangement such that a lower limit in the conditional expression (10) is not surpassed, it is possible to make small the absolute value of curvature of the lens surface even when the refracting power is secured, and it is possible to suppress the occurrence of the distortion and the image plane curvature at the wide angle end, and the comatic aberration at the wide angle end and the telephoto end.

It is more preferable that the zoom lens system satisfies the following conditional expression.

$$1.80 < n_{d2n} < 1.95 \quad (10')$$

It is even more preferable that the zoom lens system satisfies the following conditional expression.

$$1.83 < n_{d2n} < 1.90 \quad (10'')$$

By satisfying the conditional expressions (10') and (10''), it is possible to show further the abovementioned effect.

Moreover, in the zoom lens system, it is preferable that the negative lens is a negative single lens which is disposed nearest to the object side, in the second lens unit.

A reason for and an effect of having the abovementioned arrangement in the zoom lens system will be described below. By disposing the negative single lens nearest to the object side, in the second lens unit, it is advantageous for making small the second lens unit, while securing an image angle. At this time, since for this negative lens, a height of incident light rays in the second lens unit becomes high, suppressing an increase in the curvature in this lens is advantageous for correction of various off-axis aberrations. Therefore, it is preferable that this negative lens satisfies the conditional expressions (10), (10'), and (10'').

Moreover, in the zoom lens system, it is preferable that the second lens unit includes a positive lens which satisfies the following conditional expression.

$$1.80 < n_{d2p} < 2.15 \quad (11)$$

where, $n_{d2p}$ denotes a refractive index for a d-line, of the positive lens in the second lens unit.

A reason for and an effect of having the abovementioned arrangement in the zoom lens system will be described below. By disposing the positive lens in the second lens unit, it is advantageous for reducing an aberration which is susceptible to occur in the negative second lens unit. By making an arrangement such that an upper limit in the conditional expression (11) is not surpassed, the mass production and the procurement of the material becomes easy, and it is advantageous for the cost reduction.

By making an arrangement such that a lower limit in the conditional expression (11) is not surpassed, the absolute value of curvature of the lens surface is suppressed to be small even when the desired refracting power is achieved, and it is possible to reduce the occurrence of the distortion and the image plane curvature at the wide angle end, and the comatic aberration at the wide angle end and the telephoto end.

It is more preferable that the zoom lens system satisfies the following conditional expression.

$$1.84 < n_{d2p} < 2.10 \quad (11')$$

It is even more preferable that the zoom lens system satisfies the following conditional expression.

$$1.90 < n_{d2p} < 2.10 \quad (11'')$$

Particularly, in the zoom lens system, it is preferable that the positive lens is a positive lens which is disposed nearest to the object side, in the second lens unit.

A reason for and an effect of having such an arrangement in the zoom lens system will be described below. By disposing the positive lens nearest to the image side, in the second lens unit, principle points of the second lens unit can be let to be on the side of an object, and accordingly, it is possible to bring closer the principal points of the second lens unit at the wide angle side, closer to the first lens unit, which is advantageous for shortening the total length of the zoom lens system, and making small the second lens unit. At this time, by satisfying the conditional expressions (11), (11'), and (11''), the occurrence of a higher order aberration by this positive lens is suppressed, and it is easy to secure this function.

Moreover, in the zoom lens system, it is preferable that the second lens unit includes a plurality of negative lenses, and that the positive lens in the second lens unit is disposed between the plurality of negative lenses.

A reason for and an effect of having such an arrangement in the zoom lens system will be described below. A power arrangement of the lenses in the second lens unit becomes symmetric, and it is easy to suppress the occurrence of various aberrations in the second lens unit. At this time, by satisfying the conditional expressions (11), (11'), and (11''), the occurrence of the higher order aberration of the positive lens is suppressed, and it is easy to carry out the entire aberration correction.

Moreover, in the zoom lens system, it is preferable that the second lens unit includes a biconcave negative lens which is disposed nearest to the object side, and satisfies the following conditional expression.

$$-1.0 < SF_{2n1} < -0.8 \quad (12)$$

where, $SF_{2n1}$ is defined as $SF_{2n1} = (R_{2n1f} + R_{2n1r})/(R_{2n1f} - R_{2n1r})$, when $R_{2n1f}$ is a paraxial radius of curvature of a surface on an object side, of the negative lens disposed nearest to the object side, in the second lens unit, and $R_{2n1r}$ is a paraxial radius of curvature of a surface on an image side, of the negative lens disposed nearest to the object side, in the second lens unit.

A reason for and an effect of having such an arrangement in the zoom lens system will be described below. By disposing the biconcave negative lens nearest to the object side, in the second lens unit, it is advantageous for securing the negative power of the second lens unit, and making small the second lens unit. Moreover, the second lens unit can be easily brought closer to the first lens unit, and it is advantageous for making the size small when collapsed, and the entire length at the wide angle end.

By making an arrangement such that an upper limit in the conditional expression (12) is not surpassed, the absolute value of curvature of an image side surface is suppressed from being excessively large even when the power of the negative lens is secured, and it is easy to suppress the occurrence of off-axis aberration such as the distortion and the image plane curvature particularly at the wide angle end.

By making an arrangement such that a lower limit in the conditional expression (12) is not surpassed, the absolute value of curvature of an object side surface is suppressed from being excessively large, and it becomes easy to suppress the occurrence of the comatic aberration and the astigmatism at the wide angle end side.

It is more preferable that the zoom lens system satisfies the following conditional expression.

$$-0.8 < SF_{2n1} < 0.7 \quad (12')$$

It is even more preferable that the zoom lens system satisfies the following conditional expression.

$$-0.5 < SF_{2n1} < 0.5 \quad (12'')$$

By satisfying the conditional expressions (12) and (12''), it is possible to show further the abovementioned effect.

Moreover, in the zoom lens system, it is preferable that the following conditional expression is satisfied for a proportion of a zooming load of the second lens unit and the third lens unit.

$$1.0 < (\beta_{2t}/\beta_{2w})/(\beta_{3t}/\beta_{3w}) < 2.5 \quad (13)$$

where, $\beta_{2w}$ denotes a lateral magnification at a wide angle end, of the second lens unit, $\beta_{2t}$ denotes a lateral magnification at a telephoto end, of the second lens unit, $\beta_{3w}$ denotes a lateral magnification at the wide angle end, of the third lens unit, and $\beta_{3t}$ denotes a lateral magnification at the telephoto end, of the third lens unit.

By making an arrangement such that an upper limit in the conditional expression (13) is not surpassed, it is preferable to suppress an excessive zooming load of the second lens unit, and to suppress an occurrence of aberration due to an increase in the power, and an occurrence of various off-axis aberrations such as the image plane curvature and the chromatic aberration of magnification particularly at the telephoto end.

By making an arrangement such that a lower limit in the conditional expression (13) is not surpassed, it is preferable to suppress an occurrence of aberration due to an increase in the size of the lens barrel due to an increase in an amount of movement of the third lens unit, and an increase in the power of the third lens unit, and an occurrence of a longitudinal aberration such as the spherical aberration particularly at the telephoto end.

It is more preferable that the zoom lens system satisfies the following conditional expression.

$$1.1 < (\beta_{2t}/\beta_{2w})/(\beta_{3t}/\beta_{3w}) < 2.0 \quad (13')$$

It is even more preferable that the zoom lens system satisfies the following conditional expression.

$$1.5 < (\beta_{2t}/\beta_{2w})/(\beta_{3t}/\beta_{3w}) < 1.9 \quad (13'')$$

By satisfying the conditional expressions (13') and (13''), it is possible to show further the abovementioned effect.

Moreover, in the zoom lens system, it is preferable that the following conditional expression is satisfied for a magnification effect of the second lens unit.

$$2.6 < \beta_{2t}/\beta_{2w} < 6.0 \quad (14)$$

where, $\beta_{2w}$ is a lateral magnification at a wide angle end, of the second lens unit, and $\beta_{2t}$ is a lateral magnification at a telephoto end, of the second lens unit.

By making an arrangement such that an upper limit in the conditional expression (14) is not surpassed, it is preferable to suppress an occurrence of an aberration due to the increase in the power of the second lens unit, and the occurrence of various off-axis aberrations such as the image plane curvature and the chromatic aberration of magnification at the telephoto end.

By making an arrangement such that a lower limit in the conditional expression (14) is not surpassed, it is preferable to reduce a load of the magnification effect on the other lens units. By suppressing the zooming load of the third lens unit, it is advantageous for reducing the occurrence of a longitudinal aberration such as the spherical aberration at the telephoto end. Moreover, by suppressing the zooming load of the fourth lens unit, it is easy to suppress the power of the fourth lens unit to a moderate level, and to suppress an excessive correction of astigmatism in the entire range.

It is more preferable that the zoom lens system satisfies the following conditional expression.

$$2.6 < \beta_{2t}/\beta_{2w} < 5.0 \tag{14'}$$

It is even more preferable that the zoom lens system satisfies the following conditional expression.

$$2.9 < \beta_{2t}/\beta_{2w} < 3.5 \tag{14''}$$

By satisfying the conditional expressions (14') and (14''), it is possible to show further the abovementioned effect.

Moreover, in the zoom lens system, it is preferable that the following conditional expression is satisfied for a zooming effect of the third lens unit.

$$1.2 < \beta_{3t}/\beta_{3w} < 3.0 \tag{15}$$

where, $\beta_{3w}$ denotes a lateral magnification at a wide angle end, of the third lens unit, and $\beta_{3t}$ denotes a lateral magnification at a telephoto end, of the third lens unit.

By making an arrangement such that an upper limit in the conditional expression (15) is not surpassed, it is preferable to suppress an occurrence of an aberration due to the increase in the power of the third lens unit, and the occurrence of a longitudinal aberration such as the spherical aberration, particularly at the telephoto end.

By making an arrangement such that a lower limit in the conditional expression (15) is not surpassed, it is preferable to reduce the load of magnification effect on the other lens units. By suppressing the zooming load of the second lens unit, it is advantageous for reducing an occurrence of various off-axis aberrations such as an image plane curvature and the chromatic aberration of magnification at the telephoto end. Moreover, by suppressing the zooming load of the fourth lens unit, it is easy to suppress the power of the fourth lens unit to a moderate level, and to suppress an excessive correction of astigmatism in the entire area.

It is more preferable that the zoom lens system satisfies the following conditional expression.

$$1.5 < \beta_{3t}/\beta_{3w} < 2.5 \tag{15'}$$

It is even more preferable that the zoom lens system satisfies the following conditional expression.

$$1.7 < \beta_{3t}/\beta_{3w} < 2.0 \tag{15''}$$

By satisfying the conditional expressions (15') and (15''), it is possible to show further the abovementioned effect.

Moreover, in the zoom lens system, it is preferable that the following conditional expression is satisfied for a zooming effect of the fourth lens unit.

$$0.7 < \beta_{4t}/\beta_{4w} < 1.7 \tag{16}$$

where, $\beta_{4w}$ denotes a lateral magnification at a wide angle end, of the fourth lens unit, and $\beta_{4t}$ denotes a lateral magnification at a telephoto end, of the fourth lens unit.

A reason for and an effect of having such an arrangement in the zoom lens system will be described below. By allowing the fourth lens unit to have a moderate magnification (zooming) load, the zooming load of the second lens unit and the fourth lens unit can be suppressed easily, and it is advantageous for securing the magnification ratio while suppressing the aberration fluctuation.

By making an arrangement such that an upper limit in the conditional expression (16) is not surpassed, it is easy to suppress an increase in the zooming load of the fourth lens unit, and to suppress the aberration. When the fourth lens unit is let to be a unit which moves at the time of focusing, it is advantageous for suppressing a fluctuation in the image plane curvature at the time of focusing.

By making an arrangement such that a lower limit in the conditional expression (16) is not surpassed, it is preferable to reduce the zooming load on the other lens unit. By suppressing the zooming load of the second lens unit, it is advantageous for reducing an occurrence of various off-axis aberrations such as the image plane curvature and the chromatic aberration of magnification at the telephoto end. Moreover, by suppressing the zooming load of the third lens unit, it is advantageous for reducing the occurrence of longitudinal aberration such as the spherical aberration, particularly at the telephoto end.

It is more preferable that the zoom lens system satisfies the following conditional expression.

$$0.8 < \beta_{4t}/\beta_{4w} < 1.5 \tag{16'}$$

It is even more preferable that the zoom lens system satisfies the following conditional expression.

$$1.0 < \beta_{4t}/\beta_{4w} < 1.3 \tag{16''}$$

By satisfying the conditional expressions (16') and (16''), it is possible to show further the abovementioned effect.

Moreover, in the zoom lens system, it is preferable that the following conditional expression is satisfied for a total of an air space on an optical axis, between the second lens unit and the third lens unit, at the wide angle end, and an air space on the optical axis, between the first lens unit and the second lens unit, at the telephoto end, with respect to a focal length at the telephoto end of the entire zoom lens system.

$$0.4 < (D_{2w} + D_{1t})/f_t < 0.9 \tag{17}$$

where, $D_{2w}$ denotes an air space on an optical axis, between the second lens unit and the third lens unit, at a wide angle end, $D_{1t}$ denotes an air space on the optical axis, between the first lens unit and the second lens unit, at a telephoto end, and $f_t$ denotes a focal length of the entire zoom lens system at the telephoto end.

By making an arrangement such that an upper limit in the conditional expression (17) is not surpassed, it is easy to suppress an amount of movement of a lens unit which moves, and to suppress the size in the direction of thickness of the lens barrel.

By making an arrangement such that a lower limit in the conditional expression (17) is not surpassed, it is easy to suppress the power of each lens unit while achieving a high zooming ratio, and to suppress the fluctuation in aberration.

It is more preferable that the zoom lens system satisfies the following conditional expression.

$$0.5 < (D_{2w} + D_{1t})/f_t < 0.7 \tag{17'}$$

It is even more preferable that the zoom lens system satisfies the following conditional expression.

$$0.55 < (D_{2w} + D_{1t})/f_t < 0.65 \quad (17'')$$

By satisfying the conditional expressions (17') and (17"), it is possible to show further the abovementioned effect.

Moreover, in the zoom lens system, it is preferable that the following conditional expression is satisfied for an air space on the optical axis between the second lens unit and the third lens unit, at the wide angle end, with respect to the focal length of the entire zoom lens system, at the telephoto end.

$$0.1 < D_{2w}/f_t < 0.5 \quad (18)$$

where, $D_{2w}$ denotes an air space on an optical axis, between the second lens unit and the third lens unit, at a wide angle end, and $f_t$ denotes a focal length of the entire zoom lens system, at a telephoto end.

By making an arrangement such that an upper limit in the conditional expression (18) is not surpassed, it becomes easy to suppress the entire length (of the zoom lens system) at the wide angle end. Moreover, a height of light rays incident on the first lens unit can be decreased easily, and a lens diameter of the first lens unit is also suppressed, which is advantageous for making small the zoom lens system and the electronic image pickup apparatus.

By making an arrangement such that a lower limit in the conditional expression (18) is not surpassed, the power of each lens unit is suppressed even when the magnification ratio is high, and it becomes easy to suppress an occurrence of aberration such as the spherical aberration.

It is more preferable that the zoom lens system satisfies the following conditional expression.

$$0.2 < D_{2w}/f_t < 0.4 \quad (18')$$

It is even more preferable that the zoom lens system satisfies the following conditional expression.

$$0.25 < D_{2w}/f_t < 0.35 \quad (18'')$$

By satisfying the conditional expressions (18') and (18"), it is possible to show further the abovementioned effect.

Moreover, in the zoom lens system, it is preferable that the following conditional expression is satisfied for an air space on the optical axis between the second lens unit and the third lens unit, at the wide angle end, with respect to the focal length of the entire zoom lens system, at the telephoto end.

$$0.2 < D_{1t}/f_t < 0.5 \quad (19)$$

where $D_{1t}$ denotes an air space on an optical axis, between the first lens unit and the second lens unit, at a telephoto end, and $f_t$ denotes a focal length of the entire zoom lens system, at the telephoto end.

By making an arrangement such that an upper limit in the conditional expression (19) is not surpassed, it becomes easy to suppress the entire length of the zoom lens system at the telephoto end, and it is advantageous for making small the thickness of the lens barrel.

By making an arrangement such that a lower limit in the conditional expression (19) is not surpassed, the power of each lens unit is suppressed even when the zooming ratio is high, and it becomes easy to suppress an occurrence of aberration such as the spherical aberration.

It is more preferable that the zoom lens system satisfies the following conditional expression.

$$0.2 < D_{1t}/f_t < 0.4 \quad (19')$$

It is even more preferable that the zoom lens system satisfies the following conditional expression.

$$0.25 < D_{1t}/f_t < 0.35 \quad (19'')$$

By satisfying the conditional expressions (19') and (19"), it is possible to show further the abovementioned effect.

Moreover, in the zoom lens system, it is preferable to make the following arrangement of the entire length of the zoom lens system, with respect to the focal length of the entire system, at the telephoto end. For this, in the zoom lens system, it is preferable that the first lens unit moves to be positioned at an object side, at the telephoto end rather than the wide angle end, and satisfies the following conditional expression.

$$0.7 < T_L/f_t < 1.5 \quad (20)$$

where, $T_L$ denotes a distance on an optical axis, up to an image surface from an vertex of a lens surface nearest to the object side, in the first lens unit, at the telephoto end, and $f_t$ denotes a focal length of the entire zoom lens system, at the telephoto end.

A reason for and an effect of having such an arrangement in the zoom lens system will be described below. By the abovementioned movement of the first lens unit, it is easy to secure the zooming effect in the second lens unit etc.

By making an arrangement such that an upper limit in the conditional expression (20) is not surpassed, it becomes easy to suppress the entire length of the zoom lens system, at the telephoto end, and to suppress an increase in the (size in the direction of) thickness of the lens barrel.

By making an arrangement such that a lower limit in the conditional expression (20) is not surpassed, the power of each lens unit is suppressed even when the zooming ratio is high, and it becomes easy to suppress an occurrence of aberration such as the spherical aberration.

It is more preferable that the zoom lens system satisfies the following conditional expression.

$$0.9 < T_L/f_t < 1.3 \quad (20')$$

It is even more preferable that the zoom lens system satisfies the following conditional expression.

$$1.0 < T_L/f_t < 1.2 \quad (20'').$$

By satisfying the conditional expressions (20') and (20"), it is possible to show further the abovementioned effect.

Moreover, it is preferable that the zoom lens system of the present invention is let to have the following zooming ratio, for having a balanced securing of optical performance. For this, it is preferable that in the zoom lens system, the following conditional expression is satisfied.

$$3.0 < f_t/f_w < 12.0 \quad (21)$$

where, $f_w$ is a focal length at the wide angle end, of the entire zoom lens system, and $f_t$ is a focal length at the telephoto end, of the entire zoom lens system.

By making an arrangement such that an upper limit in the conditional expression (21) is not surpassed, it is advantageous for securing the optical performance, and making the size small.

It is more preferable that an arrangement is made such that a lower limit in the conditional expression (21) is not surpassed, as such an arrangement in the present invention, sufficiently exerts an advantageousness such as securing the magnification ratio, making the size small, and securing the optical performance.

It is more preferable that the zoom lens system satisfies the following conditional expression.

$$5.0 < f_t/f_w < 10.0 \quad (21')$$

It is even more preferable that the zoom lens system satisfies the following conditional expression.

$$6.0 < f_t/f_w < 8.0 \quad (21'')$$

By satisfying the conditional expressions (21') and (21''), it is possible to show further the abovementioned effect.

Moreover, in the zoom lens system, it is preferable that each of the negative lens and the positive lens in the first lens unit is cemented on the optical axis, and form a cemented doublet.

A reason for and an effect of having such an arrangement in the zoom lens system will be described below. when the negative lens and the positive lens in the first lens unit are let to form a cemented lens, it is possible to carry out efficiently a correction of longitudinal chromatic aberration which is susceptible to be remarkable at the time of making long a focal length at the telephoto end by increasing the magnification. Moreover, it is possible to suppress deterioration of optical performance in relative decentering of lens due to an assembling error.

When the negative lens and the positive lens in the first lens unit are not cemented, it is advantageous for correcting more effectively the distortion and the comatic aberration at the wide angle end, and the comatic aberration at the telephoto end.

Moreover, in the zoom lens system, it is preferable that the second lens unit is made of not more than three lenses in all. This is advantageous for making the second lens unit small, and the cost reduction.

Furthermore, in the zoom lens system, it is preferable that the second lens unit includes, in order from an object side thereof, a negative lens, a negative lens, and a positive lens.

Such an arrangement is advantageous for shortening the entire length by correction of an initial aberration and positioning of principal points toward an object, by dividing the negative power of the second lens unit by two negative lenses, and disposing the positive lens nearest to an image side.

Moreover, in the zoom lens system, it is preferable that the second lens unit includes, in order from an object side thereof, a negative lens, a positive lens, and a negative lens.

Accordingly, it is easy to suppress a fluctuation at the time of zooming, of various aberrations such as the spherical aberration, by arranging the lenses symmetrically in the second lens unit.

Furthermore, in the zoom lens system, it is preferable that the second lens unit includes two lenses namely a negative lens and a positive lens. Such an arrangement is advantageous for making the second lens unit small, while suppressing an aberration at the second lens unit.

Moreover, in the zoom lens system, it is preferable that the third lens unit is formed by not more than three lenses. Such an arrangement is advantageous for slimming of the lens barrel.

Furthermore, in the zoom lens system, it is preferable that the third lens unit includes, in order from an object side thereof, a positive lens, a positive lens, and a negative lens, and the negative lens in the third lens unit is cemented to the positive lens, and the negative lens and the positive lens form a cemented doublet.

A reason for and an effect of having such arrangement in the zoom lens system will be described below. By cementing the positive lens and the negative lens, it is possible to carry out effectively the correction of the longitudinal chromatic aberration. Moreover, by distributing the power of the positive lens in two lenses, and letting the positive lens and the negative lens to be the cemented lens, it is possible to prevent degradation of optical performance due to relative decentering of lenses in an assembling process. This leads to an improvement in yield and a reduction in cost.

Moreover, in the zoom lens system, it is preferable that the first lens unit includes an aspheric lens surface. Such an arrangement is advantageous for correction of the spherical aberration which is susceptible to occur particularly at the telephoto end.

Furthermore, in the zoom lens system, it is preferable that the second lens unit includes an aspheric lens surface.

A reason for and an effect of having such arrangement in the zoom lens system will be described below. When an attempt is made to secure the zooming ratio while suppressing the overall length, a change in a position in the second lens unit, at which the light rays are incident, is susceptible to increase. Disposing an aspheric surface in this lens unit is advantageous for correction of an off-axis aberration at the wide angle end.

Furthermore, in the zoom lens system, it is preferable that the third lens unit includes an aspheric lens surface. Such arrangement is advantageous for overall correction of the spherical aberration and the comatic aberration.

Moreover, in the zoom lens system, it is preferable that the third lens unit includes a positive single lens having both surfaces aspheric, which is disposed nearest to an object side.

A reason for and an effect of having such arrangement in the zoom lens system will be described below. By letting both side surfaces of the lens to be aspheric surfaces, it is possible to carry out more favorably the correction of the spherical aberration and the comatic aberration, while suppressing to be small the degradation of the optical performance due to a relative decentering of lenses in the lens unit.

Moreover, in the zoom lens system, it is preferable that the first lens unit, the second lens unit, the third lens unit, and the fourth lens unit move at the time of zooming, and the zoom lens system further includes an aperture stop which moves integrally with the third lens unit in an optical-axis direction.

A reason for and an effect of such arrangement in the zoom lens system will be described below. The zooming effect is imparted efficiently to each lens unit, and favorable correction of an aberration can be carried out easily in the entire zooming range.

Moreover, by moving the aperture stop integrally with the third lens unit, it is possible to carry out an effective correction of the chromatic aberration of magnification and the distortion. This effect is not exerted only from a performance aspect, and it is possible to control appropriately a position of an entrance pupil and a position of an exit pupil. In other words, a height of light rays of an oblique light beam at the wide angle end, and a height of light rays of a longitudinal light beam at the telephoto end are balanced, and it is possible to make compact an outer diameter of the first lens unit and an outer diameter of the second lens unit, in a balanced manner. Particularly, reducing the outer diameter of the first lens unit, at the wide angle end leads effectively to making compact the size in the direction of thickness of the lens.

Moreover, since it is also possible to control such that a fluctuation of the position of exit pupil at the time of zooming is decreased, in a case of using a CCD and a CMOS etc., it is possible to prevent an occurrence of shading in a corner of a screen by maintaining an angle of light rays which are incident in an appropriate range, and it becomes suitable for an electronic image pickup element Moreover, it becomes easy to suppress the fluctuation in aberration due to the compactness of the third lens unit, and the movement of the third lens unit.

Furthermore, in the zoom lens system, it is preferable that at the time of zooming from the wide angle end to the telephoto end, the first lens unit moves to be positioned toward the object side at the telephoto end rather than the wide angle end, the second lens unit moves, the third lens unit moves only toward the object side, and the fourth lens unit moves.

A reason for and an effect of having such an arrangement in the zoom lens system will be described below. An overall aberration balance can be adjusted easily while securing the zooming effect to the second lens unit and the third lens unit.

At the time of zooming from the wide angle end to the telephoto end, the first lens unit may be moved to be positioned toward the object side at the telephoto end rather than (farther than) the wide angle end. At this time, the lens unit may be moved only toward the object side, and may be moved by a locus of a convexity toward the image side.

The second lens unit may be moved only toward the image side, or may be moved by a locus of a convexity, toward the image side. The third lens unit may be moved only toward the object side. The fourth lens unit may be moved only toward the object side, or may be moved by a locus of convexity toward the image side.

Moreover, in the zoom lens system, it is preferable that an aperture stop is disposed between the second lens unit and the third lens unit.

A reason for and an effect of having such an arrangement in the zoom lens system will be described below. It is possible to position the entrance pupil at a nearer position as viewed from the object side, and to keep the exit pupil at a distance from an image surface. At this time, it is more preferable to dispose in line, a shutter unit which moves integrally with the aperture stop.

Since the height of oblique light rays may be decreased, there is no increase in the size of the shutter unit, and a small dead space at the time of moving the aperture stop and the shutter unit, serves the purpose.

Moreover, in the zoom lens system, it is preferable that the zoom lens system is a four-unit zoom lens system. Such an arrangement is advantageous for making the zoom lens system compact.

Furthermore, an electronic image pickup apparatus of the present invention includes the zoom lens system described above, and an electronic image pickup element which is disposed at an image side of the zoom lens system, and which converts an image formed by the zoom lens system, to an electric signal.

The zoom lens system of the present invention is advantageous for securing a telecentricity. Consequently, it is preferable to use the zoom lens system in an electronic image pickup apparatus which uses an electronic image pickup element in which there occurs to be image deterioration due to an angle of incidence.

Moreover, in a case of such electronic image pickup apparatus in which the electronic image pickup element is used, it is preferable to make an arrangement as follows.

It is preferable that the electronic image pickup apparatus includes a processing section which electrically corrects a distortion of the zoom lens system. Accordingly, the deterioration of a reproduced image is suppressed even when the zoom lens system is structured to be small and it is advantageous for making small the electronic image pickup apparatus.

In each of the inventions described above, in a case of providing a focusing function to the zoom lens system, an arrangement is made such that an object point which is most distant is focused. When a focusing operation is carried out by the movement of the fourth lens unit in an optical axis direction, it is easy to suppress a fluctuation in the position of the exit pupil. Therefore, such focusing operation is preferable.

Moreover, it is preferable that the present invention satisfies arbitrarily a plurality of conditional expressions simultaneously. Furthermore, a lower limit value and an upper limit value of each conditional expression may be let to be a lower limit value and an upper limit value of conditional equation in which only the upper limit value is more restricted. Moreover, various arrangements described above may be combined arbitrarily.

As it is clear from the abovementioned description, according to the present invention, in the zoom lens system which includes the first lens unit having a positive refracting power, the second lens unit having a negative refracting power, a third lens unit having a positive refracting power, and the fourth lens unit having a positive refracting power, by devising an idea for the first lens unit, it is advantageous for making the size of the zoom lens system small, and it is possible to provide a zoom lens system which is capable of suppressing easily the fluctuation in the spherical aberration, even when the zooming ratio is increased.

Or, by devising an idea for the first lens unit, it is advantageous for size reduction, and it is possible to provide a zoom lens system which is capable of suppressing easily the fluctuation in the chromatic aberration, even when the zooming ratio is increased. Furthermore, it is possible to provide a zoom lens system which achieves simultaneously the abovementioned objects. Moreover, by devising an idea for each lens unit and a method for movement, it is possible to provide a zoom lens system which is capable of achieving some of or a plurality of the size reduction, a high zooming ratio, cost reduction, and securing of optical performance. Furthermore, it is possible to provide an electronic image pickup apparatus which includes such zoom lens system.

Exemplary embodiments of a zoom lens system and an electronic image pickup apparatus according to the present invention will be described below in detail by referring to the accompanied diagram. However, the present invention is not restricted to the embodiments described below.

Embodiments from a first embodiment to a ninth embodiment of the present invention will be described below. Lens cross-sectional views of a state at a wide angle end, an intermediate state, and a state at a telephoto end, of an infinite object point focusing according to the first embodiment to the ninth embodiment are shown in FIG. 1A, FIG. 1B, and FIG. 1C to FIG. 9A, FIG. 9B, to FIG. 9C. In FIG. 1A to FIG. 9C, G1 indicates a first lens unit, G2 indicates a second lens unit, S indicates an aperture stop, G3 indicates a third lens unit, G4 indicates a fourth lens unit, F indicates a parallel flat plate which forms a low pass filter in which a wavelength region restricting coating which restricts infrared light is applied, C indicates a parallel flat plate of carbon glass of an electronic image pickup element, and I indicates an image plane. A multilayered film for restricting a wavelength region may be applied to a surface of the carbon glass C. Moreover, the carbon glass C may be let to have a low pass filter effect.

Figure 1B:
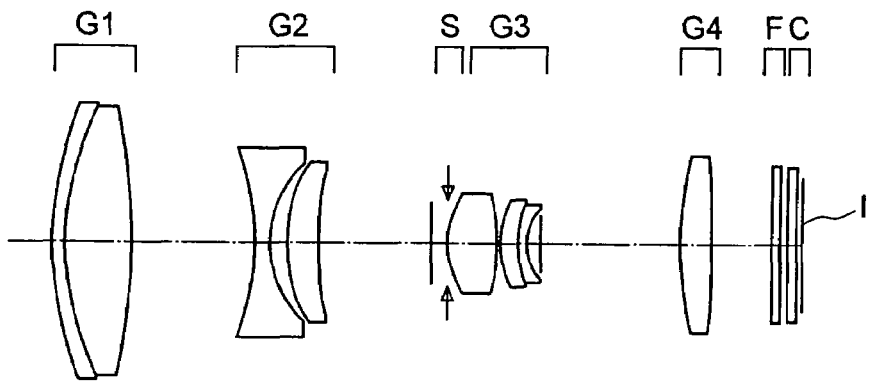
Figure 1C:
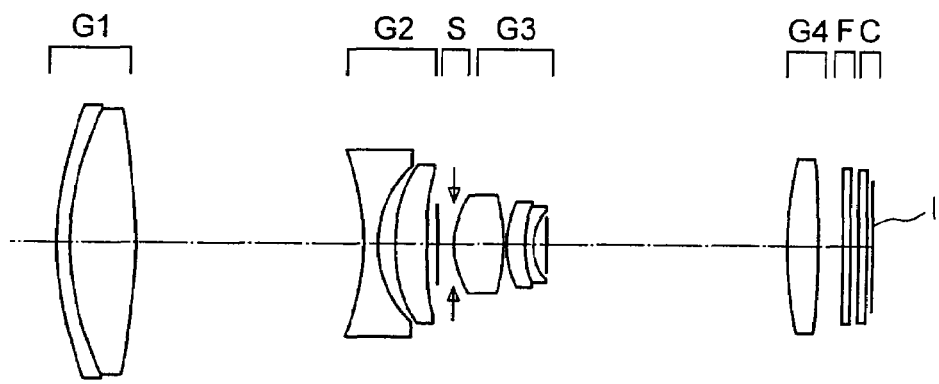

A zoom lens system in the first embodiment, as shown in FIG. 1A to FIG. 1C, includes, in order from an object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward an image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens and a fourth positive meniscus lens having a convex surface directed toward the object side. The third lens unit G3 includes a fifth biconvex positive lens, a sixth positive meniscus lens having a convex surface directed toward the object side, and a seventh negative meniscus lens having a convex surface directed toward the object side. The sixth positive meniscus lens and the seventh negative meniscus lens are cemented. The fourth lens unit G4 includes an eighth biconvex positive lens. A lens apex of a tenth surface is positioned on the object side farther than the aperture stop S.

An aspheric surface is used for six surfaces namely a surface on the image side of the second biconvex positive lens, both surfaces of the third biconcave negative lens, both surfaces of the fifth biconvex positive lens, and a surface toward the object side, of the eighth biconvex positive lens. Moreover, an eighth surface is a virtual surface.

Figure 2A:
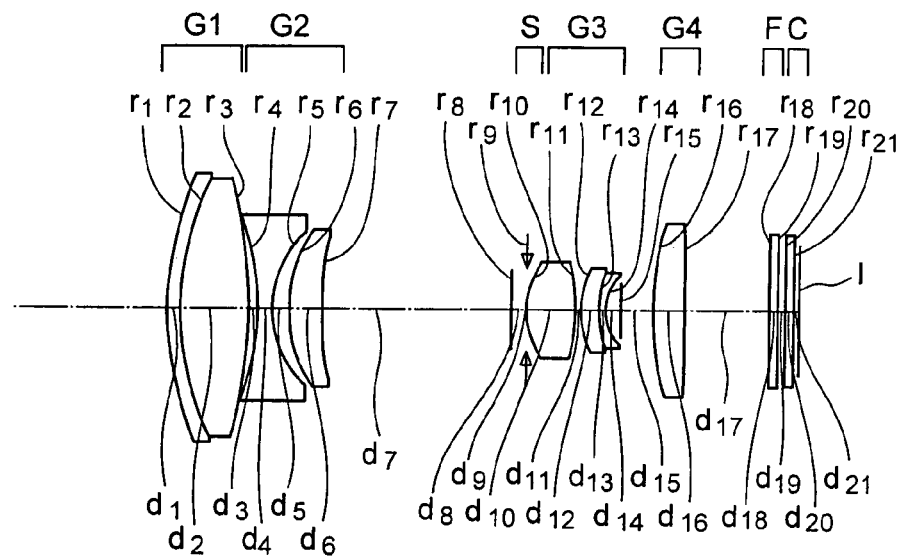
FIG. 2A, FIG. 2B, and FIG. 2C are diagrams similar to FIG. 1A, FIG. 1B, and FIG. 1C respectively, according to a second embodiment of the zoom lens system according to the present invention.
Figure 2B:
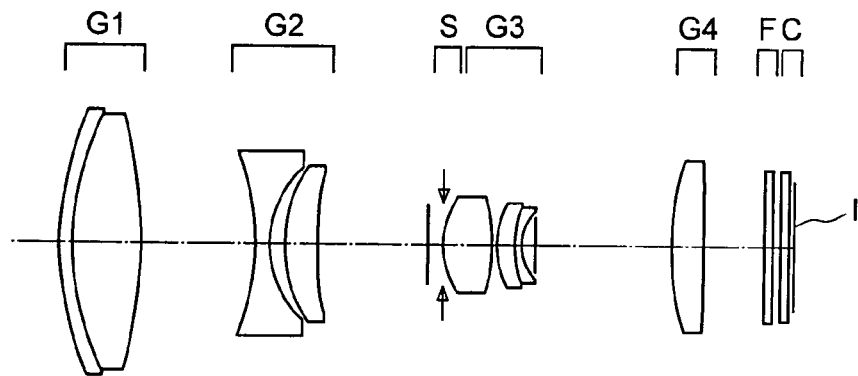
Figure 2C:
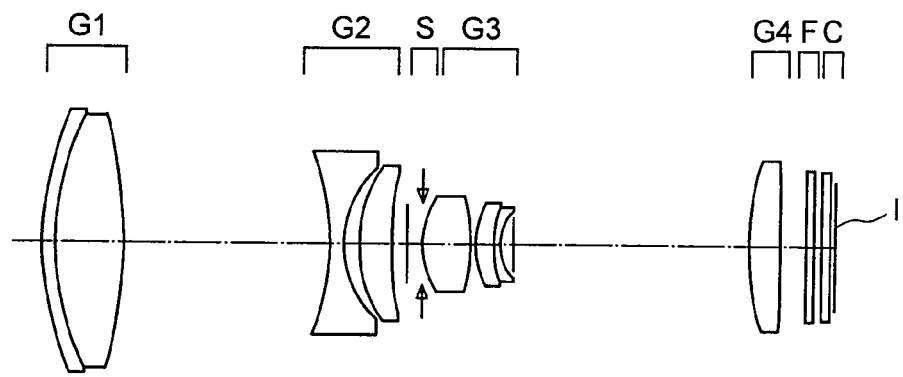

A zoom lens system in the second embodiment, as shown in FIG. 2A to FIG. 2C, includes, in order from the object side, a first lens unit G1 having a positive refracting power, a second lens unit having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, and a fourth positive meniscus lens having a convex surface directed toward the object side. The third lens unit G3 includes a fifth biconvex positive lens, a sixth positive meniscus lens having a convex surface directed toward the object side, and a seventh negative meniscus lens having a convex surface directed toward the object side. The sixth positive meniscus lens and the seventh negative meniscus lens are cemented. The fourth lens unit G4 includes an eighth biconvex positive lens. A lens apex of a tenth surface is positioned on the object side farther than the aperture stop S.

An aspheric surface is used for six surfaces namely a surface on the image side of the second biconvex positive lens, both surfaces of the third biconcave negative lens, both surfaces of the fifth biconvex positive lens, and a surface toward the object side, of the eighth biconvex positive lens. Moreover, an eighth surface is a virtual surface.

Figure 3A:
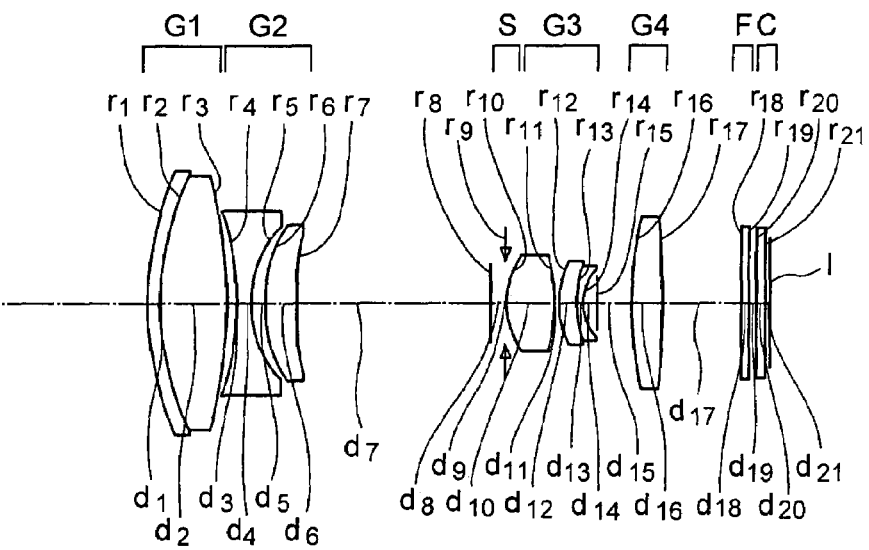
FIG. 3A, FIG. 3B, and FIG. 3C are diagrams similar to FIG. 1A, FIG. 1B, and FIG. 1C respectively, according to a third embodiment of the zoom lens system according to the present invention.
Figure 3B:
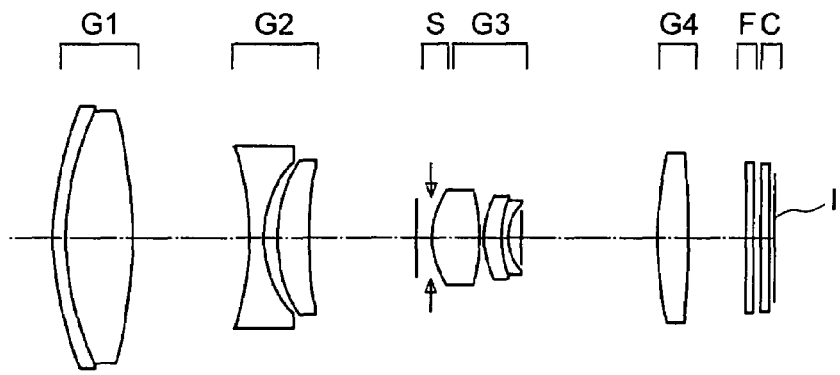
Figure 3C:
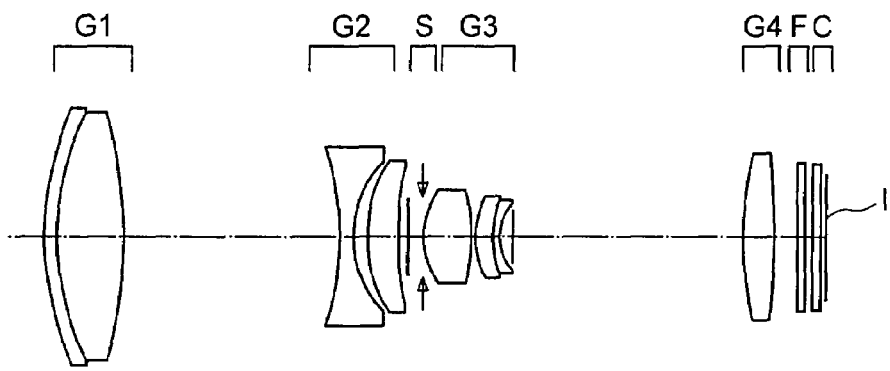

A zoom lens system in the third embodiment, as shown in FIG. 3A to FIG. 3C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, and a fourth positive meniscus lens having a convex surface directed toward the object side. The third lens unit G3 includes a fifth biconvex positive lens, a sixth positive meniscus lens having a convex surface directed toward the object side, and a seventh negative meniscus lens having a convex surface directed toward the object side. The sixth positive meniscus lens and the seventh negative meniscus lens are cemented. The fourth lens unit G4 includes an eighth biconvex positive lens. A lens apex of a tenth surface is positioned on the object side, farther than the aperture stop S.

An aspheric surface is used for six surfaces namely a surface on the image side of the second biconvex positive lens, both surfaces of the third biconcave negative lens, both surfaces of the fifth biconvex positive lens, and a surface toward the object side, of the eighth biconvex positive lens. Moreover, an eighth surface is a virtual surface.

Figure 4A:
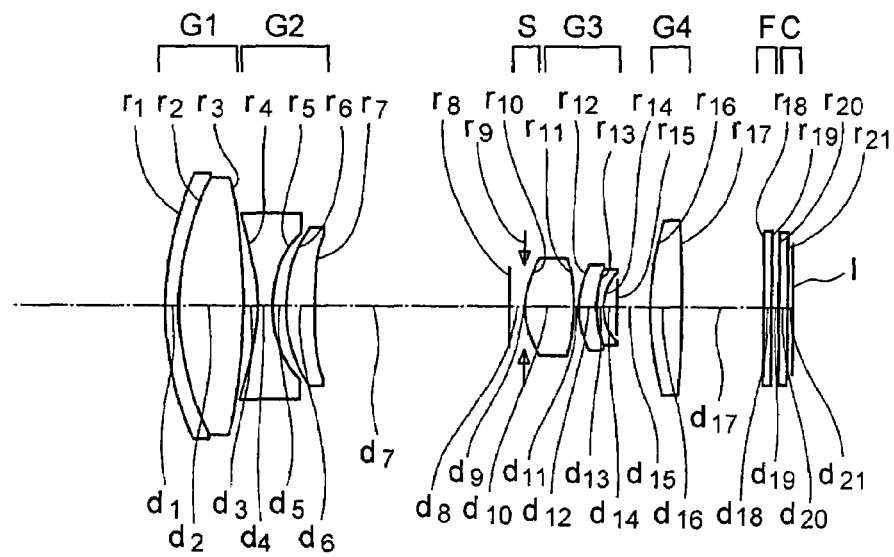
FIG. 4A, FIG. 4B, and FIG. 4C are diagrams similar to FIG. 1A, FIG. 1B, and FIG. 1C respectively, according to a fourth embodiment of the present invention.
Figure 4B:
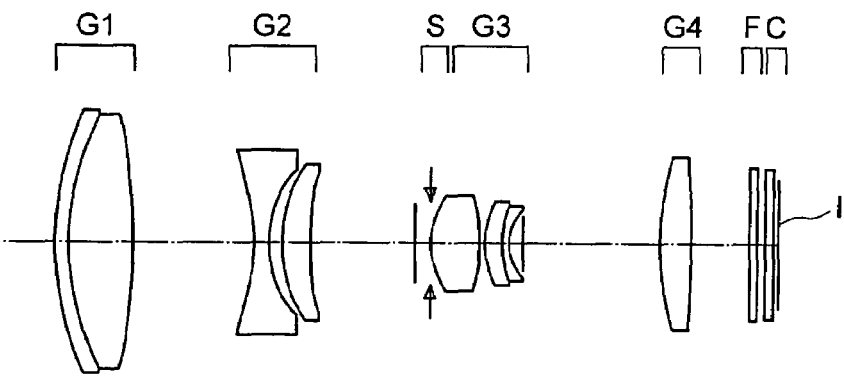
Figure 4C:
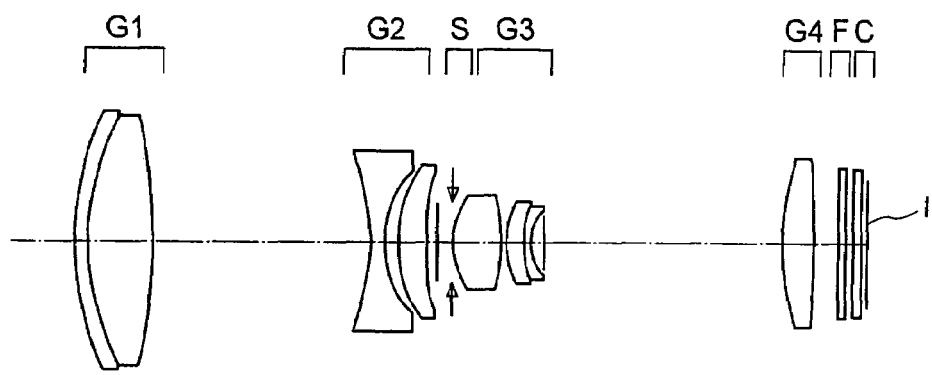

A zoom lens system in the fourth embodiment, as shown in FIG. 4A to FIG. 4C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, and a fourth positive meniscus lens having a convex surface directed toward the object side. The third lens unit G3 includes a fifth biconvex positive lens, a sixth positive meniscus lens having a convex surface directed toward the object side, and a seventh negative meniscus lens having a convex surface directed toward the object side. The sixth positive meniscus lens and the seventh negative meniscus lens are cemented. The fourth lens unit G4 includes an eighth biconvex positive lens. A lens apex of a tenth surface is positioned on the object side, farther than the aperture stop S.

An aspheric surface is used for six surfaces namely a surface on the image side of the second biconvex positive lens, both surfaces of the third biconcave negative lens, both surfaces of the fifth biconvex positive lens, and a surface toward the object side, of the eighth biconvex positive lens. Moreover, an eighth surface is a virtual surface.

Figure 5A:
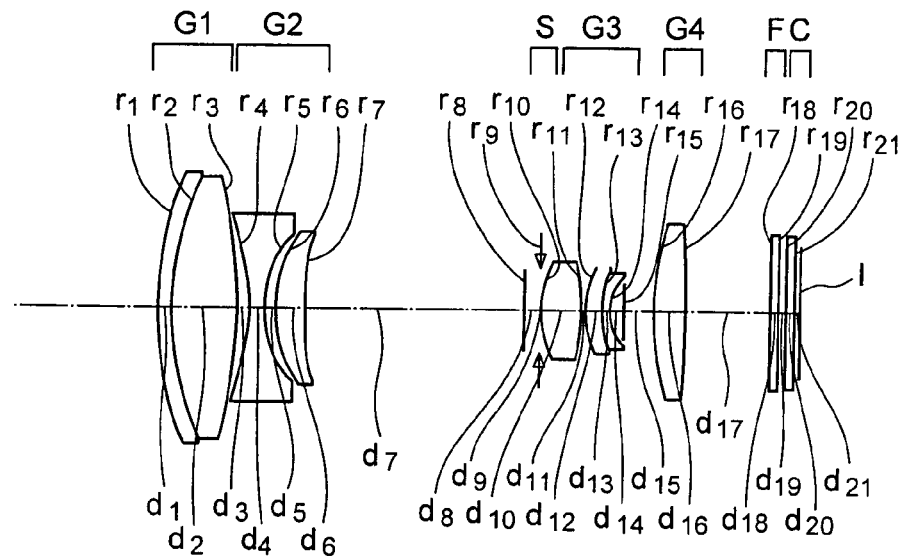
FIG. 5A, FIG. 5B, and FIG. 5C are diagrams similar to FIG. 1A, FIG. 1B, and FIG. 1C respectively, according to a fifth embodiment of the present invention.
Figure 5B:
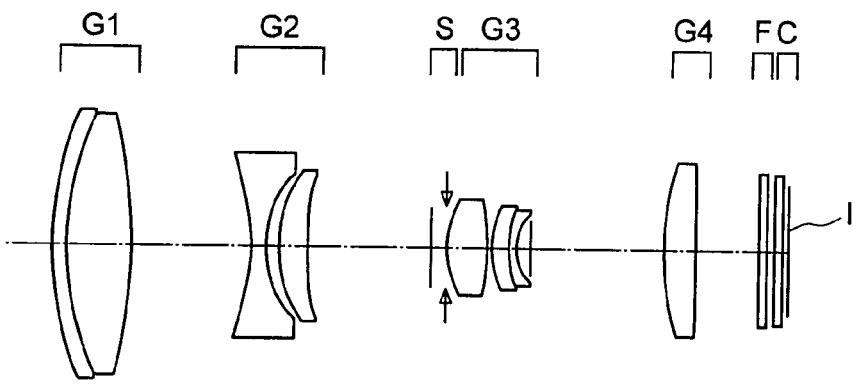
Figure 5C:
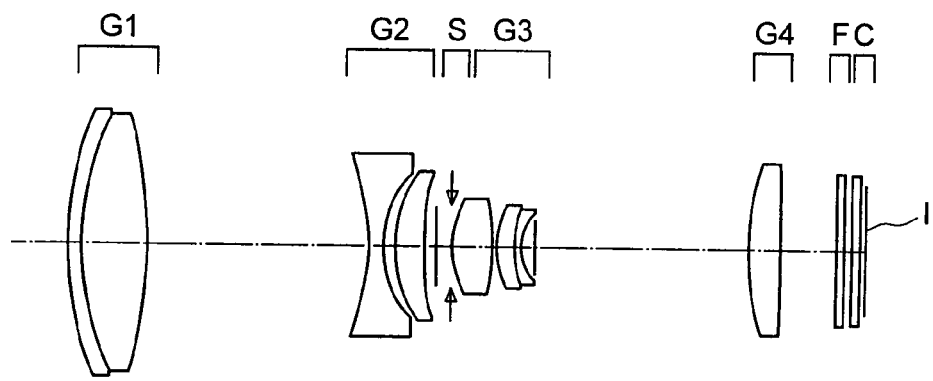

A zoom lens system in the fifth embodiment, as shown in FIG. 5A to FIG. 5C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, and a fourth positive meniscus lens having a convex surface directed toward the object side. The third lens unit G3 includes a fifth biconvex positive lens, a sixth positive meniscus lens having a convex surface directed toward the object side, and a seventh negative meniscus lens having a convex surface directed toward the object side. The sixth positive meniscus lens and the seventh negative meniscus lens are cemented. The fourth lens unit G4 includes an eighth biconvex positive lens. A lens apex of a tenth surface is positioned on the object side, farther than the aperture stop S.

An aspheric surface is used for six surfaces namely a surface on the image side of the second biconvex positive lens, both surfaces of the third biconcave negative lens, both surfaces of the fifth biconvex positive lens, and a surface toward the object side, of the eighth biconvex positive lens. Moreover, an eighth surface is a virtual surface.

Figure 6A:
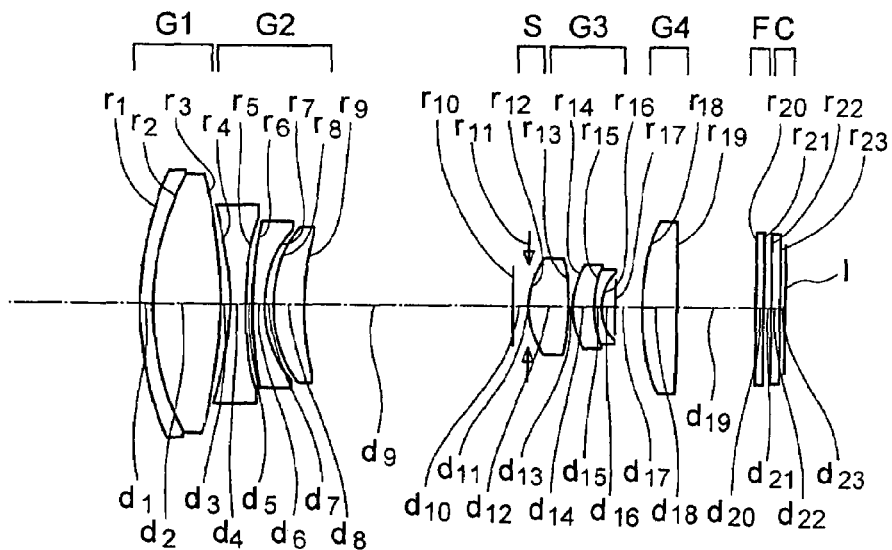
FIG. 6A, FIG. 6B, and FIG. 6C are diagrams similar to FIG. 1A, FIG. 1B, and FIG. 1C respectively, according to a sixth embodiment of the present invention.
Figure 6B:
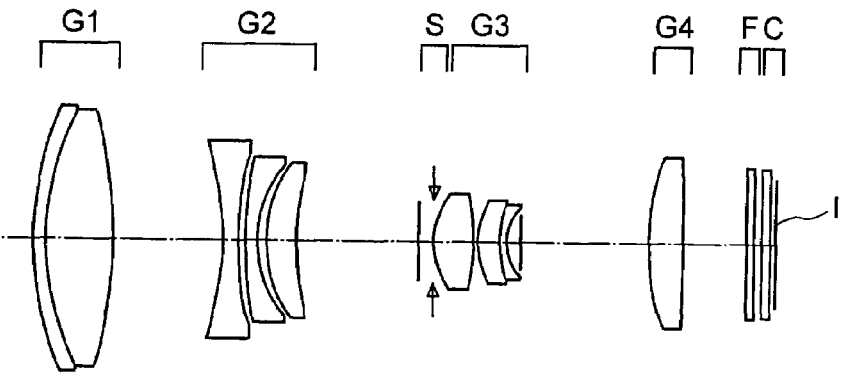
Figure 6C:
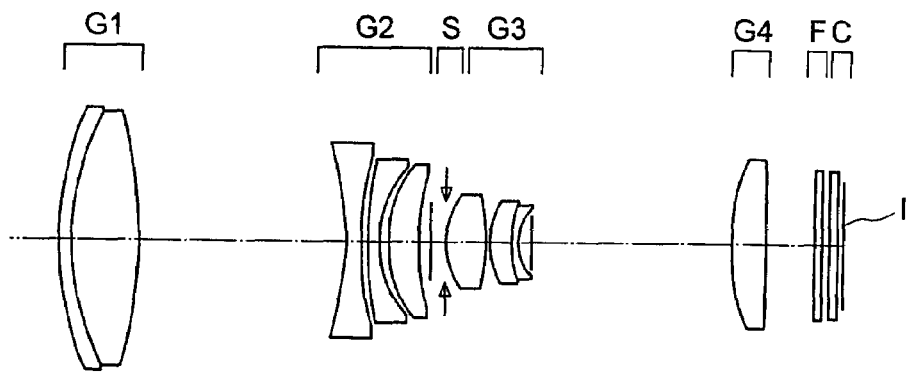

A zoom lens system in the sixth embodiment, as shown in FIG. 6A to FIG. 6C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, a fourth negative meniscus lens having a convex surface directed toward the object side, and a fifth positive meniscus lens having a convex surface directed toward the object side. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens. A lens apex of a twelfth surface is positioned on the object side, farther than the aperture stop S.

An aspheric surface is used for six surfaces namely a surface on the image side of the second biconvex positive lens, both surfaces of the third biconcave negative lens, both surfaces of the sixth biconvex positive lens, and a surface toward the object side, of the ninth biconvex positive lens. Moreover, a tenth surface is a virtual surface.

Figure 7A:
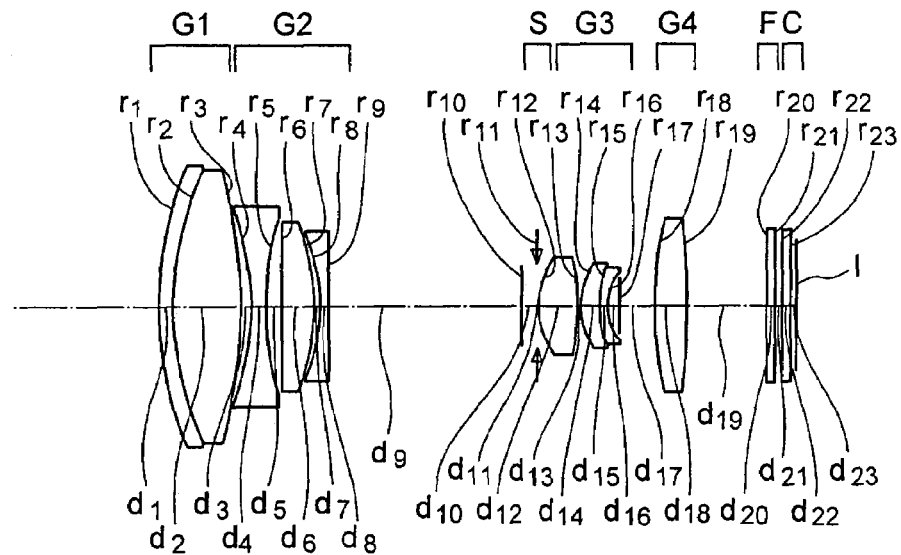
FIG. 7A, FIG. 7B, and FIG. 7C are diagrams similar to FIG. 1A, FIG. 1B, and FIG. 1C respectively, according to a seventh embodiment of the present invention.
Figure 7B:
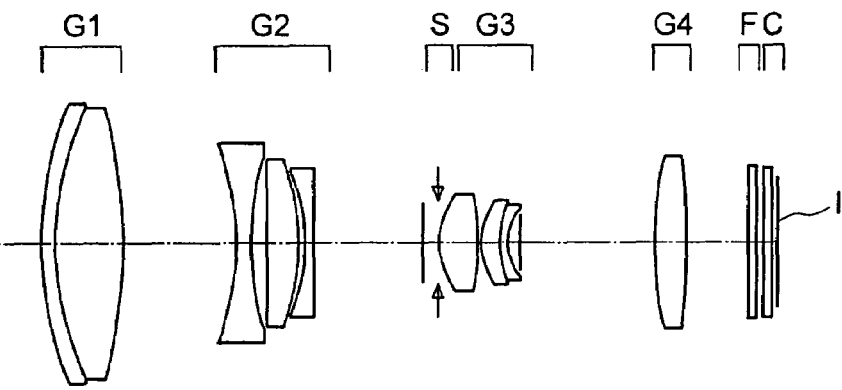
Figure 7C:
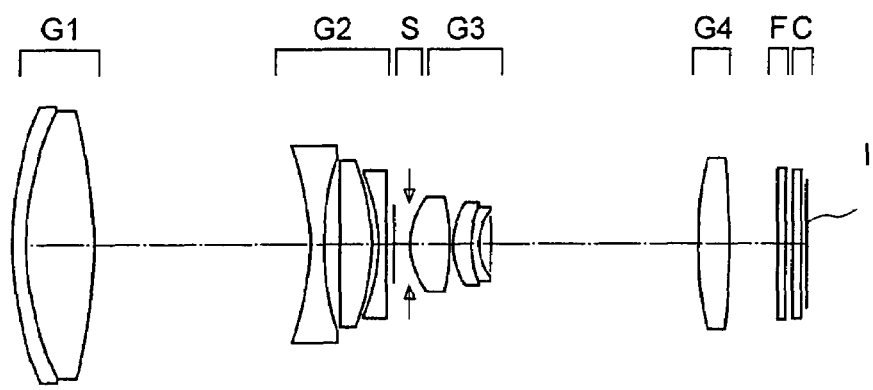

A zoom lens system in the seventh embodiment, as shown in FIG. 7A to FIG. 7C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, a fourth biconvex positive lens, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens. A lens apex of a twelfth surface is positioned on the object side, farther than the aperture stop S.

An aspheric surface is used for six surfaces namely a surface on the image side of the second biconvex positive lens, both surfaces of the third biconcave negative lens, both surfaces of the sixth biconvex positive lens, and a surface toward the object side, of the ninth biconvex positive lens. Moreover, a tenth surface is a virtual surface.

Figure 8A:
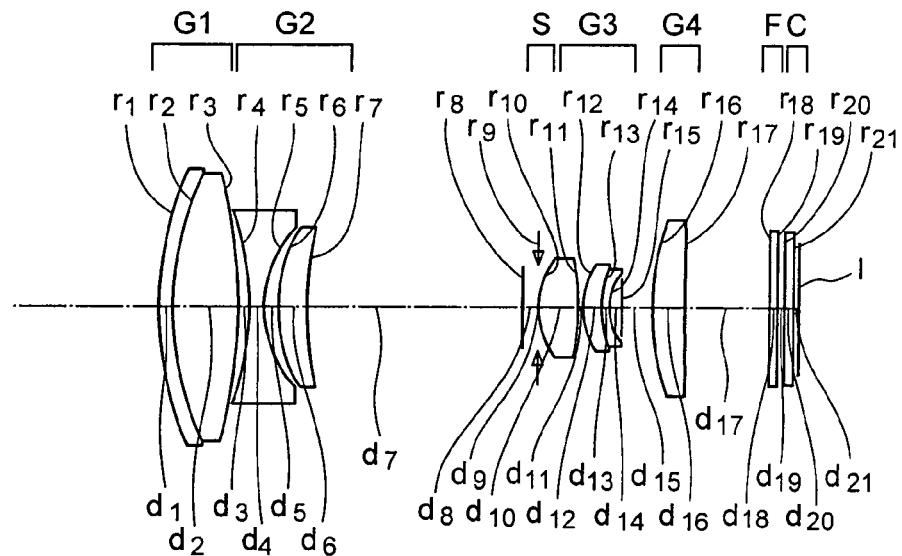
FIG. 8A, FIG. 8B, and FIG. 8C are diagrams similar to FIG. 1A, FIG. 1B, and FIG. 1C respectively, according to an eighth embodiment of the present invention.
Figure 8B:
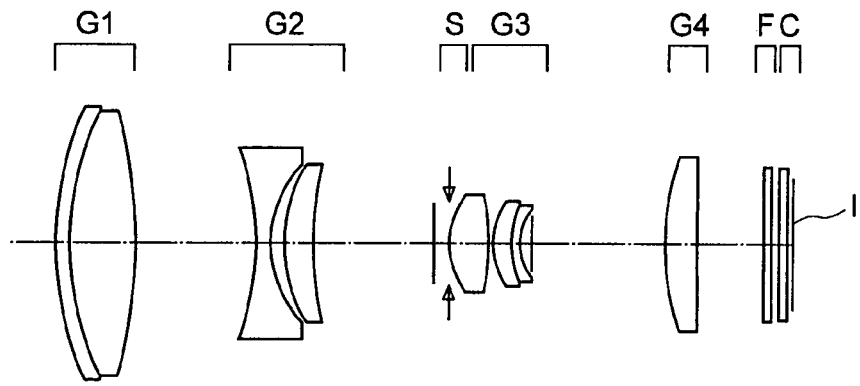
Figure 8C:
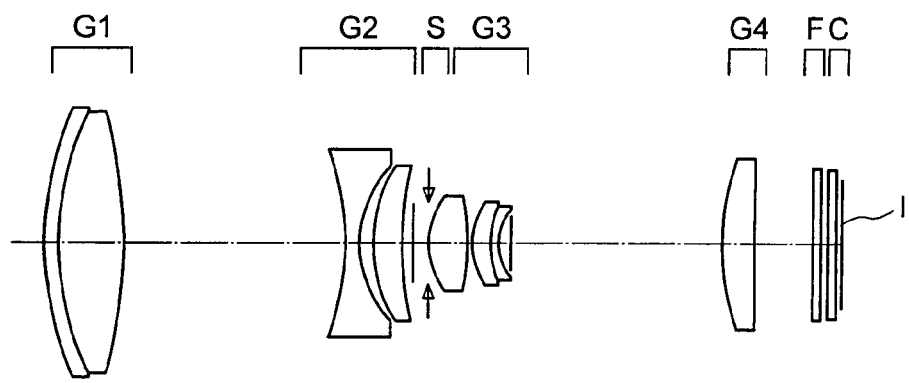

A zoom lens system in the eighth embodiment, as shown in FIG. 8A to FIG. 8C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, and a fourth positive meniscus lens having a convex surface directed toward the object side. The third lens unit G3 includes a fifth biconvex positive lens, a sixth positive meniscus lens having a convex surface directed toward the object side, and a seventh negative meniscus lens having a convex surface directed toward the object side. The sixth positive meniscus lens and the seventh negative meniscus lens are cemented. The fourth lens unit G4 includes an eighth biconvex positive lens. A lens apex of a tenth surface is positioned on the object side, farther than the aperture stop S.

An aspheric surface is used for six surfaces namely a surface on the image side of the second biconvex positive lens, both surfaces of the third biconcave negative lens, both surfaces of the fifth biconvex positive lens, and a surface toward the object side, of the eighth biconvex positive lens. Moreover, an eighth surface is a virtual surface.

Figure 9A:
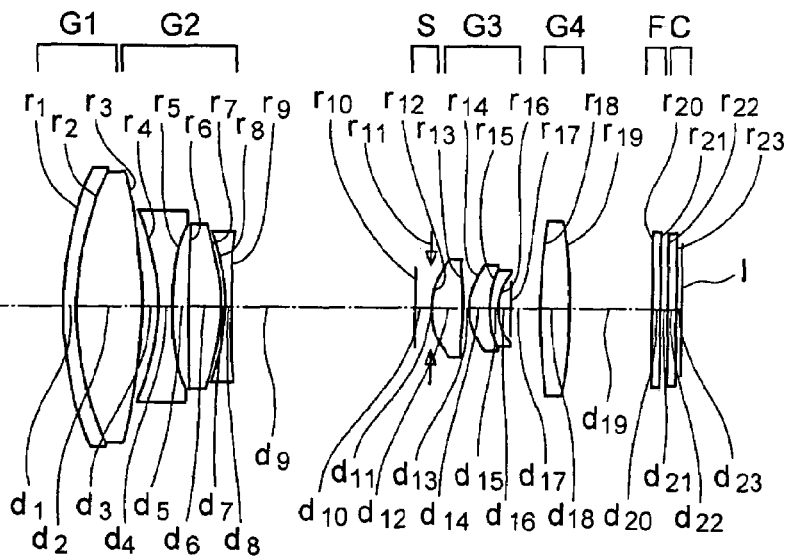
FIG. 9A, FIG. 9B, and FIG. 9C are diagrams similar to FIG. 1A, FIG. 1B, and FIG. 1C respectively, according to a ninth embodiment of the present invention.
Figure 9B:
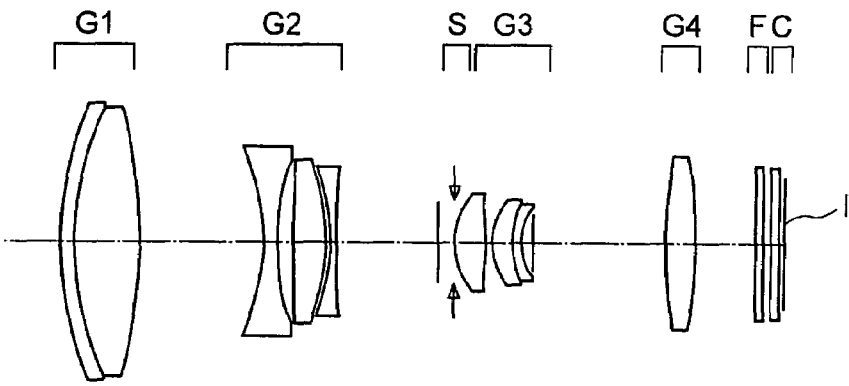
Figure 9C:
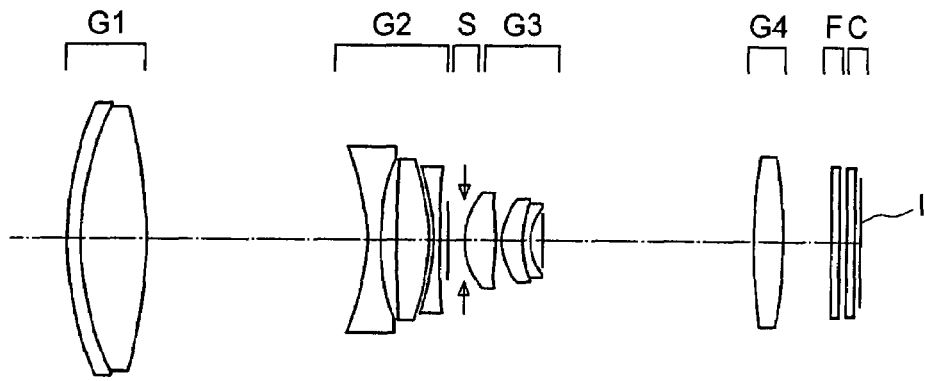
Figure 10A:
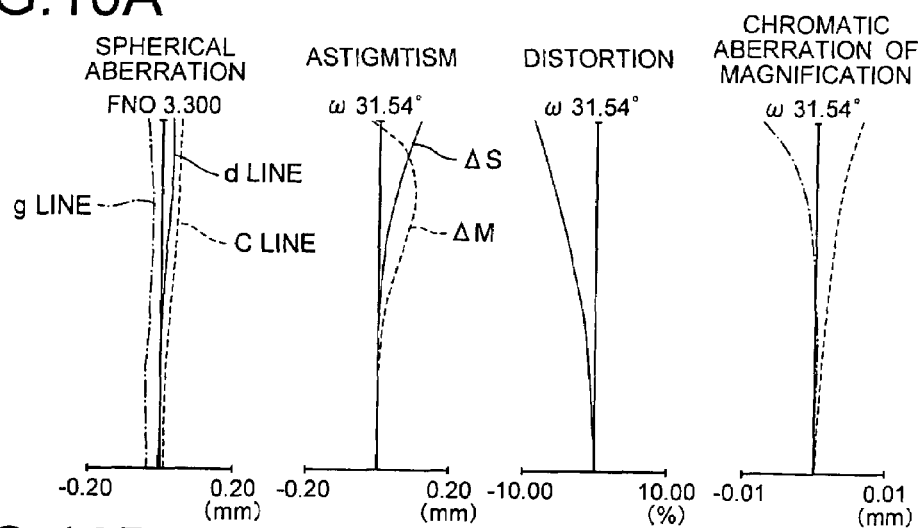
FIG. 10A, FIG. 10B, and FIG. 10C are diagrams showing a spherical aberration, an astigmatism, a distortion, and a chromatic aberration of magnification at the time of the infinite object point focusing, according to the first embodiment, where.
Figure 10B:
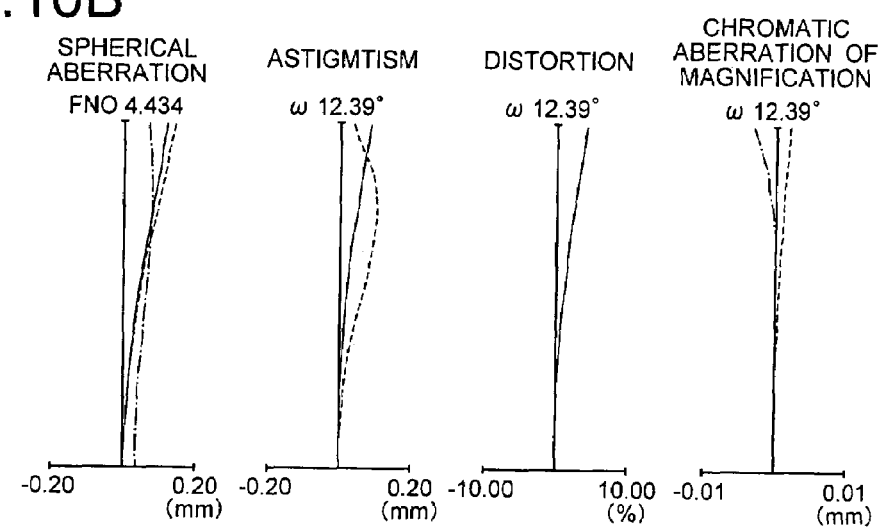
Figure 10C:
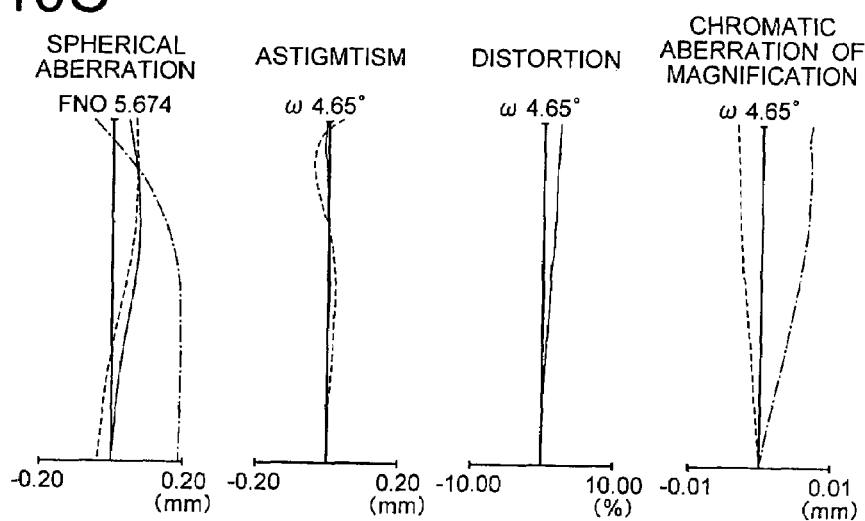
Figure 11A:
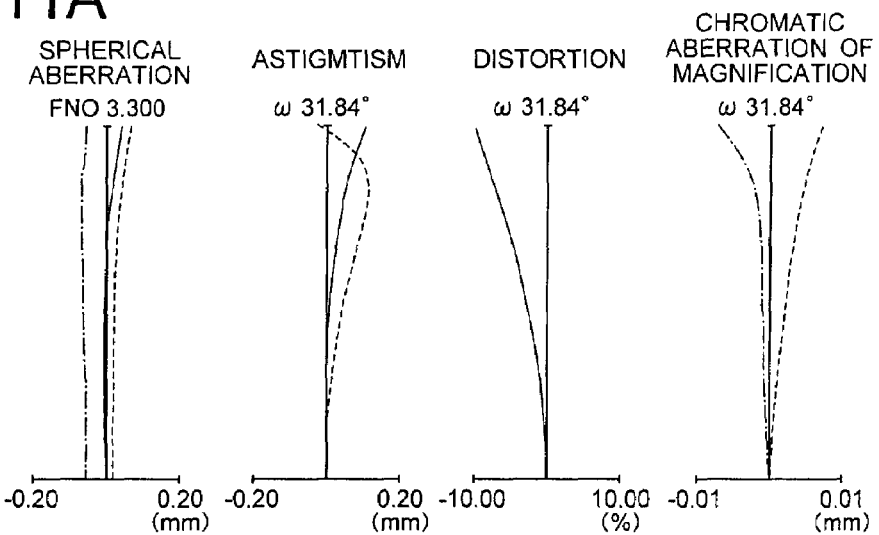
FIG. 11A, FIG. 11B, and FIG. 11C are diagrams similar to FIG. 10A, FIG. 10B, and FIG. 10C respectively, at the time of the infinite object point focusing, according to the second embodiment.
Figure 11B:
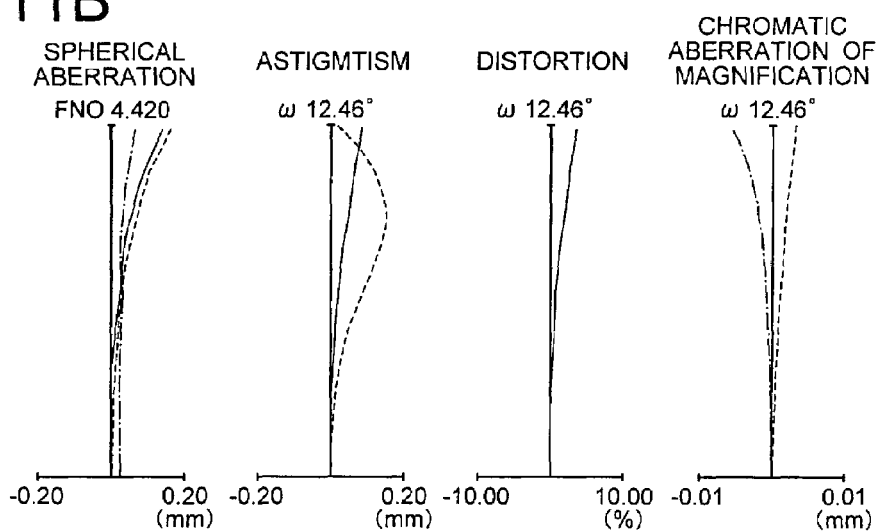
Figure 11C:
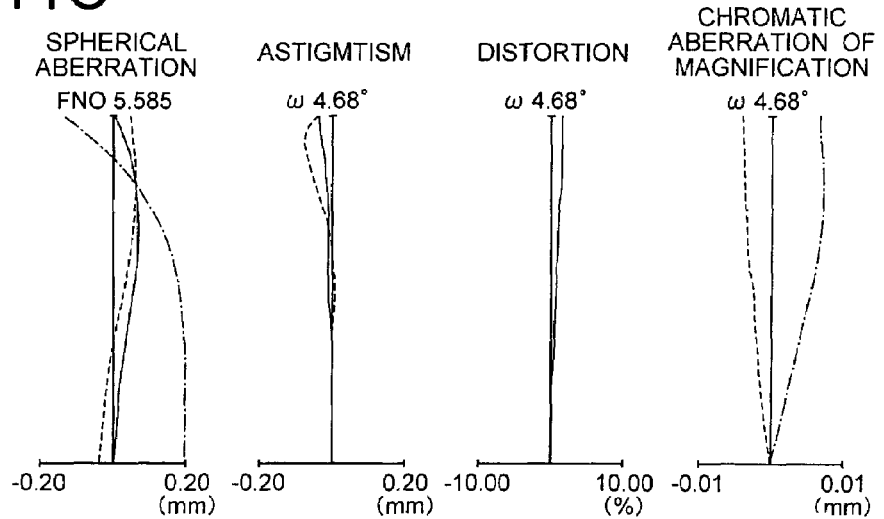
Figure 12A:
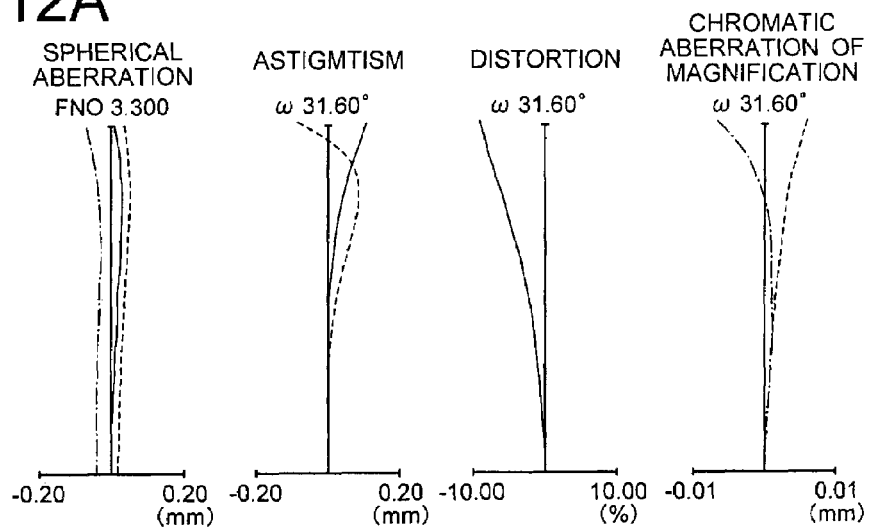
FIG. 12A, FIG. 12B, and FIG. 12C are diagrams similar to FIG. 10A, FIG. 10B, and FIG. 10C respectively, at the time of the infinite object point focusing, according to the third embodiment.
Figure 12B:
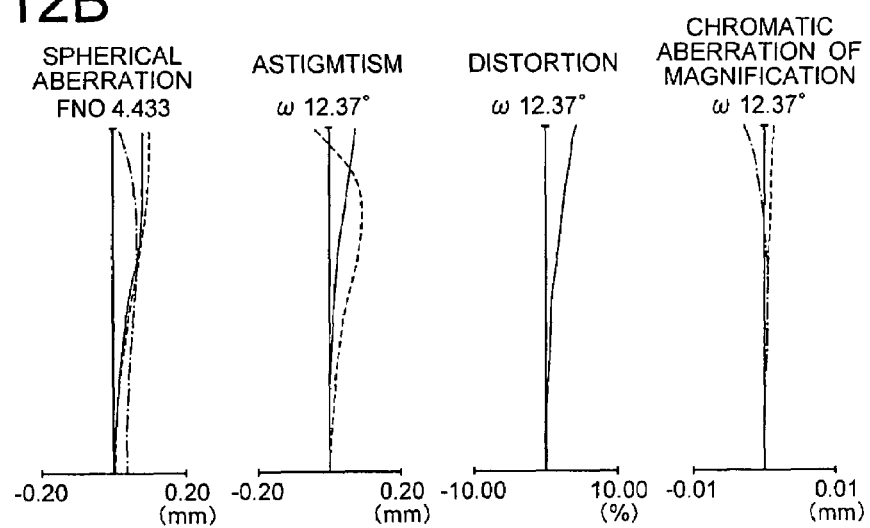
Figure 12C:
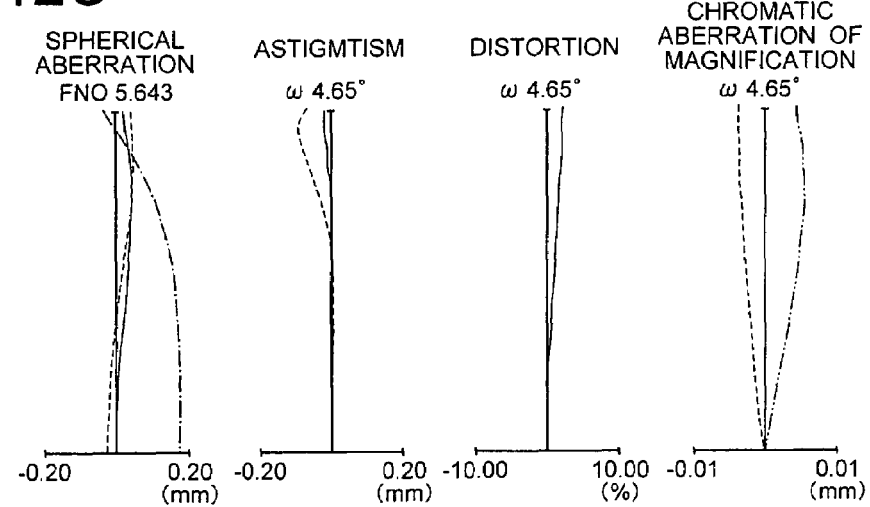
Figure 13A:
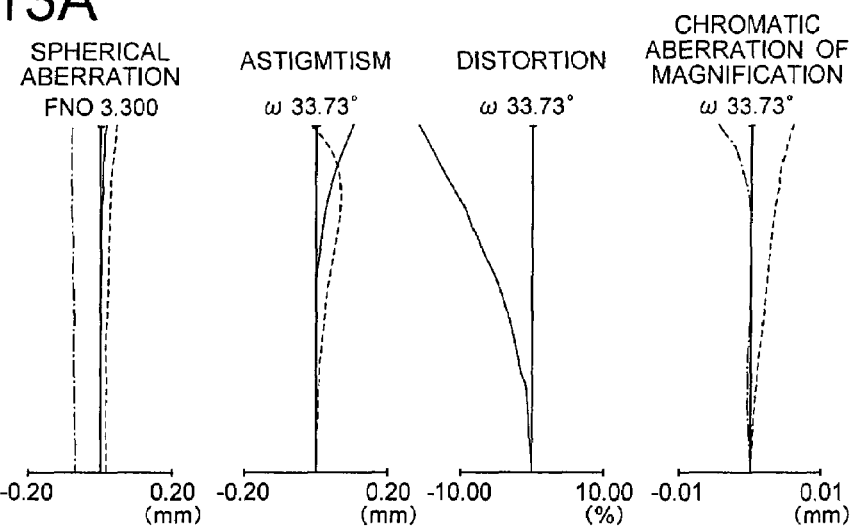
FIG. 13A, FIG. 13B, and FIG. 13C are diagrams similar to FIG. 10A, FIG. 10B, and FIG. 10C respectively, at the time of the infinite object point focusing, according to the fourth embodiment.
Figure 13B:
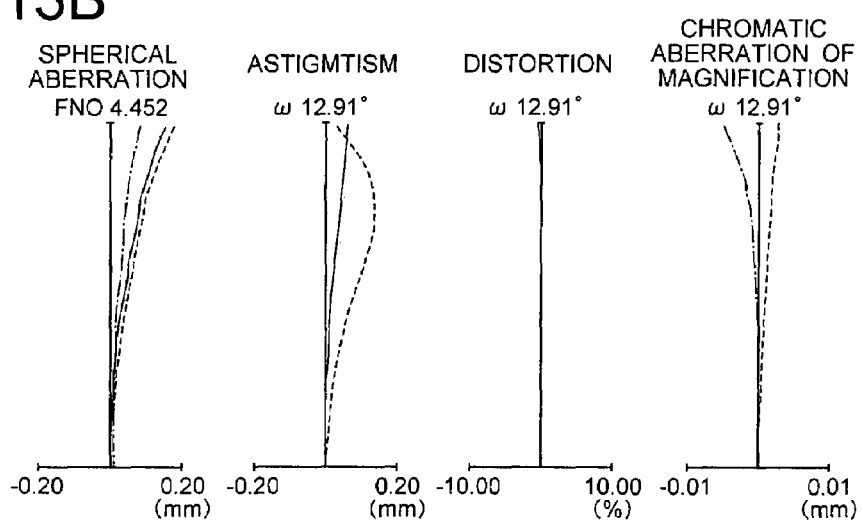
Figure 13C:
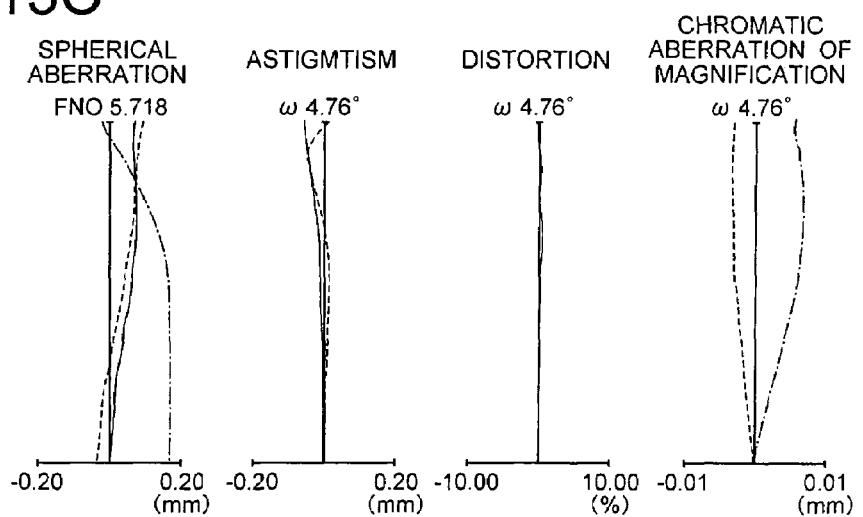
Figure 14A:
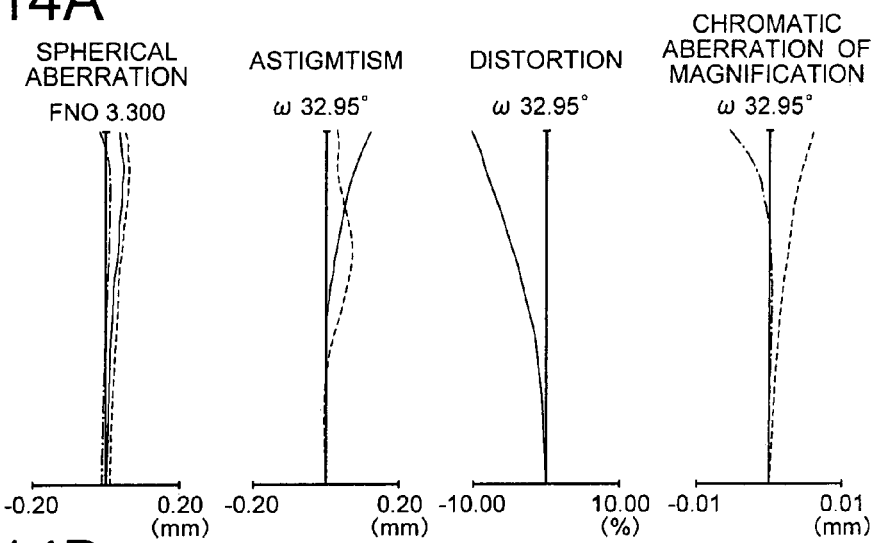
FIG. 14A, FIG. 14B, and FIG. 14C are diagrams similar to FIG. 10A, FIG. 10B, and FIG. 10C respectively, at the time of the infinite object point focusing, according to the fifth embodiment.
Figure 14B:
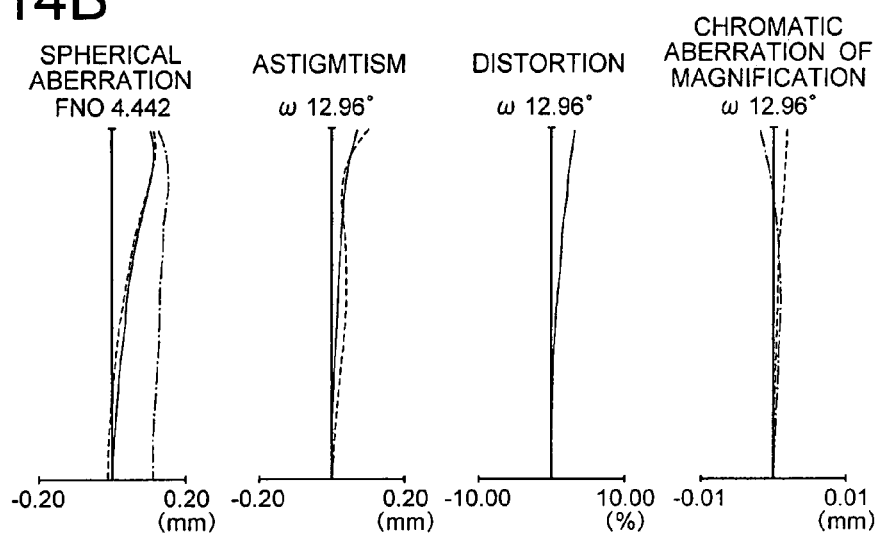
Figure 14C:
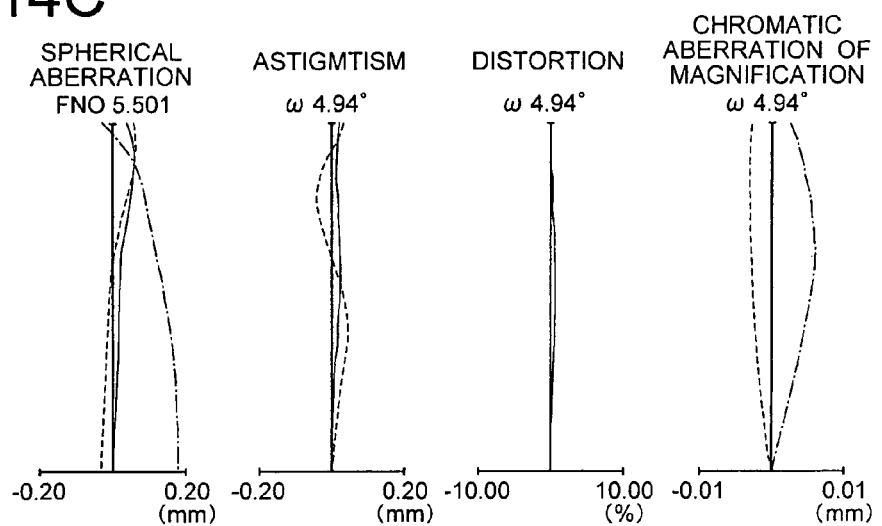
Figure 15A:
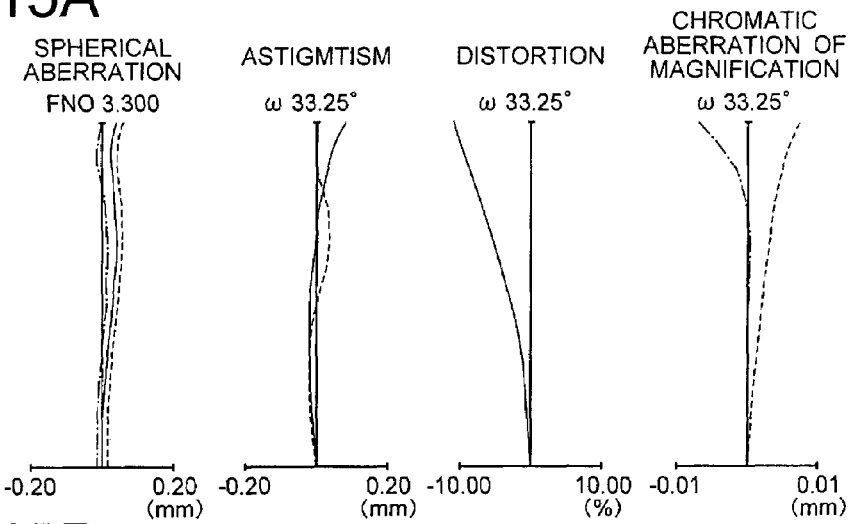
FIG. 15A, FIG. 15B, and FIG. 15C are diagrams similar to FIG. 10A, FIG. 10B, and FIG. 10C respectively, at the time of the infinite object point focusing, according to the sixth embodiment.
Figure 15B:
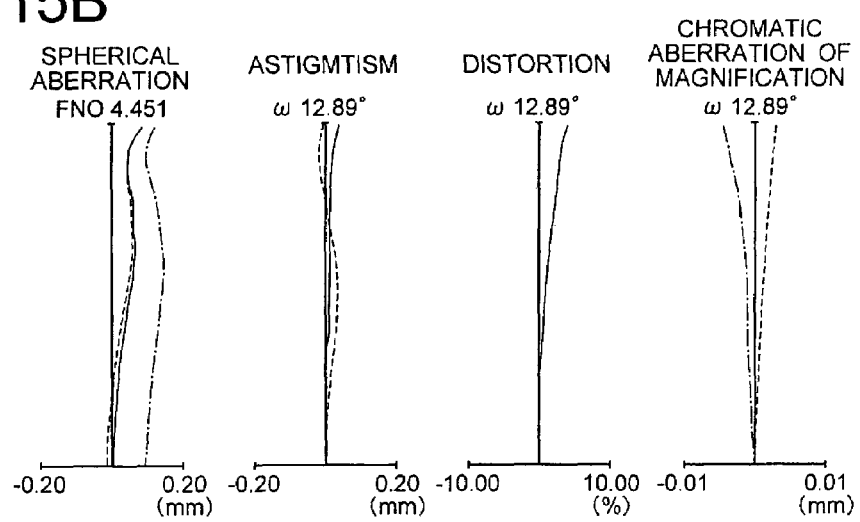
Figure 15C:
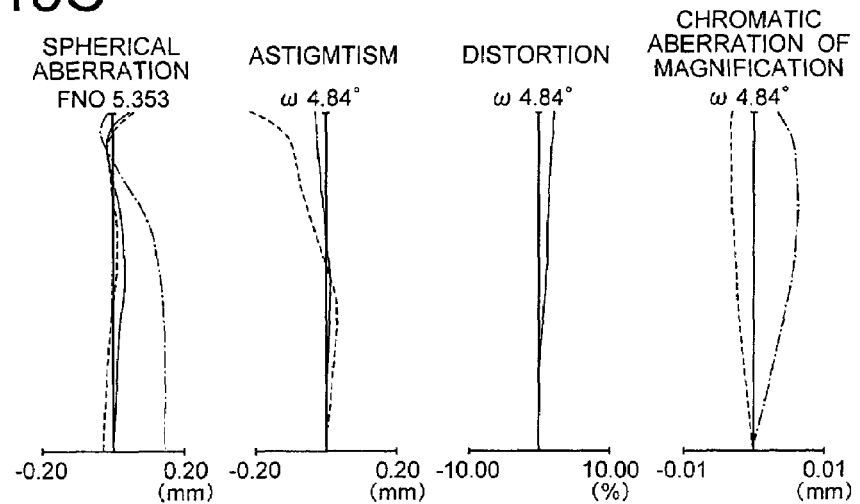
Figure 16A:
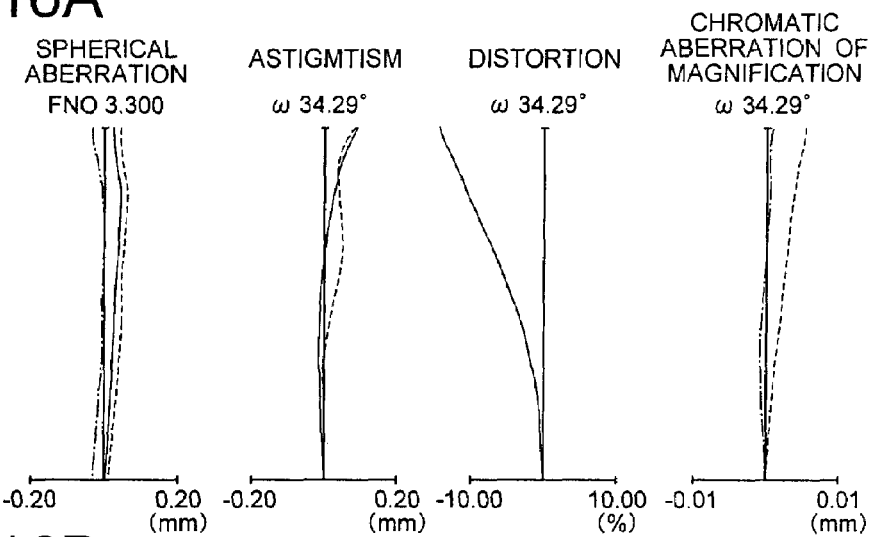
FIG. 16A, FIG. 16B, and FIG. 16C are diagrams similar to FIG. 10A, FIG. 10B, and FIG. 10C respectively, at the time of the infinite object point focusing, according to the seventh embodiment.
Figure 16B:
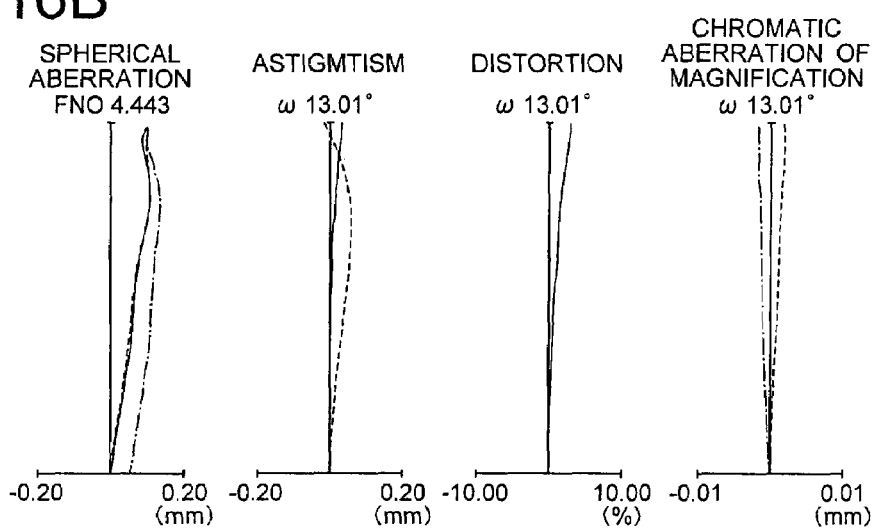
Figure 16C:
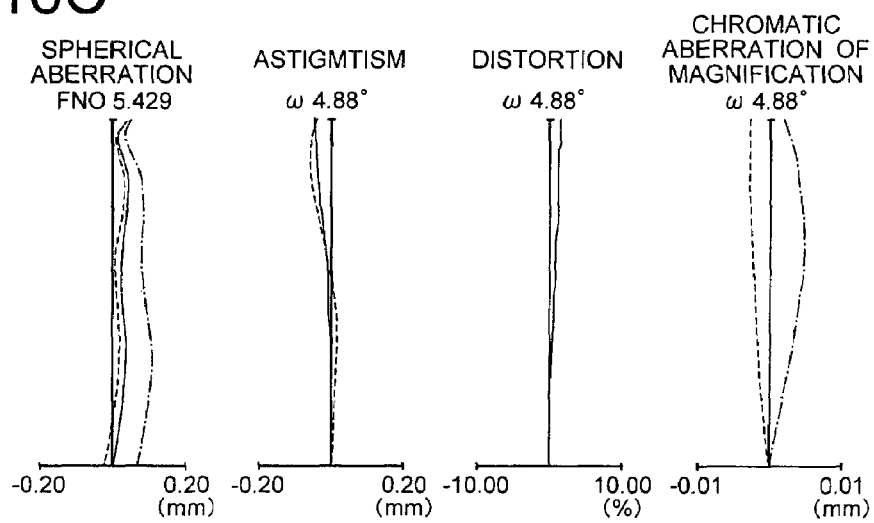
Figure 17A:
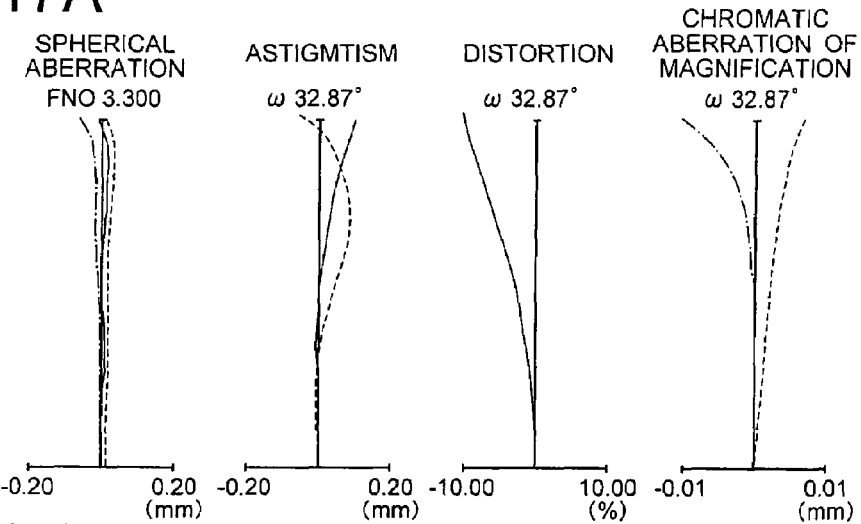
FIG. 17A, FIG. 17B, and FIG. 17C are diagrams similar to FIG. 10A, FIG. 10B, and FIG. 10C respectively, at the time of the infinite object point focusing, according to the eighth embodiment.
Figure 17B:
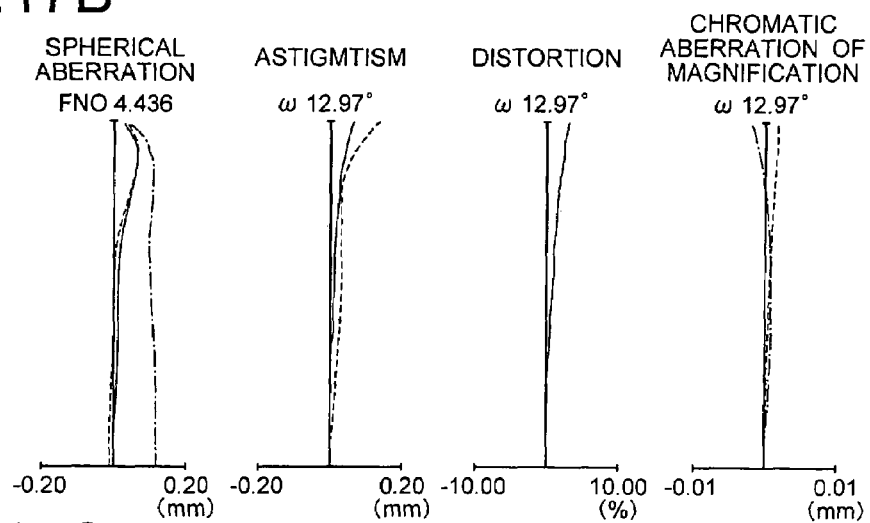
Figure 17C:
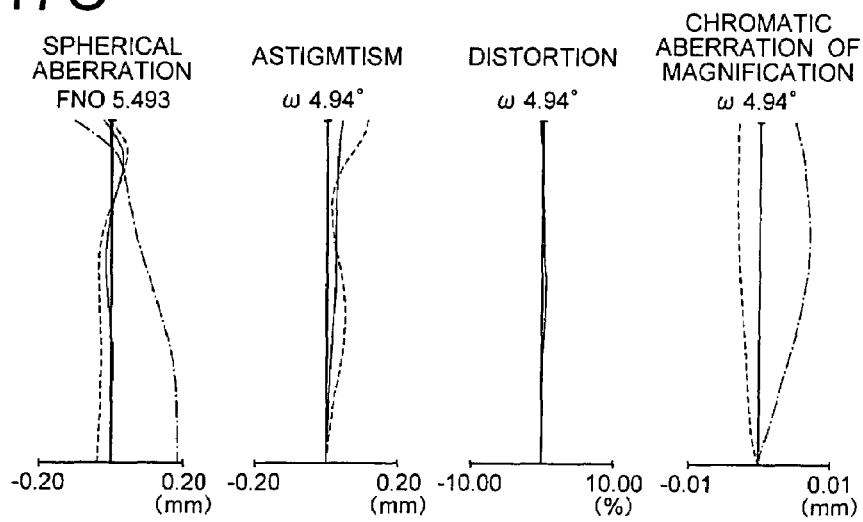
Figure 18A:
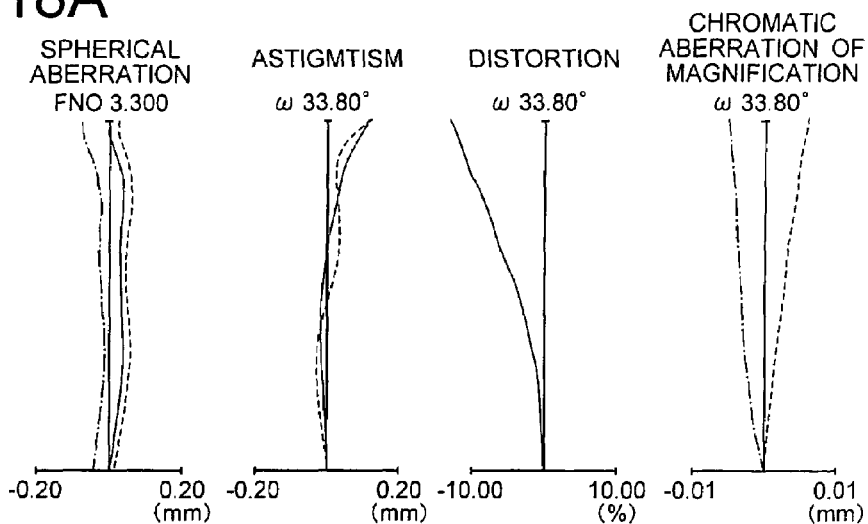
FIG. 18A, FIG. 18B, and FIG. 18C are diagrams similar to FIG. 10A, FIG. 10B, and FIG. 10C respectively, at the time of the infinite object point focusing, according to the ninth embodiment.
Figure 18B:
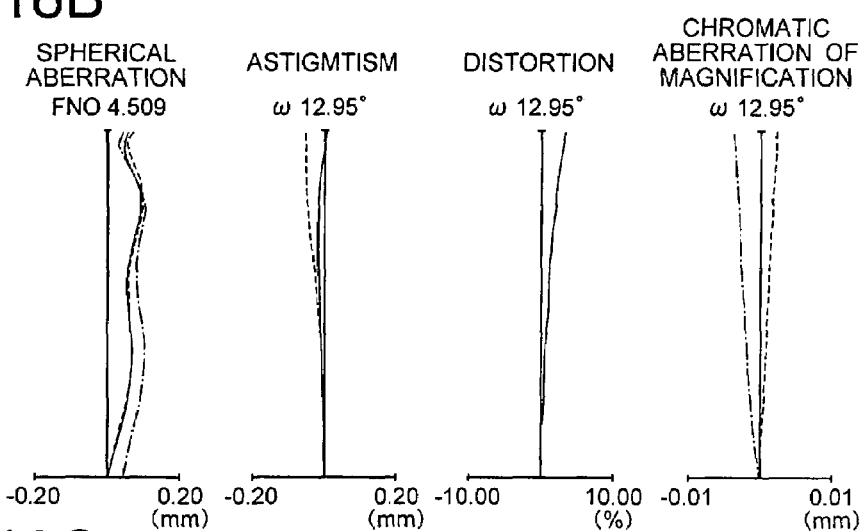
Figure 18C:
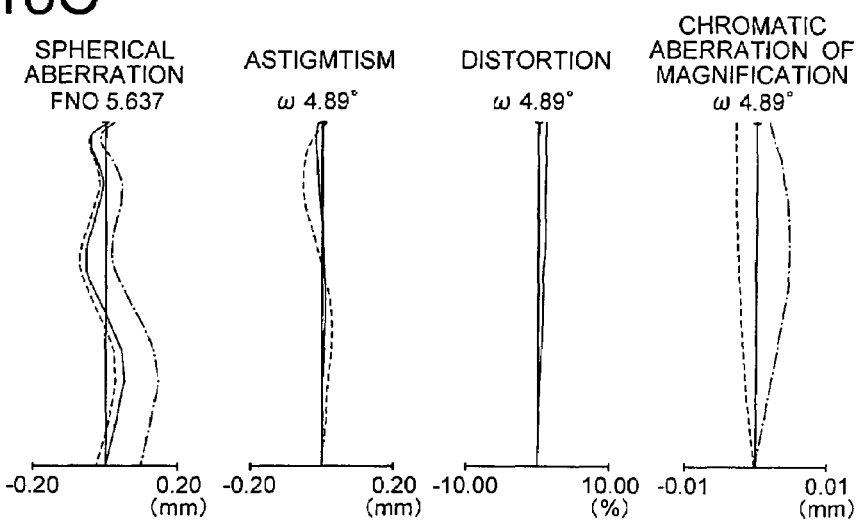

A zoom lens system in the ninth embodiment, as shown in FIG. 9A to FIG. 9C, includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S, toward the object side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, a fourth biconvex positive lens, and a fifth biconcave negative lens. The third lens unit G3 includes a sixth biconvex positive lens, a seventh positive meniscus lens having a convex surface directed toward the object side, and an eighth negative meniscus lens having a convex surface directed toward the image side. The seventh positive meniscus lens and the eighth negative meniscus lens are cemented. The fourth lens unit G4 includes a ninth biconvex positive lens. A lens apex of a twelfth surface is positioned on the object side, farther than the aperture stop S.

An aspheric surface is used for six surfaces namely a surface on the image side of the second biconvex positive lens, both surfaces of the third biconcave negative lens, both surfaces of the sixth biconvex positive lens, and a surface toward the object side, of the ninth biconvex positive lens. Moreover, a tenth surface is a virtual surface.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of $r_1, r_2, \ldots$ denotes radius of curvature of each lens surface, each of $d_1, d_2, \ldots$ denotes a distance between two lenses, each of $n_{d1}, n_{d2}, \ldots$ denotes a refractive index of each lens for a d-line, and each of $\nu_{d1}, \mu_{d2}, \ldots$ denotes an Abbe's number for each lens. When x is let to be an optical axis with a direction of traveling of light as a positive (direction), and y is let to be in a direction orthogonal to the optical axis, a shape of the aspheric surface is described by the following expression.

$$x=(y_2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, $A_4, A_6, A_8, A_{10}$, and $A_{12}$ denote aspherical coefficients of a fourth order, a sixth order, an eight order, a tenth order, and a twelfth order respectively. Moreover, in the aspherical coefficients, 'e–n' ('$e^{-n}$') (where, n is an integral number) indicates '$10^{-n}$'.

Further "A" means that the surface is an aspheric surface, and "S" means that the surface is an aperture stop.

Example 1

| | | | |
|---|---|---|---|
| $r_1 = 21.698$ | $d_1 = 0.80$ | $n_{d1} = 2.00170$ | $\nu_{d1} = 20.64$ |
| $r_2 = 17.688$ | $d_2 = 4.06$ | $n_{d2} = 1.49700$ | $\nu_{d2} = 81.54$ |
| $r_3 = -29.133$ (A) | $d_3 =$ (Variable) | | |
| $r_4 = -12.208$ (A) | $d_4 = 0.90$ | $n_{d3} = 1.80610$ | $\nu_{d3} = 40.88$ |
| $r_5 = 5.778$ (A) | $d_5 = 0.98$ | | |
| $r_6 = 9.168$ | $d_6 = 1.90$ | $n_{d4} = 1.92286$ | $\nu_{d4} = 18.90$ |
| $r_7 = 26.277$ | $d_7 =$ (Variable) | | |
| $r_8 = \infty$ | $d_8 = 0.98$ | | |
| $r_9 = \infty$ (S) | $d_9 = -0.10$ | | |
| $r_{10} = 4.600$ (A) | $d_{10} = 3.01$ | $n_{d5} = 1.49700$ | $\nu_{d5} = 81.54$ |
| $r_{11} = -11.717$ (A) | $d_{11} = 0.20$ | | |
| $r_{12} = 4.992$ | $d_{12} = 1.26$ | $n_{d6} = 1.60342$ | $\nu_{d6} = 38.03$ |
| $r_{13} = 8.287$ | $d_{13} = 0.39$ | $n_{d7} = 2.00330$ | $\nu_{d7} = 28.27$ |
| $r_{14} = 3.230$ | $d_{14} = 0.70$ | | |
| $r_{15} = \infty$ | $d_{15} =$ (Variable) | | |
| $r_{16} = 24.719$ (A) | $d_{16} = 1.93$ | $n_{d8} = 1.74330$ | $\nu_{d8} = 49.33$ |
| $r_{17} = -69.248$ | $d_{17} =$ (Variable) | | |
| $r_{18} = \infty$ | $d_{18} = 0.50$ | $n_{d9} = 1.51633$ | $\nu_{d9} = 64.14$ |
| $r_{19} = \infty$ | $d_{19} = 0.50$ | | |
| $r_{20} = \infty$ | $d_{20} = 0.50$ | $n_{d10} = 1.51633$ | $\nu_{d10} = 64.14$ |
| $r_{21} = \infty$ | $d_{21} = 0.37$ | | |
| $r_{22} = \infty$ | | | |
| (Light receiving surface of electronic image pickup apparatus, image plane) | | | |

Aspherical coefficients

3rd surface

K = 0.000
$A_4 = 3.82038e-05$
$A_6 = -8.48090e-08$
$A_8 = 3.61465e-10$

4th surface

K = 0.089
$A_4 = 4.60626e-05$
$A_6 = 1.28261e-05$
$A_8 = -1.58317e-07$

5th surface

K = -0.406
$A_4 = -5.63186e-04$
$A_6 = 8.35981e-06$
$A_8 = 2.80302e-07$

10th surface

K = -0.227
$A_4 = -1.01015e-03$
$A_6 = -2.49056e-05$

11th surface

K = 0.000
$A_4 = 6.04770e-04$
$A_6 = -2.94658e-05$
$A_8 = 1.98114e-06$

16th surface

K = 0.000
$A_4 = 1.18442e-04$
$A_6 = 3.01521e-06$
$A_8 = 4.62981e-07$
$A_{10} = -2.00000e-08$

Zoom data (∞)

| | WE | ST | TE |
|---|---|---|---|
| f (mm) | 6.88 | 16.85 | 46.28 |
| $F_{NO}$ | 3.30 | 4.43 | 5.67 |
| 2ω (°) | 63.08 | 24.77 | 9.31 |
| $d_3$ | 0.71 | 7.57 | 13.70 |

-continued

| | | | |
|---|---|---|---|
| $d_7$ | 12.31 | 6.87 | 0.60 |
| $d_{15}$ | 2.30 | 8.77 | 15.01 |
| $d_{17}$ | 5.06 | 3.68 | 1.50 |

Example 2

| | | | |
|---|---|---|---|
| $r_1 = 20.645$ | $d_1 = 0.80$ | $n_{d1} = 2.00170$ | $\nu_{d1} = 20.64$ |
| $r_2 = 16.835$ | $d_2 = 4.25$ | $n_{d2} = 1.49700$ | $\nu_{d2} = 81.54$ |
| $r_3 = -26.751$ (A) | $d_3 =$ (Variable) | | |
| $r_4 = -14.412$ (A) | $d_4 = 0.94$ | $n_{d3} = 1.88300$ | $\nu_{d3} = 40.76$ |
| $r_5 = 5.846$ (A) | $d_5 = 0.80$ | | |
| $r_6 = 8.130$ | $d_6 = 2.01$ | $n_{d4} = 1.92286$ | $\nu_{d4} = 18.90$ |
| $r_7 = 19.830$ | $d_7 =$ (Variable) | | |
| $r_8 = \infty$ | $d_8 = 0.98$ | | |
| $r_9 = \infty$ (S) | $d_9 = -0.10$ | | |
| $r_{10} = 4.569$ (A) | $d_{10} = 3.11$ | $n_{d5} = 1.49700$ | $\nu_{d5} = 81.54$ |
| $r_{11} = -12.606$ (A) | $d_{11} = 0.23$ | | |
| $r_{12} = 4.855$ | $d_{12} = 1.20$ | $n_{d6} = 1.60342$ | $\nu_{d6} = 38.03$ |
| $r_{13} = 7.083$ | $d_{13} = 0.39$ | $n_{d7} = 2.00330$ | $\nu_{d7} = 28.27$ |
| $r_{14} = 3.164$ | $d_{14} = 0.70$ | | |
| $r_{15} = \infty$ | $d_{15} =$ (Variable) | | |
| $r_{16} = 20.534$ (A) | $d_{16} = 2.09$ | $n_{d8} = 1.74330$ | $\nu_{d8} = 49.33$ |
| $r_{17} = -174.515$ | $d_{17} =$ (Variable) | | |
| $r_{18} = \infty$ | $d_{18} = 0.50$ | $n_{d9} = 1.51633$ | $\nu_{d9} = 64.14$ |
| $r_{19} = \infty$ | $d_{19} = 0.50$ | | |
| $r_{20} = \infty$ | $d_{20} = 0.50$ | $n_{d10} = 1.51633$ | $\nu_{d10} = 64.14$ |
| $r_{21} = \infty$ | $d_{21} = 0.37$ | | |
| $r_{22} = \infty$ | | | |
| (Light receiving surface of electronic image pickup apparatus, image plane) | | | |

Aspherical coefficients

3rd surface

K = 0.000
$A_4 = 4.69441e-05$
$A_6 = -1.14534e-07$
$A_8 = 4.94209e-10$

4th surface

K = 0.089
$A_4 = -1.91915e-04$
$A_6 = 1.92984e-05$
$A_8 = -2.28818e-07$

5th surface

K = -0.406
$A_4 = -5.68873e-04$
$A_6 = 7.83764e-06$
$A_8 = 6.33582e-07$

10th surface

K = -0.227
$A_4 = -9.38774e-04$
$A_6 = -2.98017e-05$

11th surface

K = 0.000
$A_4 = 6.11227e-04$
$A_6 = -3.00252e-05$
$A_8 = 1.85735e-06$

16th surface

K = 0.000
$A_4 = 2.12280e-04$
$A_6 = -2.82589e-06$
$A_8 = 6.55635e-07$
$A_{10} = -2.00000e-08$

Zoom data (∞)

| | WE | ST | TE |
|---|---|---|---|
| f (mm) | 6.88 | 16.84 | 46.28 |
| $F_{NO}$ | 3.30 | 4.42 | 5.59 |

-continued

| | | | |
|---|---|---|---|
| 2ω (°) | 63.68 | 24.93 | 9.36 |
| $d_3$ | 0.50 | 6.97 | 12.70 |
| $d_7$ | 12.16 | 7.05 | 0.99 |
| $d_{15}$ | 2.22 | 8.72 | 14.86 |
| $d_{17}$ | 5.09 | 3.81 | 1.61 |

Example 3

| | | | |
|---|---|---|---|
| $r_1 = 22.538$ | $d_1 = 0.80$ | $n_{d1} = 2.00170$ | $\nu_{d1} = 20.64$ |
| $r_2 = 18.176$ | $d_2 = 4.07$ | $n_{d2} = 1.49700$ | $\nu_{d2} = 81.54$ |
| $r_3 = -27.449$ (A) | $d_3 =$ (Variable) | | |
| $r_4 = -11.281$ (A) | $d_4 = 0.90$ | $n_{d3} = 1.80610$ | $\nu_{d3} = 40.88$ |
| $r_5 = 6.540$ (A) | $d_5 = 0.99$ | | |
| $r_6 = 10.399$ | $d_6 = 1.88$ | $n_{d4} = 2.10227$ | $\nu_{d4} = 17.10$ |
| $r_7 = 22.503$ | $d_7 =$ (Variable) | | |
| $r_8 = \infty$ | $d_8 = 0.98$ | | |
| $r_9 = \infty$ (S) | $d_9 = -0.10$ | | |
| $r_{10} = 4.505$ (A) | $d_{10} = 3.06$ | $n_{d5} = 1.49700$ | $\nu_{d5} = 81.54$ |
| $r_{11} = -11.895$ (A) | $d_{11} = 0.22$ | | |
| $r_{12} = 5.146$ | $d_{12} = 1.18$ | $n_{d6} = 1.60342$ | $\nu_{d6} = 38.03$ |
| $r_{13} = 7.646$ | $d_{13} = 0.39$ | $n_{d7} = 2.00330$ | $\nu_{d7} = 28.27$ |
| $r_{14} = 3.245$ | $d_{14} = 0.70$ | | |
| $r_{15} = \infty$ | $d_{15} =$ (Variable) | | |
| $r_{16} = 24.762$ (A) | $d_{16} = 2.06$ | $n_{d8} = 1.74330$ | $\nu_{d8} = 49.33$ |
| $r_{17} = -66.758$ | $d_{17} =$ (Variable) | | |
| $r_{18} = \infty$ | $d_{18} = 0.50$ | $n_{d9} = 1.51633$ | $\nu_{d9} = 64.14$ |
| $r_{19} = \infty$ | $d_{19} = 0.50$ | | |
| $r_{20} = \infty$ | $d_{20} = 0.50$ | $n_{d10} = 1.51633$ | $\nu_{d10} = 64.14$ |
| $r_{21} = \infty$ | $d_{21} = 0.37$ | | |
| $r_{22} = \infty$ | | | |
| (Light receiving surface of electronic image pickup apparatus, image plane) | | | |

Aspherical coefficients

3rd surface

K = 0.000
$A_4 = 3.92559e-05$
$A_6 = -6.29929e-08$
$A_8 = 2.03948e-10$

4th surface

K = 0.089
$A_4 = 2.03912e-04$
$A_6 = 1.01180e-05$
$A_8 = -1.28824e-07$

5th surface

K = -0.406
$A_4 = -3.80310e-04$
$A_6 = 1.04953e-05$
$A_8 = 2.29140e-07$

10th surface

K = -0.227
$A_4 = -1.05417e-03$
$A_6 = -2.31881e-05$

11th surface

K = 0.000
$A_4 = 6.50102e-04$
$A_6 = -2.65162e-05$
$A_8 = 1.92181e-06$

16th surface

K = 0.000
$A_4 = 1.47469e-04$
$A_6 = -1.30252e-06$
$A_8 = 6.46852e-07$
$A_{10} = -2.00000e-08$

-continued

Zoom data (∞)

| | WE | ST | TE |
|---|---|---|---|
| f (mm) | 6.88 | 16.85 | 46.29 |
| $F_{NO}$ | 3.30 | 4.43 | 5.64 |
| 2ω (°) | 63.19 | 24.73 | 9.31 |
| $d_3$ | 0.68 | 7.52 | 13.70 |
| $d_7$ | 12.42 | 6.96 | 0.69 |
| $d_{15}$ | 2.28 | 8.77 | 14.93 |
| $d_{17}$ | 5.03 | 3.69 | 1.50 |

Example 4

| | | | |
|---|---|---|---|
| $r_1$ = 20.479 | $d_1$ = 0.80 | $n_{d1}$ = 2.00170 | $ν_{d1}$ = 20.64 |
| $r_2$ = 16.826 | $d_2$ = 4.06 | $n_{d2}$ = 1.49700 | $ν_{d2}$ = 81.54 |
| $r_3$ = −32.919 (A) | $d_3$ = (Variable) | | |
| $r_4$ = −11.994 (A) | $d_4$ = 0.91 | $n_{d3}$ = 1.83481 | $ν_{d3}$ = 42.71 |
| $r_5$ = 6.532 (A) | $d_5$ = 0.78 | | |
| $r_6$ = 8.849 | $d_6$ = 1.86 | $n_{d4}$ = 1.92286 | $ν_{d4}$ = 18.90 |
| $r_7$ = 21.254 | $d_7$ = (Variable) | | |
| $r_8$ = ∞ | $d_8$ = 0.98 | | |
| $r_9$ = ∞ (S) | $d_9$ = −0.10 | | |
| $r_{10}$ = 5.038 (A) | $d_{10}$ = 3.14 | $n_{d5}$ = 1.49700 | $ν_{d5}$ = 81.54 |
| $r_{11}$ = −11.062 (A) | $d_{11}$ = 0.29 | | |
| $r_{12}$ = 5.130 | $d_{12}$ = 1.25 | $n_{d6}$ = 1.60342 | $ν_{d6}$ = 38.03 |
| $r_{13}$ = 8.213 | $d_{13}$ = 0.39 | $n_{d7}$ = 2.00330 | $ν_{d7}$ = 28.27 |
| $r_{14}$ = 3.497 | $d_{14}$ = 0.70 | | |
| $r_{15}$ = ∞ | $d_{15}$ = (Variable) | | |
| $r_{16}$ = 22.108 (A) | $d_{16}$ = 1.98 | $n_{d8}$ = 1.74330 | $ν_{d8}$ = 49.33 |
| $r_{17}$ = −144.779 | $d_{17}$ = (Variable) | | |
| $r_{18}$ = ∞ | $d_{18}$ = 0.50 | $n_{d9}$ = 1.51633 | $ν_{d9}$ = 64.14 |
| $r_{19}$ = ∞ | $d_{19}$ = 0.50 | | |
| $r_{20}$ = ∞ | $d_{20}$ = 0.50 | $n_{d10}$ = 1.51633 | $ν_{d10}$ = 64.14 |
| $r_{21}$ = ∞ | $d_{21}$ = 0.37 | | |
| $r_{22}$ = ∞ | | | |
| (Light receiving surface of electronic image pickup apparatus, image plane) | | | |

Aspherical coefficients

3rd surface

K = 0.000
$A_4$ = 3.03379e−05
$A_6$ = −5.30314e−08
$A_8$ = 2.38853e−10

4th surface

K = 0.089
$A_4$ = −4.93344e−05
$A_6$ = 1.67517e−05
$A_8$ = −1.98391e−07

5th surface

K = −0.406
$A_4$ = −4.16293e−04
$A_6$ = 9.24712e−06
$A_8$ = 4.77141e−07

10th surface

K = −0.227
$A_4$ = −8.15716e−04
$A_6$ = −2.26164e−05

11th surface

K = 0.000
$A_4$ = 6.46494e−04
$A_6$ = −3.54167e−05
$A_8$ = 1.87547e−06

16th surface

K = 0.000
$A_4$ = 2.61106e−04
$A_6$ = −1.49917e−06

$A_8$ = 6.34056e−07
$A_{10}$ = −2.00000e−08

Zoom data (∞)

| | WE | ST | TE |
|---|---|---|---|
| f (mm) | 6.88 | 16.85 | 46.28 |
| $F_{NO}$ | 3.30 | 4.45 | 5.72 |
| 2ω (°) | 67.46 | 25.81 | 9.52 |
| $d_3$ | 0.86 | 7.53 | 13.70 |
| $d_7$ | 12.34 | 6.75 | 0.63 |
| $d_{15}$ | 2.15 | 8.73 | 15.24 |
| $d_{17}$ | 5.07 | 3.69 | 1.43 |

Example 5

| | | | |
|---|---|---|---|
| $r_1$ = 23.668 | $d_1$ = 0.80 | $n_{d1}$ = 2.00170 | $ν_{d1}$ = 20.64 |
| $r_2$ = 19.590 | $d_2$ = 3.98 | $n_{d2}$ = 1.49700 | $ν_{d2}$ = 81.54 |
| $r_3$ = −27.384 (A) | $d_3$ = (Variable) | | |
| $r_4$ = −12.598 (A) | $d_4$ = 0.91 | $n_{d3}$ = 1.83481 | $ν_{d3}$ = 42.71 |
| $r_5$ = 6.347 (A) | $d_5$ = 0.91 | | |
| $r_6$ = 9.462 | $d_6$ = 1.88 | $n_{d4}$ = 1.92286 | $ν_{d4}$ = 18.90 |
| $r_7$ = 25.431 | $d_7$ = (Variable) | | |
| $r_8$ = ∞ | $d_8$ = 0.98 | | |
| $r_9$ = ∞ (S) | $d_9$ = −0.10 | | |
| $r_{10}$ = 4.380 (A) | $d_{10}$ = 2.64 | $n_{d5}$ = 1.49700 | $ν_{d5}$ = 81.54 |
| $r_{11}$ = −11.978 (A) | $d_{11}$ = 0.21 | | |
| $r_{12}$ = 5.009 | $d_{12}$ = 1.17 | $n_{d6}$ = 1.51742 | $ν_{d6}$ = 52.43 |
| $r_{13}$ = 6.232 | $d_{13}$ = 0.40 | $n_{d7}$ = 2.00330 | $ν_{d7}$ = 28.27 |
| $r_{14}$ = 3.071 | $d_{14}$ = 0.70 | | |
| $r_{15}$ = ∞ | $d_{15}$ = (Variable) | | |
| $r_{16}$ = 21.580 (A) | $d_{16}$ = 2.06 | $n_{d8}$ = 1.81474 | $ν_{d8}$ = 37.03 |
| $r_{17}$ = −978.404 | $d_{17}$ = (Variable) | | |
| $r_{18}$ = ∞ | $d_{18}$ = 0.50 | $n_{d9}$ = 1.51633 | $ν_{d9}$ = 64.14 |
| $r_{19}$ = ∞ | $d_{19}$ = 0.50 | | |
| $r_{20}$ = ∞ | $d_{20}$ = 0.50 | $n_{d10}$ = 1.51633 | $ν_{d10}$ = 64.14 |
| $r_{21}$ = ∞ | $d_{21}$ = 0.37 | | |
| $r_{22}$ = ∞ | | | |
| (Light receiving surface of electronic image pickup apparatus, image plane) | | | |

Aspherical coefficients

3rd surface

K = −7.111
$A_4$ = −5.55917e−07
$A_6$ = 1.43935e−08
$A_8$ = 1.59184e−10
$A_{10}$ = 2.14201e−14

4th surface

K = 0.164
$A_4$ = −5.56372e−05
$A_6$ = 2.25017e−05
$A_8$ = −6.41799e−07
$A_{10}$ = 7.92547e−09

5th surface

K = 0.426
$A_4$ = −1.02133e−03
$A_6$ = 2.17154e−05
$A_8$ = −1.26409e−06
$A_{10}$ = 6.37628e−09

10th surface

K = −3.075
$A_4$ = 2.84705e−03
$A_6$ = −1.36330e−04

11th surface

K = 8.240
$A_4$ = 7.87536e−04
$A_6$ = 4.92757e−05

$A_8 = -1.38094e-05$
$A_{10} = 8.57143e-07$

16th surface $K = -4.140$
$A_4 = 1.27942e-04$
$A_6 = 2.38646e-05$
$A_8 = -1.38465e-06$
$A_{10} = 2.83638e-08$ Zoom data (∞)

|  | WE | ST | TE |
|---|---|---|---|
| f (mm) | 6.62 | 16.17 | 44.53 |
| $F_{NO}$ | 3.30 | 4.44 | 5.50 |
| 2ω (°) | 65.90 | 25.93 | 9.87 |
| $d_3$ | 0.70 | 7.35 | 13.70 |
| $d_7$ | 13.43 | 7.55 | 0.60 |
| $d_{15}$ | 1.98 | 8.49 | 13.39 |
| $d_{17}$ | 5.27 | 4.06 | 3.60 |

Example 6

| | | | |
|---|---|---|---|
| $r_1 = 22.602$ | $d_1 = 0.80$ | $n_{d1} = 2.00170$ | $\nu_{d1} = 20.64$ |
| $r_2 = 18.738$ | $d_2 = 4.13$ | $n_{d2} = 1.49700$ | $\nu_{d2} = 81.54$ |
| $r_3 = -25.691$ (A) | $d_3$ = (Variable) | | |
| $r_4 = -13.288$ (A) | $d_4 = 0.91$ | $n_{d3} = 1.83481$ | $\nu_{d3} = 42.71$ |
| $r_5 = 16.534$ (A) | $d_5 = 0.55$ | | |
| $r_6 = 28.680$ | $d_6 = 0.70$ | $n_{d4} = 1.88300$ | $\nu_{d4} = 40.76$ |
| $r_7 = 7.398$ | $d_7 = 0.47$ | | |
| $r_8 = 8.542$ | $d_8 = 2.05$ | $n_{d5} = 1.92286$ | $\nu_{d5} = 18.90$ |
| $r_9 = 23.121$ | $d_9$ = (Variable) | | |
| $r_{10} = \infty$ | $d_{10} = 0.98$ | | |
| $r_{11} = \infty$ (S) | $d_{11} = -0.10$ | | |
| $r_{12} = 4.478$ (A) | $d_{12} = 2.56$ | $n_{d6} = 1.49700$ | $\nu_{d6} = 81.54$ |
| $r_{13} = -15.247$ (A) | $d_{13} = 0.20$ | | |
| $r_{14} = 4.817$ | $d_{14} = 1.47$ | $n_{d7} = 1.51742$ | $\nu_{d7} = 52.43$ |
| $r_{15} = 7.370$ | $d_{15} = 0.40$ | $n_{d8} = 2.00330$ | $\nu_{d8} = 28.27$ |
| $r_{16} = 3.171$ | $d_{16} = 0.70$ | | |
| $r_{17} = \infty$ | $d_{17}$ = (Variable) | | |
| $r_{18} = 17.556$ (A) | $d_{18} = 2.28$ | $n_{d9} = 1.81474$ | $\nu_{d9} = 37.03$ |
| $r_{19} = -356.352$ | $d_{19}$ = (Variable) | | |
| $r_{20} = \infty$ | $d_{20} = 0.50$ | $n_{d10} = 1.51633$ | $\nu_{d10} = 64.14$ |
| $r_{21} = \infty$ | $d_{21} = 0.50$ | | |
| $r_{22} = \infty$ | $d_{22} = 0.50$ | $n_{d11} = 1.51633$ | $\nu_{d11} = 64.14$ |
| $r_{23} = \infty$ | $d_{23} = 0.37$ | | |
| $r_{24} = \infty$ | | | |
| (Light receiving surface of electronic image pickup apparatus, image plane) | | | |

Aspherical coefficients

3rd surface $K = -2.655$
$A_4 = 2.84235e-05$
$A_6 = -1.26821e-07$
$A_8 = 6.53842e-10$
$A_{10} = 2.14201e-14$ 4th surface $K = 1.985$
$A_4 = -1.54238e-04$
$A_6 = 3.31806e-05$
$A_8 = -7.71567e-07$
$A_{10} = 7.92547e-09$ 5th surface $K = 7.086$
$A_4 = -9.45498e-04$
$A_6 = 3.71912e-05$
$A_8 = -9.25584e-07$
$A_{10} = 6.37628e-09$ 12th surface $K = -1.244$
$A_4 = 5.05817e-04$
$A_6 = 4.58343e-05$ 13th surface $K = 0.148$
$A_4 = 6.24060e-04$
$A_6 = 7.30506e-05$
$A_8 = -8.70760e-06$
$A_{10} = 8.57143e-07$ 18th surface $K = -5.979$
$A_4 = 1.62882e-04$
$A_6 = 2.08747e-05$
$A_8 = -1.27158e-06$
$A_{10} = 2.83638e-08$ Zoom data (∞)
(∞)

|  | WE | ST | TE |
|---|---|---|---|
| f (mm) | 6.62 | 16.17 | 44.53 |
| $F_{NO}$ | 3.30 | 4.45 | 5.35 |
| 2ω (°) | 66.51 | 25.78 | 9.68 |
| $d_3$ | 0.61 | 6.85 | 12.93 |
| $d_9$ | 13.00 | 7.50 | 0.60 |
| $d_{17}$ | 1.91 | 8.34 | 12.90 |
| $d_{19}$ | 4.88 | 4.05 | 3.00 |

Example 7

| | | | |
|---|---|---|---|
| $r_1 = 23.899$ | $d_1 = 0.80$ | $n_{d1} = 2.00170$ | $\nu_{d1} = 20.64$ |
| $r_2 = 19.824$ | $d_2 = 4.24$ | $n_{d2} = 1.49700$ | $\nu_{d2} = 81.54$ |
| $r_3 = -26.164$ (A) | $d_3$ = (Variable) | | |
| $r_4 = -10.790$ (A) | $d_4 = 0.91$ | $n_{d3} = 1.83481$ | $\nu_{d3} = 42.71$ |
| $r_5 = 22.431$ (A) | $d_5 = 0.90$ | | |
| $r_6 = 218.971$ | $d_6 = 2.10$ | $n_{d4} = 1.92286$ | $\nu_{d4} = 18.90$ |
| $r_7 = -13.195$ | $d_7 = 0.30$ | | |
| $r_8 = -10.758$ | $d_8 = 0.50$ | $n_{d5} = 1.88300$ | $\nu_{d5} = 40.76$ |
| $r_9 = 103.691$ | $d_9$ = (Variable) | | |
| $r_{10} = \infty$ | $d_{10} = 0.98$ | | |
| $r_{11} = \infty$ (S) | $d_{11} = -0.10$ | | |
| $r_{12} = 4.295$ (A) | $d_{12} = 2.51$ | $n_{d6} = 1.49700$ | $\nu_{d6} = 81.54$ |
| $r_{13} = -13.710$ (A) | $d_{13} = 0.20$ | | |
| $r_{14} = 4.763$ | $d_{14} = 1.22$ | $n_{d7} = 1.51742$ | $\nu_{d7} = 52.43$ |
| $r_{15} = 6.332$ | $d_{15} = 0.40$ | $n_{d8} = 2.00330$ | $\nu_{d8} = 28.27$ |
| $r_{16} = 3.093$ | $d_{16} = 0.70$ | | |
| $r_{17} = \infty$ | $d_{17}$ = (Variable) | | |
| $r_{18} = 29.444$ (A) | $d_{18} = 1.99$ | $n_{d9} = 1.81474$ | $\nu_{d9} = 37.03$ |
| $r_{19} = -51.206$ | $d_{19}$ = (Variable) | | |
| $r_{20} = \infty$ | $d_{20} = 0.50$ | $n_{d10} = 1.51633$ | $\nu_{d10} = 64.14$ |
| $r_{21} = \infty$ | $d_{21} = 0.50$ | | |
| $r_{22} = \infty$ | $d_{22} = 0.50$ | $n_{d11} = 1.51633$ | $\nu_{d11} = 64.14$ |
| $r_{23} = \infty$ | $d_{23} = 0.37$ | | |
| $r_{24} = \infty$ | | | |
| (Light receiving surface of electronic image pickup apparatus, image plane) | | | |

Aspherical coefficients

3rd surface $K = -3.386$
$A_4 = 1.84236e-05$
$A_6 = -5.49013e-08$
$A_8 = 2.40556e-10$
$A_{10} = -3.81661e-13$ 4th surface $K = -3.373$
$A_4 = -5.91701e-06$
$A_6 = 1.42524e-05$ -continued $A_8 = -3.49467e-07$
$A_{10} = 3.04350e-09$
5th surface $K = 3.350$
$A_4 = -1.83526e-04$
$A_6 = 2.07397e-05$
$A_8 = -4.59555e-07$
$A_{10} = 6.67020e-09$
12th surface $K = -1.796$
$A_4 = 1.38580e-03$
$A_6 = 5.53570e-06$
13th surface $K = -92.455$
$A_4 = -3.55086e-03$
$A_6 = 7.78041e-04$
$A_8 = -9.98896e-05$
$A_{10} = 5.79723e-06$
18th surface $K = 5.707$
$A_4 = 1.30782e-04$
$A_6 = 9.36732e-06$
$A_8 = -4.60064e-07$
$A_{10} = 7.60826e-09$ Zoom data (∞)

| | WE | ST | TE |
|---|---|---|---|
| f (mm) | 6.62 | 16.17 | 44.53 |
| $F_{NO}$ | 3.30 | 4.44 | 5.43 |
| 2ω (°) | 68.57 | 26.03 | 9.75 |
| $d_3$ | 0.58 | 7.10 | 13.39 |
| $d_9$ | 12.27 | 6.94 | 0.60 |
| $d_{17}$ | 2.29 | 8.51 | 13.18 |
| $d_{19}$ | 4.97 | 3.90 | 3.00 |

Example 8

| | | | |
|---|---|---|---|
| $r_1 = 23.976$ | $d_1 = 0.80$ | $n_{d1} = 2.00170$ | $v_{d1} = 20.64$ |
| $r_2 = 19.903$ | $d_2 = 3.96$ | $n_{d2} = 1.49700$ | $v_{d2} = 81.54$ |
| $r_3 = -27.088$ (A) | $d_3 =$ (Variable) | | |
| $r_4 = -13.009$ (A) | $d_4 = 0.91$ | $n_{d3} = 1.83481$ | $v_{d3} = 42.71$ |
| $r_5 = 6.302$ (A) | $d_5 = 0.92$ | | |
| $r_6 = 9.256$ | $d_6 = 1.87$ | $n_{d4} = 1.92286$ | $v_{d4} = 18.90$ |
| $r_7 = 23.104$ | $d_7 =$ (Variable) | | |
| $r_8 = \infty$ | $d_8 = 0.98$ | | |
| $r_9 = \infty$ (S) | $d_9 = -0.10$ | | |
| $r_{10} = 4.405$ (A) | $d_{10} = 2.63$ | $n_{d5} = 1.49700$ | $v_{d5} = 81.54$ |
| $r_{11} = -10.942$ (A) | $d_{11} = 0.23$ | | |
| $r_{12} = 5.290$ | $d_{12} = 1.14$ | $n_{d6} = 1.51742$ | $v_{d6} = 52.43$ |
| $r_{13} = 6.299$ | $d_{13} = 0.41$ | $n_{d7} = 2.00330$ | $v_{d7} = 28.27$ |
| $r_{14} = 3.124$ | $d_{14} = 0.70$ | | |
| $r_{15} = \infty$ | $d_{15} =$ (Variable) | | |
| $r_{16} = 21.612$ (A) | $d_{16} = 2.06$ | $n_{d8} = 1.81474$ | $v_{d8} = 37.03$ |
| $r_{17} = -3334.342$ | $d_{17} =$ (Variable) | | |
| $r_{18} = \infty$ | $d_{18} = 0.50$ | $n_{d9} = 1.51633$ | $v_{d9} = 64.14$ |
| $r_{19} = \infty$ | $d_{19} = 0.50$ | | |
| $r_{20} = \infty$ | $d_{20} = 0.50$ | $n_{d10} = 1.51633$ | $v_{d10} = 64.14$ |
| $r_{21} = \infty$ | $d_{21} = 0.37$ | | |
| $r_{22} = \infty$ | | | |

(Light receiving surface of electronic image pickup apparatus, image plane)

Aspherical coefficients

3rd surface $K = -3.358$
$A_4 = 2.30297e-05$
$A_6 = -1.22671e-07$

-continued $A_8 = 7.32069e-10$
$A_{10} = 2.14201e-14$
4th surface $K = -0.491$
$A_4 = -1.79874e-04$
$A_6 = 2.75493e-05$
$A_8 = -7.26410e-07$
$A_{10} = 7.92547e-09$
5th surface $K = 0.311$
$A_4 = -1.03567e-03$
$A_6 = 2.81436e-05$
$A_8 = -1.04751e-06$
$A_{10} = 6.37628e-09$
10th surface $K = -3.062$
$A_4 = 2.72342e-03$
$A_6 = -1.57228e-04$
11th surface $K = -22.869$
$A_4 = -1.92400e-03$
$A_6 = 1.43485e-04$
$A_8 = -2.06398e-05$
$A_{10} = 8.57143e-07$
16th surface $K = -3.300$
$A_4 = 1.45283e-04$
$A_6 = 2.16436e-05$
$A_8 = -1.33025e-06$
$A_{10} = 2.83638e-08$ Zoom data (∞)

| | WE | ST | TE |
|---|---|---|---|
| f (mm) | 6.62 | 16.18 | 44.54 |
| $F_{NO}$ | 3.30 | 4.44 | 5.49 |
| 2ω (°) | 65.74 | 25.95 | 9.88 |
| $d_3$ | 0.67 | 7.35 | 13.69 |
| $d_7$ | 13.36 | 7.50 | 0.60 |
| $d_{15}$ | 2.02 | 8.52 | 13.40 |
| $d_{17}$ | 5.28 | 4.07 | 3.61 |

Example 9

| | | | |
|---|---|---|---|
| $r_1 = 23.668$ | $d_1 = 0.80$ | $n_{d1} = 2.00170$ | $v_{d1} = 20.64$ |
| $r_2 = 19.396$ | $d_2 = 4.18$ | $n_{d2} = 1.49700$ | $v_{d2} = 81.54$ |
| $r_3 = -28.307$ (A) | $d_3 =$ (Variable) | | |
| $r_4 = -8.746$ (A) | $d_4 = 0.90$ | $nn_{d3} = 1.80610$ | $v_{d3} = 40.92$ |
| $r_5 = 22.609$ (A) | $d_5 = 0.96$ | | |
| $r_6 = 115.759$ | $d_6 = 1.98$ | $n_{d4} = 1.92286$ | $v_{d4} = 18.90$ |
| $r_7 = -14.259$ | $d_7 = 0.21$ | | |
| $r_8 = -13.143$ | $d_8 = 0.50$ | $n_{d5} = 1.88300$ | $v_{d5} = 40.76$ |
| $r_9 = 72.040$ | $d_9 =$ (Variable) | | |
| $r_{10} = \infty$ | $d_{10} = 0.98$ | | |
| $r_{11} = \infty$ (S) | $d_{11} = -0.10$ | | |
| $r_{12} = 4.226$ (A) | $d_{12} = 2.08$ | $n_{d6} = 1.49700$ | $v_{d6} = 81.54$ |
| $r_{13} = -16.546$ (A) | $d_{13} = 0.38$ | | |
| $r_{14} = 4.496$ | $d_{14} = 1.32$ | $n_{d7} = 1.51742$ | $v_{d7} = 52.43$ |
| $r_{15} = 6.297$ | $d_{15} = 0.40$ | $n_{d8} = 2.00330$ | $v_{d8} = 28.27$ |
| $r_{16} = 3.029$ | $d_{16} = 0.70$ | | |
| $r_{17} = \infty$ | $d_{17} =$ (Variable) | | |
| $r_{18} = 42.015$ (A) | $d_{18} = 1.93$ | $n_{d9} = 1.81474$ | $v_{d9} = 37.03$ |
| $r_{19} = -32.646$ | $d_{19} =$ (Variable) | | |
| $r_{20} = \infty$ | $d_{20} = 0.50$ | $n_{d10} = 1.51633$ | $v_{d10} = 64.14$ |
| $r_{21} = \infty$ | $d_{21} = 0.50$ | | |
| $r_{22} = \infty$ | $d_{22} = 0.50$ | $n_{d11} = 1.51633$ | $v_{d11} = 64.14$ |
| $r_{23} = \infty$ | $d_{23} = 0.37$ | | |
| $r_{24} = \infty$ | | | |

(Light receiving surface of

-continued electronic image pickup apparatus, image plane)

Aspherical coefficients

3rd surface

K = −5.090
$A_4$ = 9.69822e−06
$A_6$ = −7.03853e−09
$A_8$ = 8.40603e−11
$A_{10}$ = −7.99864e−13

4th surface

K = −7.664
$A_4$ = −2.42260e−04
$A_6$ = 1.92938e−05
$A_8$ = −4.98886e−07
$A_{10}$ = 4.81577e−09

5th surface

K = 14.395
$A_4$ = 3.36955e−04
$A_6$ = −1.56311e−06
$A_8$ = −5.73815e−08
$A_{10}$ = −1.93332e−09

12th surface

K = −4.899
$A_4$ = 6.91677e−03
$A_6$ = −4.70828e−04
$A_8$ = 3.61315e−05
$A_{10}$ = 9.97270e−22

13th surface

K = −161.860
$A_4$ = −2.97697e−03
$A_6$ = 9.82793e−04
$A_8$ = −1.34602e−04
$A_{10}$ = 1.02130e−05

18th surface

K = −238.183
$A_4$ = 4.66205e−04
$A_6$ = −2.07951e−06
$A_8$ = −1.03870e−07
$A_{10}$ = 1.44607e−09

Zoom data (∞)

| | WE | ST | TE |
|---|---|---|---|
| f (mm) | 6.63 | 16.23 | 44.53 |
| $F_{NO}$ | 3.30 | 4.51 | 5.64 |
| 2ω (°) | 67.60 | 25.89 | 9.77 |
| $d_3$ | 0.95 | 7.52 | 13.67 |
| $d_9$ | 11.63 | 6.65 | 0.60 |
| $d_{17}$ | 1.89 | 8.46 | 13.34 |
| $d_{19}$ | 5.04 | 3.61 | 3.00 |

A spherical aberration, an astigmatism, a distortion, and a chromatic aberration of magnification at the wide angle end, the intermediate state, and the telephoto end, at the time of infinite object focusing according to the first embodiment to the ninth embodiment described above, are shown in FIG. 10A, FIG. 10B, and FIG. 10C to FIG. 18A, 18B, and FIG. 18C.

In the diagrams, 'ω' is a half image angle.

Values of conditional expressions (1) to (21) in the embodiments are given below.

| | (1) $SF_{1p1}$ | (2) $ν_{d1p} - ν_{d1n}$ | (3) $f_1/f_t$ | (4) $|f_2/f_t|$ | (5) $f_3/f_t$ | (6) $f_4/f_t$ |
|---|---|---|---|---|---|---|
| Example 1 | −0.244 | 60.896 | 0.634 | 0.164 | 0.22 | 0.534 |
| Example 2 | −0.228 | 60.896 | 0.595 | 0.154 | 0.217 | 0.537 |
| Example 3 | −0.203 | 60.896 | 0.633 | 0.164 | 0.22 | 0.53 |
| Example 4 | −0.324 | 60.896 | 0.645 | 0.163 | 0.219 | 0.56 |
| Example 5 | −0.166 | 60.896 | 0.66 | 0.172 | 0.234 | 0.583 |
| Example 6 | −0.156 | 60.896 | 0.625 | 0.166 | 0.235 | 0.462 |
| Example 7 | −0.138 | 60.896 | 0.648 | 0.162 | 0.224 | 0.521 |
| Example 8 | −0.153 | 60.896 | 0.659 | 0.171 | 0.234 | 0.592 |
| Example 9 | −0.187 | 60.896 | 0.657 | 0.16 | 0.216 | 0.512 |

| | (7) $ν_{d1p}$ | (8) $ν_{d3p}$ | (9) $n_{d1n}$ | (10) $n_{d2n}$ | (11) $n_{d2p}$ | (12) $SF_{2n1}$ |
|---|---|---|---|---|---|---|
| Example 1 | 81.54 | 81.54 | 2.002 | 1.806 | 1.923 | 0.357 |
| Example 2 | 81.54 | 81.54 | 2.002 | 1.883 | 1.923 | 0.423 |
| Example 3 | 81.54 | 81.54 | 2.002 | 1.806 | 2.102 | 0.266 |
| Example 4 | 81.54 | 81.54 | 2.002 | 1.835 | 1.923 | 0.295 |
| Example 5 | 81.54 | 81.54 | 2.002 | 1.835 | 1.923 | 0.33 |
| Example 6 | 81.54 | 81.54 | 2.002 | 1.835 | 1.923 | −0.109 |
| Example 7 | 81.54 | 81.54 | 2.002 | 1.835 | 1.923 | −0.35 |
| Example 8 | 81.54 | 52.43 | 2.002 | 1.835 | 1.923 | 0.347 |
| Example 9 | 81.54 | 81.54 | 2.002 | 1.806 | 1.923 | −0.442 |

| | (13) $(β_{2t}/β_{2w})/(β_{3t}/β_{3w})$ | (14) $β_{2t}/β_{2w}$ | (15) $β_{3t}/β_{3w}$ | (16) $β_{4t}/β_{4w}$ | (17) $(D_{2w} + D_{1t})/f_t$ |
|---|---|---|---|---|---|
| Example 1 | 1.759 | 3.133 | 1.781 | 1.205 | 0.581 |
| Example 2 | 1.874 | 3.237 | 1.727 | 1.204 | 0.556 |
| Example 3 | 1.784 | 3.153 | 1.768 | 1.207 | 0.583 |
| Example 4 | 1.654 | 3.048 | 1.842 | 1.198 | 0.582 |
| Example 5 | 1.576 | 3.115 | 1.977 | 1.092 | 0.629 |
| Example 6 | 1.955 | 3.389 | 1.733 | 1.145 | 0.602 |
| Example 7 | 1.754 | 3.239 | 1.847 | 1.123 | 0.596 |
| Example 8 | 1.58 | 3.122 | 1.975 | 1.091 | 0.627 |
| Example 9 | 1.608 | 3.094 | 1.924 | 1.129 | 0.588 |

| | (18) $D_{2w}/f_t$ | (19) $D_{1t}/f_t$ | (20) $T_L/f_t$ | (21) $f_t/f_w$ |
|---|---|---|---|---|
| Example 1 | 0.285 | 0.296 | 1.074 | 6.725 |
| Example 2 | 0.282 | 0.274 | 1.068 | 6.728 |
| Example 3 | 0.287 | 0.296 | 1.077 | 6.726 |
| Example 4 | 0.286 | 0.296 | 1.079 | 6.725 |
| Example 5 | 0.321 | 0.308 | 1.116 | 6.725 |
| Example 6 | 0.312 | 0.29 | 1.109 | 6.724 |
| Example 7 | 0.295 | 0.301 | 1.116 | 6.722 |
| Example 8 | 0.32 | 0.307 | 1.116 | 6.727 |
| Example 9 | 0.281 | 0.307 | 1.116 | 6.721 |

In the abovementioned embodiments, a zoom lens optical system having a seven times high magnification (zooming) ratio, in which easy slimming of a camera is taken into consideration, is realized. Naturally, an image quality of an image taken is maintained to be favorable, and moreover, it is a low cost zoom lens optical system which is suitable for use in an electronic image pickup element such as a CCD and a CMOS.

Moreover, in each of the abovementioned embodiments, a flare aperture, apart from the aperture stop, may be disposed for cutting unnecessary light such as a ghost and a flare. The flare aperture may be disposed at any of locations namely on the object side of the first lens unit, between the first lens unit and the second lens unit, between the second lens unit and the third lens unit, between the third lens unit and the fourth lens unit, and between the fourth lens unit and the image surface. An arrangement may be made such that flare light rays are cut by a frame member, or another member may be arranged. Moreover, a direct printing may be carried out, or paint may be applied, or a seal may be adhered to the optical system. The shape may be any shape such as a circular shape, an elliptical shape, a rectangular shape, a polygon, and an area surrounded by a function curve. Moreover, not only harmful light beam but also light beam such as a surrounding coma flare may be cut.

Moreover, the ghost and the flare may be reduced by applying an antireflection coating to each lens. A multi-coating, being capable of reducing effectively the ghost and the flare, is desirable. Moreover, an infra-red rays cutting coating may be applied to the lens surfaces and cover glasses.

Moreover, it is desirable that focusing is carried out by moving the fourth lens unit. When the focusing is carried out by the fourth lens unit, since the lenses are light weight, a load on a motor is small. Furthermore, since the overall length does not change at the time of focusing, and a drive motor can be disposed inside a lens frame, it is advantageous for making the lens frame compact. Although the focusing is desirable in the fourth lens unit as described above, it may be carried out by (in) the first lens unit, the second lens unit, and the third lens unit. The focusing may also be carried out by moving a plurality of lens units. Moreover, the focusing may be carried out by drawing out the entire lens system, or by drawing out some of the lenses, or the focusing maybe carried over.

The shading in a portion surrounding an image may be reduced by shifting a micro lens of the CCD. For instance, a design of the micro lens of the CCD may be changed according to an angle of incidence of light rays for each image height. Moreover, an amount of degradation in the portion surrounding an image may be corrected by an image processing.

Moreover, a distortion may be let to occur intentionally in the optical system, and the distortion may be corrected by carrying out electrically an image processing after taking pictures.

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 19:
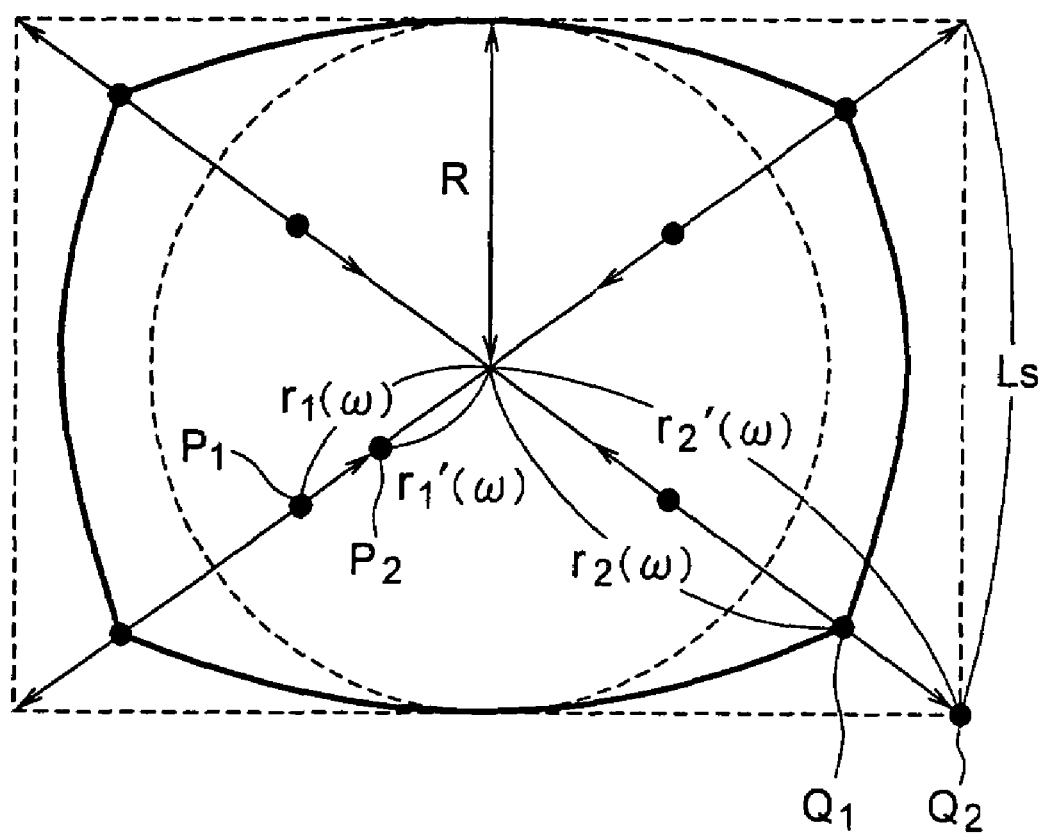
FIG. 19 is a diagram describing a correction of a distortion.

For example, as shown in FIG. 19, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 19, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \tan \omega (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega)-r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6\ Ls$$

where, Ls is a length of a short side of the effective image pickup surface.

It is preferable that the radius R satisfies the following conditional expression.

$$0.3\ Ls \leq R \leq 0.6\ Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(107) = \alpha \cdot f \cdot \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and $\omega$ denotes an angle (object half image angle) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of $\omega$ becomes large.

(Digital Camera)

Figure 20:
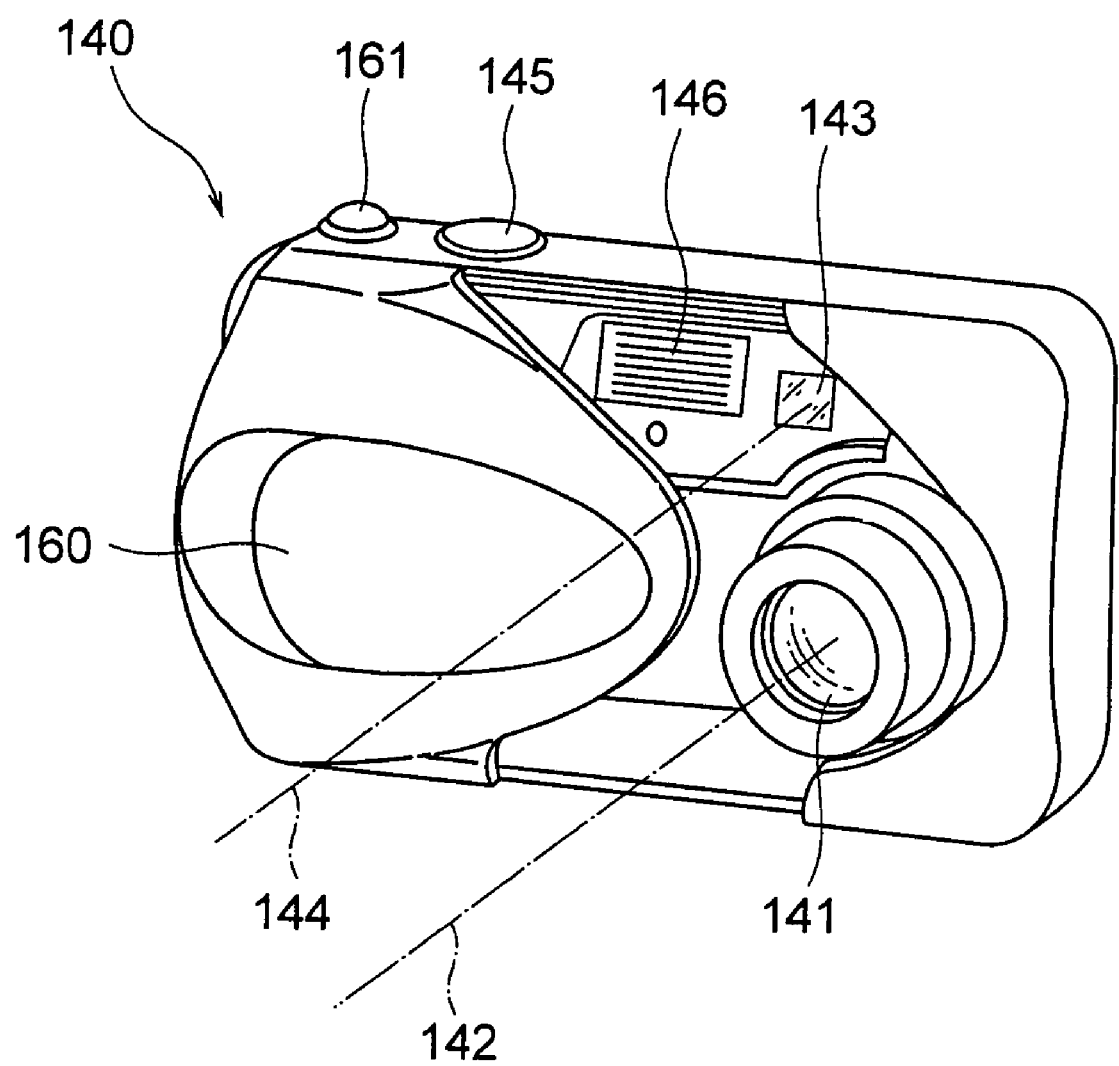
FIG. 20 is a front perspective view showing an appearance of a digital camera in which the zoom lens system according to the present invention is incorporated.
Figure 21:
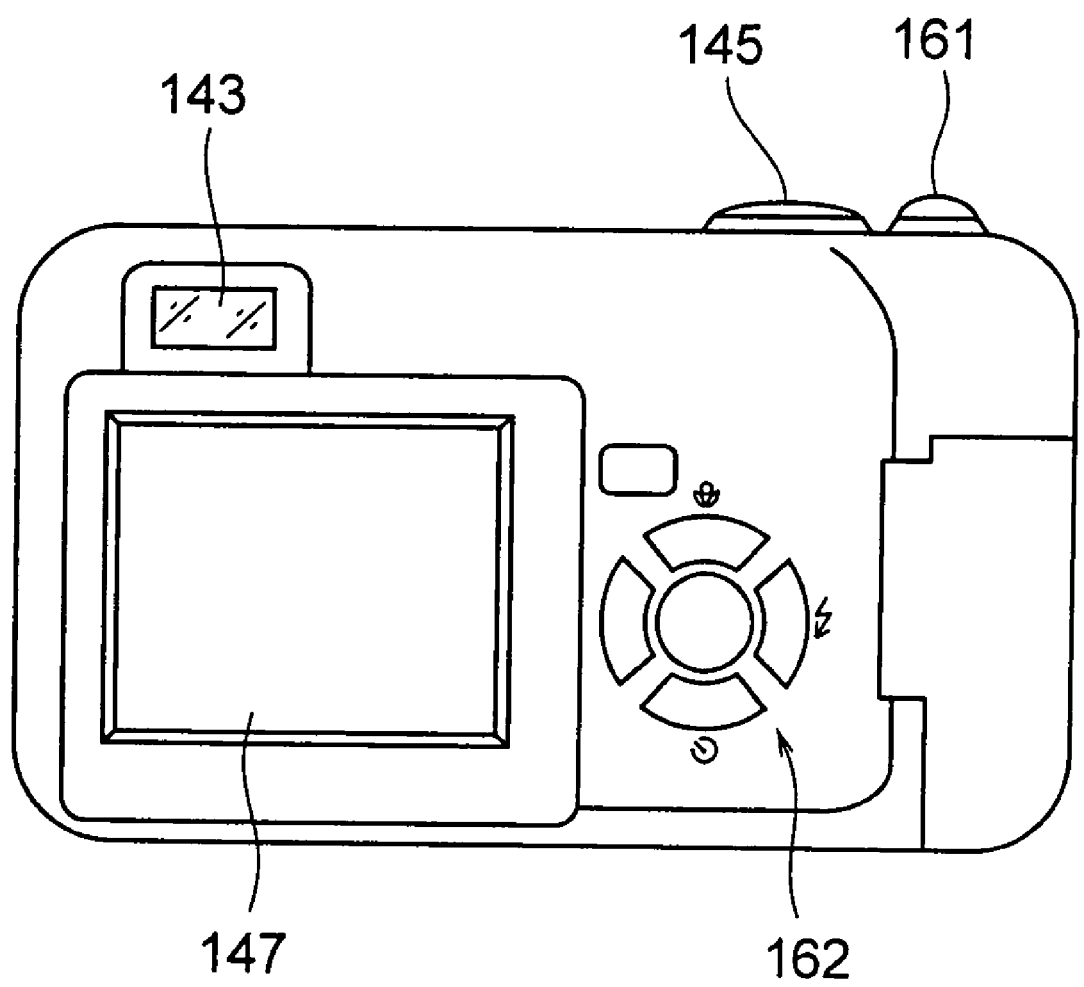
FIG. 21 is a rear perspective view of the digital camera in FIG. 20.
Figure 22:
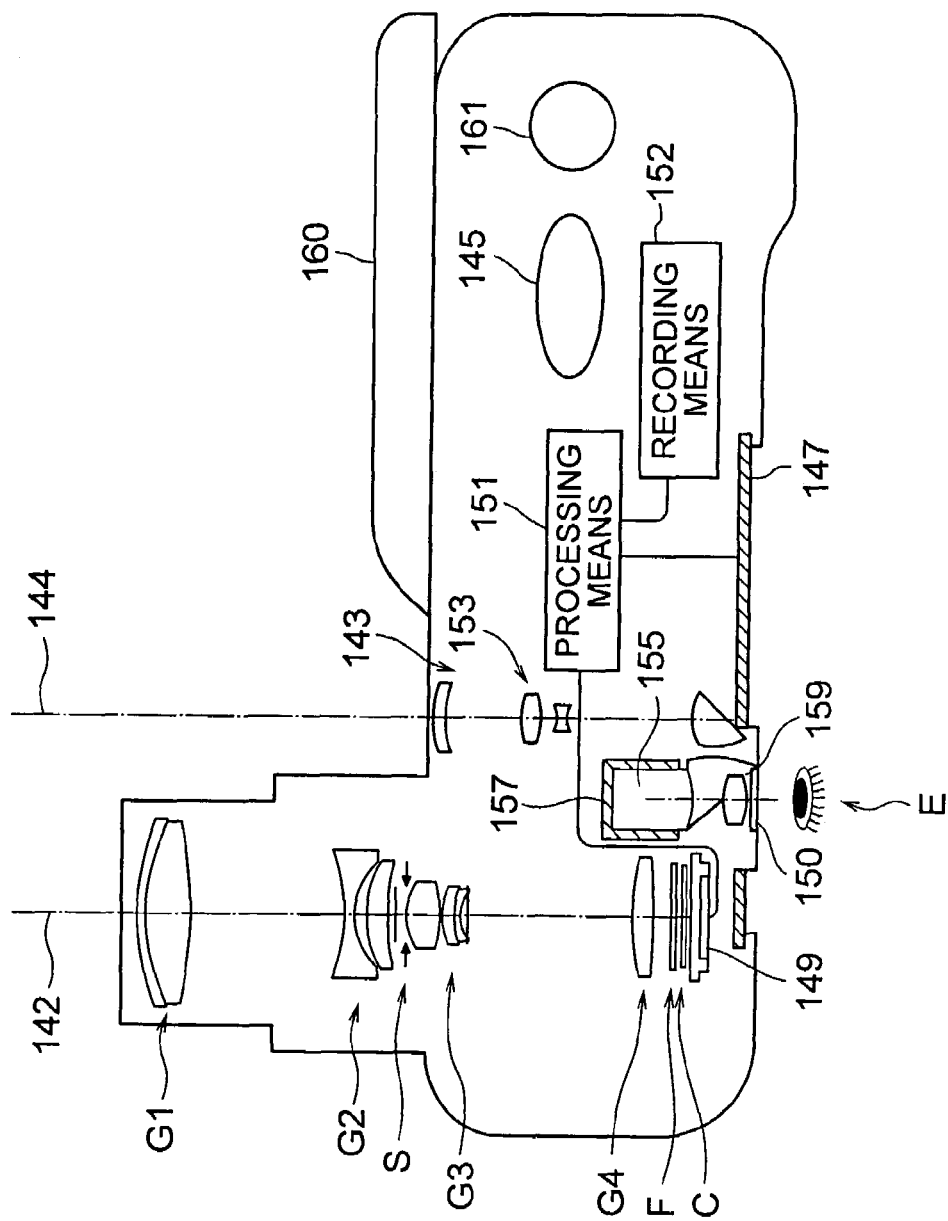
FIG. 22 is a cross-sectional view of the digital camera in FIG. 20.

FIG. 20 to FIG. 22 are conceptual diagrams of a structure of a digital camera according to the present invention in which a zoom lens system described above is incorporated in a taking optical system 141. FIG. 20 is a front perspective view showing an appearance of a digital camera 140, FIG. 21 is a rear perspective view of the same, and FIG. 22 is a schematic cross-sectional view showing a structure of the digital camera 140. In FIG. 20 to FIG. 22, show an uncollapsed state (lens is not drawn out) of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

Figure 23:
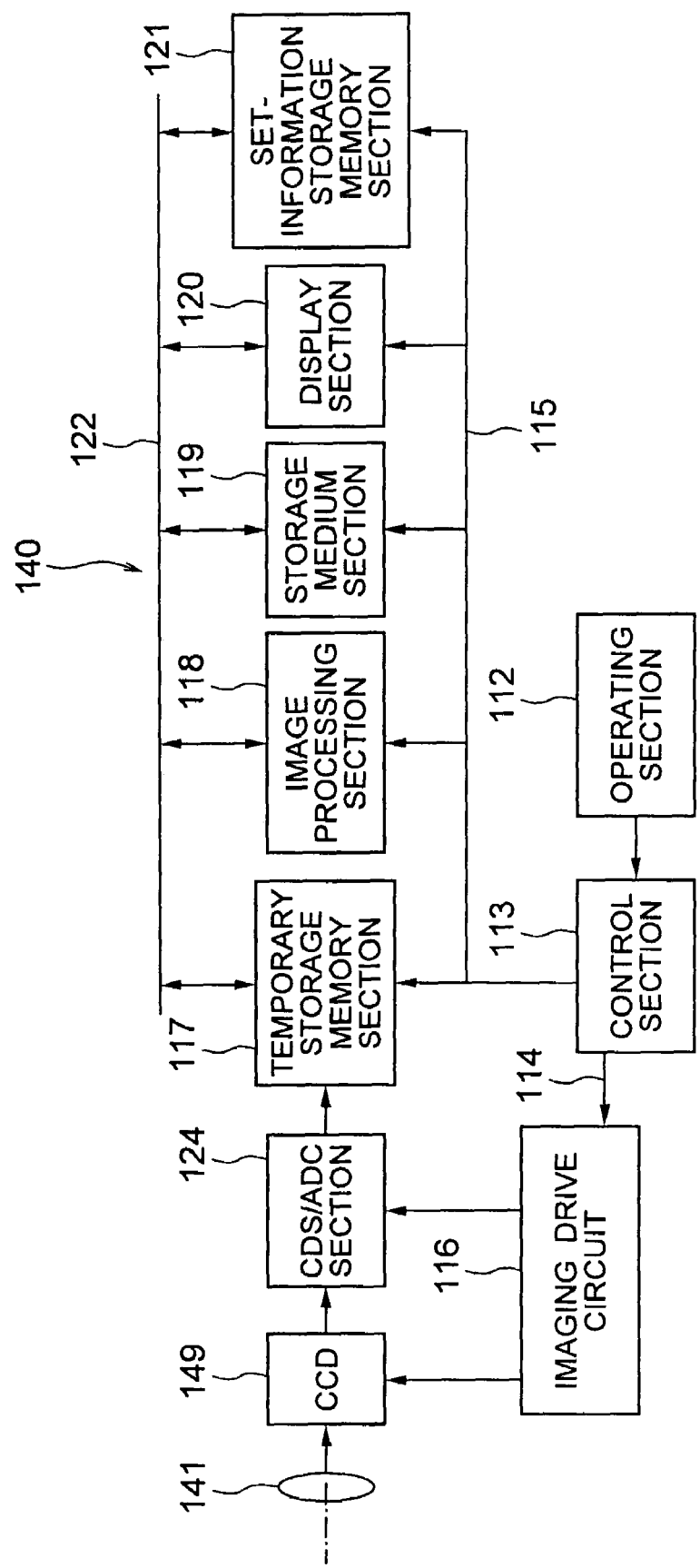
FIG. 23 is a structural block diagram of an internal circuit of main components of a digital camera.

FIG. 23 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 23, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side (end) and the telephoto side (end) is possible.

As it has been described above, the present invention is useful for a zoom lens system having a high magnification ratio of about seven times, in which, the slimming of the digital camera is taken into consideration.

What is claimed is:

1. A zoom lens system comprising in order from an object side:

a first lens unit having a positive refracting power;

a second lens unit having a negative refracting power; and a third lens unit having a positive refracting power, wherein at a time of zooming from a wide angle end to a telephoto end, each space between the lens units changes, and the first lens unit comprises a negative lens and a positive lens, and the total number of lenses in the first lens unit is two, and the zoom lens system satisfies the following conditional expression $$-0.50 < SF_{1p} < -0.1$$

where, $SF_{1p}$ is defined as $SF_{1p}=(R_{1pf}+R_{1pr})/(R_{1pf}-R_{1pr})$, when $R_{1pf}$ is a paraxial radius of curvature of a surface on the object side, of the positive lens in the first lens unit, and $R_{1pr}$ is a paraxial radius of curvature of a surface on an image side, of the positive lens in the first lens unit.

2. A zoom lens system comprising, in order from an object side:

a first lens unit having a positive refracting power;

a second lens unit having a negative refracting power;

a third lens unit having a positive refracting power; and a fourth lens unit having a positive refracting power, wherein at a time of zooming from a wide angle end to a telephoto end, each space between the lens units changes, and the first lens unit comprises a negative lens and a positive lens, and the total number of lenses in the first lens unit is two, and the zoom lens system satisfies the following conditional expression $$-0.75 < SF_{1p} < -0.1 \quad (1)$$

where, $SF_{1p}$ is defined as $SF_{1p}=(R_{1pf}+R_{1pr})/(R_{1pf}-R_{1pr})$, when $R_{1pf}$ is a paraxial radius of curvature of a surface on the object side, of the positive lens in the first lens unit, and $R_{1pr}$ is a paraxial radius of curvature of a surface on an image side, of the positive lens in the first lens unit.

3. A zoom lens system comprising, in order from an object side:

a first lens unit having a positive refracting power;

a second lens unit having a negative refracting power; and a third lens unit having a positive refracting power, wherein at a time of zooming from a wide angle end to a telephoto end, each space between the lens units changes, and the first lens unit comprises a negative lens and a positive lens, and the number of lenses in the first lens unit is two, and the zoom lens system satisfies the following conditional expression $$47.0 < \nu_{d1p} - \nu_{d1n} \quad (2')$$

where, $\nu_{d1p}$ denotes an Abbe's number for a d-line of the positive lens in the first lens unit, and $\nu_{d1n}$ denotes an Abbe's number for a d-line of the negative lens in the first lens unit.

4. A zoom lens system comprising in order from an object side:

a first lens unit having a positive refracting power;

a second lens unit having a negative refracting power;

a third lens unit having a positive refracting power; and a fourth lens unit having a positive refracting power, wherein at a time of zooming from a wide angle end to a telephoto end, each space between the lens units changes, and the first lens unit comprises a negative lens and a positive lens, and the number of lenses in the first lens unit is two, and the zoom lens system satisfies the following conditional expression $$38.0 < \nu_{d1p} - \nu_{d1n} \quad (2)$$

where, $\nu_{d1p}$ denotes an Abbe's number for a d-line of the positive lens in the first lens unit, and $\nu_{d1n}$ denotes an Abbe's number for a d-line of the negative lens in the first lens unit.

5. The zoom lens system according to claim 2, wherein the zoom lens system satisfies the following conditional expression $$38.0 < \nu_{d1p} - \nu_{d1n}$$

where, $\nu_{d1p}$ denotes an Abbe's number for a d-line of the positive lens in the first lens unit, and $\nu_{d1n}$ denotes an Abbe's number for a d-line of the negative lens in the first lens unit.

6. The zoom lens system according to claim 2 or claim 4, wherein, the zoom lens system satisfies the following conditional expression $$0.40 < f_1/f_t < 0.90 \quad (3)$$

where, $f_1$ denotes a focal length of the first lens unit, and $f_t$ denotes a focal length of the entire zoom lens system at a telephoto end.

7. The zoom lens system according to claim 2 or claim 4, wherein, the zoom lens system satisfies the following conditional expression $$0.10 < |f_2/f_t| < 0.20 \quad (4)$$

where, $f_2$ denotes a focal length of the second lens unit, and $f_t$ denotes a focal length of the entire zoom lens system at a telephoto end.

8. The zoom lens system according to claim 2 or claim 4, wherein, the zoom lens system satisfies the following conditional expression $$0.10 < f_3/f_t < 0.30 \quad (5)$$

where, $f_3$ denotes a focal length of the third lens unit, and $f_t$ denotes a focal length of the entire zoom lens system at a telephoto end.

9. The zoom lens system according to claim 2 or claim 4 wherein, the zoom lens system satisfies the following conditional expression $$0.10 < f_4/f_t < 0.70 \quad (6)$$

where, $f_4$ denotes a focal length of the fourth lens unit, and $f_t$ denotes a focal length of the entire zoom lens system at a telephoto end.

10. The zoom lens system according to claim 2 or claim 4, wherein the zoom lens system satisfies the following conditional expression $$62.0 < \nu_{d1p} < 95.0 \quad (7)$$

where, $\nu_{d1p}$ denotes an Abbe's number for a d-line of the positive lens in the first lens unit.

11. The zoom lens system according to claim 2 or claim 4, wherein the third lens unit comprises a positive lens which satisfies the following conditional expression $$62.0 < \nu_{d3p} < 95.0 \quad (8)$$

where, $\nu_{d3p}$ denotes an Abbe's number for a d-line of the positive lens in the third lens unit.

12. The zoom lens system according to claim 2 or claim 4, wherein the positive lens is a positive single lens which is disposed nearest to the object side, in the third lens unit.

13. The zoom lens system according to claim 2 or claim 4, wherein the zoom lens system satisfies the following conditional expression $$1.85 < n_{d1n} < 2.10 \qquad (9)$$

where, $n_{d1n}$ denotes a refractive index for a d-line, of the negative lens in the first lens unit.

14. The zoom lens system according to claim 2 or claim 4, wherein the second lens unit comprises a negative lens which satisfies the following conditional expression $$1.76 < n_{d2n} < 2.00 \qquad (10)$$

where, $n_{d2n}$ denotes a refractive index for a d-line, of the negative lens in the second lens unit.

15. The zoom lens system according to claim 14, wherein the negative lens is a negative single lens which is disposed nearest to the object side, in the second lens unit.

16. The zoom lens system according to claim 2 or claim 4, wherein the second lens unit comprises a positive lens which satisfies the following conditional expression $$1.80 < n_{d2p} < 2.15 \qquad (11)$$

where, $n_{d2p}$ denotes a refractive index for a d-line, of the positive lens in the second lens unit.

17. The zoom lens system according to claim 16, wherein the positive lens is a positive lens which is disposed nearest to the image side, in the second lens unit.

18. The zoom lens system according to claim 16, wherein
the second lens unit comprises a plurality of negative lenses, and
the positive lens in the second lens unit is disposed between the plurality of negative lenses.

19. The zoom lens system according to claim 2 or claim 4, wherein the second lens unit comprises a biconcave negative lens which is disposed nearest to the object side, and satisfies the following conditional expression $$-1.0 < SF_{2n1} < 0.8 \qquad (12)$$

where, $SF_{2n1}$ is defined as $SF_{2n1} = (R_{2n1f} + R_{2n1r})/(R_{2n1f} - R2_{n1r})$, when $R_{2n1f}$ is a paraxial radius of curvature of a surface on an object side, of the negative lens disposed nearest to the object side, in the second lens unit, and $R_{2n1r}$ is a paraxial radius of curvature of a surface on an image side, of the negative lens disposed nearest to the object side, in the second lens unit.

20. The zoom lens system according to claim 2 or claim 4, wherein the zoom lens system satisfies the following conditional expression $$1.0 < (\beta_{2t}/\beta_{2w})/(\beta_{3t}/\beta_{3w}) < 2.5 \qquad (13)$$

where, $\beta_{2w}$ denotes a lateral magnification of the second lens unit, at a wide angle end, $\beta_{2t}$ denotes a lateral magnification of the second lens unit, at a telephoto end, $\beta_{3w}$ denotes a lateral magnification of the third lens unit, at the wide angle end, and $\beta_{3t}$ denotes a lateral magnification of the third lens unit at the telephoto end.

21. The zoom lens system according to claim 2 or claim 4, wherein the zoom lens system satisfies the following conditional expression $$2.6 < \beta_{2t}/\beta_{2w} < 6.0 \qquad (14)$$

where, $\beta_{2w}$ is a lateral magnification at a wide angle end, of the second lens unit, and $\beta_{2t}$ is a lateral magnification at a telephoto end of the second lens unit.

22. The zoom lens system according to claim 2 or claim 4, wherein the zoom lens system satisfies the following conditional expression $$1.2 < \beta_{3t}/\beta_{3w} < 3.0 \qquad (15)$$

where, $\beta_{3w}$ denotes a lateral magnification at a wide angle end, of the third lens unit, and $\beta_{3t}$ denotes a lateral magnification at a telephoto end, of the third lens unit.

23. The zoom lens system according to claim 2 or claim 4, wherein the zoom lens system satisfies the following conditional expression $$0.7 < \beta_{4t}/\beta_{4w} < 1.7 \qquad (16)$$

where, $\beta_{4w}$ denotes a lateral magnification of the fourth lens unit, at a wide angle end, and $\beta_{4t}$ denotes a lateral magnification of the fourth lens unit at a telephoto end.

24. The zoom lens system according to claim 2 or claim 4, wherein the zoom lens system satisfies the following conditional expression $$0.4 < (D_{2w} + D_{1t})/f_t < 0.9 \qquad (17)$$

where, $D_{2w}$ denotes an air space on an optical axis, between the second lens unit and the third lens unit, at a wide angle end, $D_{1t}$ denotes an air space on the optical axis, between the first lens unit and the second lens unit, at a telephoto end, and $f_t$ denotes a focal length of the entire zoom lens system, at the telephoto end.

25. The zoom lens system according to claim 2 or claim 4, wherein the zoom lens system satisfies the following conditional expression $$0.1 < D_{2w}/f_t < 0.5 \qquad (18)$$

where, $D_{2w}$ denotes an air space on an optical axis, between the second lens unit and the third lens unit at a wide angle end, and $f_t$ denotes a focal length of the entire zoom lens system, at a telephoto end.

26. The zoom lens system according to claim 2 or claim 4, wherein the zoom lens system satisfies the following conditional expression $$0.2 < D_{1t}/f_t < 0.5 \qquad (19)$$

where $D_{1t}$ denotes an air space on an optical axis, between the second lens unit and the first lens unit at a telephoto end, and $f_t$ denotes a focal length of the entire zoom lens system, at the telephoto end.

27. The zoom lens system according to claim 2 or claim 4, wherein the first lens unit moves to be positioned at an object side, at a telephoto end rather than a wide angle end, and satisfies the following conditional expression $$0.7 < T_L/f_t < 1.5 \qquad (20)$$

where,

T$_L$ denotes a distance on an optical axis, up to an image surface from a vertex of a lens surface nearest to the object side, in the first lens unit, at the telephoto end, and f$_t$ denotes a focal length of the entire zoom lens system, at the telephoto end.

28. The zoom lens system according to claim 2 or claim 4, wherein the first lens unit comprises a cemented doublet, which comprises the negative lens and the positive lens.

29. The zoom lens system according to claim 2 or claim 4, wherein the total number of lenses in the second lens unit is not more than three.

30. The zoom lens system according to claim 29, wherein the second lens unit comprises, in order from an object side thereof, a negative lens, a negative lens, and a positive lens.

31. The zoom lens system according to claim 29, wherein the second lens unit comprises, in order from an object side thereof, a negative lens, a positive lens, and a negative lens.

32. The zoom lens system according to claim 29, wherein the second lens unit comprises a negative lens and a positive lens, and the total number of lenses in the second lens unit is two.

33. The zoom lens system according to claim 2 or claim 4, wherein the total number of lenses in the third lens unit is not more than three.

34. The zoom lens system according claim 33, wherein the third lens unit comprises, in order from an object side thereof, a positive lens, a positive lens, and a negative lens, and the negative lens in the third lens unit is cemented to the adjacent positive lens, and the negative lens and the positive lens form a cemented doublet.

35. The zoom lens system according to claim 2 or claim 4, wherein the first lens unit comprises an aspheric lens surface.

36. The zoom lens system according to claim 2 or claim 4, wherein the second lens unit comprises an aspheric lens surface.

37. The zoom lens system according to claim 2 or claim 4, wherein the third lens unit comprises an aspheric lens surface.

38. The zoom lens system according to claim 37, wherein the third lens unit comprises a positive single lens having both surfaces aspheric, which is disposed nearest to an object side.

39. The zoom lens system according to claim 2, wherein the first lens unit, the second lens unit, the third lens unit, and the fourth lens unit move at the time of zooming, and the zoom lens system further comprising:

an aperture stop which moves integrally with the third lens unit in an optical-axis direction.

40. The zoom lens system according to claim 39, wherein at a time of zooming from a wide angle end to a telephoto end, the first lens unit moves to be positioned at an object side, at a telephoto end rather than a wide angle end, and the second lens unit moves, and the third lens unit moves toward the object side, and the fourth lens unit moves.

41. The zoom lens system according to claim 39, wherein the aperture stop is disposed between the second lens unit and the third lens unit.

42. The zoom lens system according to claim 2 or claim 4, wherein the zoom lens system is a four-unit zoom lens system.

43. An electronic image pickup apparatus comprising:

a zoom lens system according to claim 1, 2, 3 or 4; and an electronic image pickup element, which is disposed at an image side of the zoom lens system, and which converts an image formed by the zoom lens system, to an electric signal.

44. The electronic image pickup apparatus according to claim 43, comprising:

a processing section which electrically corrects a distortion of the zoom lens system, based on the electric signal converted by the electronic image pickup element.

45. A zoom lens system comprising in order from an object side:

a first lens unit having a positive refracting power;

a second lens unit having a negative refracting power; and a third lens unit having a positive refracting power, wherein at a time of zooming from a wide angle end to a telephoto end, each space between the lens units changes, and the first lens unit comprises a negative lens and a positive lens, and the total number of lenses in the first lens unit is two, and the zoom lens system satisfies the following conditional expression $$-0.75 < SF_{1p} < -0.1 \quad (1)$$

where, $SF_{1p}$ is defined as $SF_{1p} = (R_{1pf} + R_{1pr})/(R_{1pf} - R_{1pr})$, when $R_{1pf}$ is a paraxial radius of curvature of a surface on an object side, of the positive lens in the first lens unit, and $R_{1pr}$ is a paraxial radius of curvature of a surface on an image side, of the positive lens in the first lens unit, and wherein the zoom lens system further satisfies the following conditional expression $$1.85 < n_{d1n} < 2.10 \quad (9)$$

where, $n_{d1n}$ denotes a refractive index for a d-line, of the negative lens in the second lens unit.

46. A zoom lens system comprising, in order from an object side:

a first lens unit having a positive refracting power;

a second lens unit having a negative refracting power; and a third lens unit having a positive refracting power, wherein at a time of zooming from a wide angle end to a telephoto end, each space between the lens units changes, and the first lens unit comprises a negative lens and a positive lens, and the number of lenses in the first lens unit is two, and the zoom lens system satisfies the following conditional expression $$38.0 < \nu_{d1p} - \nu_{d1n} \quad (2)$$

where, $\nu_{d1p}$ denotes an Abbe's number for a d-line of the positive lens in the first lens unit, and $\nu_{d1n}$ denotes an Abbe's number for a d-line of the negative lens in the first lens unit, and wherein the zoom lens system further satisfies the following conditional expression $$1.85 < n_{d1n} < 2.10 \quad (9)$$

where, $n_{d1n}$ denotes a refractive index for a d-line, of the negative lens in the first lens unit.

47. A zoom lens system comprising in order from an object side:

a first lens unit having a positive refracting power;

a second lens unit having a negative refracting power; and a third lens unit having a positive refracting power, wherein at a time of zooming from a wide angle end to a telephoto end, each space between the lens units changes, and the first lens unit comprises a negative lens and a positive lens, and the total number of lenses in the first lens unit is two, and the zoom lens system satisfies the following conditional expression $$-0.75 < SF_{1p} < -0.1 \quad (1)$$

where, $SF_{1p}$ is defined as $SF_{1p}=(R_{1pf}+R_{1pr})/(R_{1pf}-R_{1pr})$, when $R_{1pf}$ is a paraxial radius of curvature of a surface on an object side, of the positive lens in the first lens unit, and $R_{1pr}$ is a paraxial radius of curvature of a surface on an image side, of the positive lens in the first lens unit, and wherein the second lens unit comprises a negative lens which satisfies the following conditional expression $$1.76 < n_{d2n} < 2.00 \quad (10)$$

where, $n_{d2n}$ denotes a refractive index for a d-line, of the negative lens in the second lens unit.

48. A zoom lens system comprising, in order from an object side:

a first lens unit having a positive refracting power;

a second lens unit having a negative refracting power; and a third lens unit having a positive refracting power, wherein at a time of zooming from a wide angle end to a telephoto end, each space between the lens units changes, and the first lens unit comprises a negative lens and a positive lens, and the number of lenses in the first lens unit is two, and the zoom lens system satisfies the following conditional expression $$38.0 < v_{d1p} - v_{d1n} \quad (2)$$

where, $v_{d1p}$ denotes an Abbe's number for a d-line of the positive lens in the first lens unit, and $v_{d1n}$ denotes an Abbe's number for a d-line of the negative lens in the first lens unit, and wherein the second lens unit comprises a negative lens which satisfies the following conditional expression $$1.76 < n_{d2n} < 2.00 \quad (10)$$

where, $n_{d2n}$ denotes a refractive index for a d-line, of the negative lens in the second lens unit.

49. A zoom lens system comprising in order from an object side:

a first lens unit having a positive refracting power;

a second lens unit having a negative refracting power; and a third lens unit having a positive refracting power, wherein at a time of zooming from a wide angle end to a telephoto end, each space between the lens units changes, and the first lens unit comprises a negative lens and a positive lens, and the total number of lenses in the first lens unit is two, and the zoom lens system satisfies the following conditional expression $$-0.75 < SF_{1p} < -0.1 \quad (1)$$

where, $SF_{1p}$ is defined as $SF_{1p}=(R_{1pf}+R_{1pr})/(R_{1pf}-R_{1pr})$, when $R_{1pf}$ is a paraxial radius of curvature of a surface on an object side, of the positive lens in the first lens unit, and $R_{1pr}$ is a paraxial radius of curvature of a surface on an image side, of the positive lens in the first lens unit, and wherein the zoom lens system satisfies the following conditional expression $$2.6 < \beta_{2t}/\beta_{2w} < 6.0 \quad (14)$$

where, $\beta_{2w}$ is a lateral magnification at a wide angle end, of the second lens unit, and $\beta_{2t}$ is a lateral magnification at a telephoto end of the second lens unit.

50. A zoom lens system comprising, in order from an object side:

a first lens unit having a positive refracting power;

a second lens unit having a negative refracting power; and a third lens unit having a positive refracting power, wherein at a time of zooming from a wide angle end to a telephoto end, each space between the lens units changes, and the first lens unit comprises a negative lens and a positive lens, and the number of lenses in the first lens unit is two, and the zoom lens system satisfies the following conditional expression $$38.0 < v_{d1p} - v_{d1n} \quad (2)$$

where, $v_{d1p}$ denotes an Abbe's number for a d-line of the positive lens in the first lens unit, and $v_{d1n}$ denotes an Abbe's number for a d-line of the negative lens in the first lens unit, and wherein the zoom lens system satisfies the following conditional expression $$2.6 < \beta_{2t}/\beta_{2w} < 6.0 \quad (14)$$

where, $\beta_{2w}$ is a lateral magnification at a wide angle end, of the second lens unit, and $\beta_{2t}$ is a lateral magnification at a telephoto end of the second lens unit.

51. A zoom lens system comprising in order from an object side:

a first lens unit having a positive refracting power;

a second lens unit having a negative refracting power; and a third lens unit having a positive refracting power, wherein at a time of zooming from a wide angle end to a telephoto end, each space between the lens units changes, and the first lens unit comprises a negative lens and a positive lens, and the total number of lenses in the first lens unit is two, and the zoom lens system satisfies the following conditional expression $$-0.75 < SF_{1p} < -0.1 \quad (1)$$

where, $SF_{1p}$ is defined as $SF_{1p}=(R_{1pf}+R_{1pr})/(R_{1pf}-R_{1pr})$, when $R_{1pf}$ is a paraxial radius of curvature of a surface on an object side, of the positive lens in the first lens unit, and $R_{1pr}$ is a paraxial radius of curvature of a surface on an image side, of the positive lens in the first lens unit, and wherein the zoom lens system satisfies the following conditional expression $$0.4 < (D_{2w}+D_{1t})/f_t < 0.9 \quad (17)$$

where, $D_{2w}$ denotes an air space on an optical axis, between the second lens unit and the third lens unit, at a wide angle end, $D_{1t}$ denotes an air space on the optical axis, between the first lens unit and the second lens unit, at a telephoto end, and $f_t$ denotes a focal length of the entire zoom lens system, at the telephoto end.

52. A zoom lens system comprising, in order from an object side:
a first lens unit having a positive refracting power;
a second lens unit having a negative refracting power; and
a third lens unit having a positive refracting power, wherein
at a time of zooming from a wide angle end to a telephoto end, each space between the lens units changes, and
the first lens unit comprises a negative lens and a positive lens, and the number of lenses in the first lens unit is two, and
the zoom lens system satisfies the following conditional expression $$38.0 < v_{d1p} - v_{d1n} \quad (2)$$

where,
$v_{d1p}$ denotes an Abbe's number for a d-line of the positive lens in the first lens unit, and
$v_{d1n}$ denotes an Abbe's number for a d-line of the negative lens in the first lens unit,
and wherein the zoom lens system satisfies the following conditional expression $$0.4 < (D_{2w} + D_{1t})/f_t < 0.9 \quad (17)$$

where,
$D_{2w}$ denotes an air space on an optical axis, between the second lens unit and the third lens unit, at a wide angle end,
$D_{1t}$ denotes an air space on the optical axis, between the first lens unit and the second lens unit, at a telephoto end, and
$f_t$ denotes a focal length of the entire zoom lens system, at the telephoto end.

53. A zoom lens system comprising in order from an object side:
a first lens unit having a positive refracting power;
a second lens unit having a negative refracting power; and
a third lens unit having a positive refracting power, wherein
at a time of zooming from a wide angle end to a telephoto end, each space between the lens units changes, and
the first lens unit comprises a negative lens and a positive lens, and the total number of lenses in the first lens unit is two, and
the zoom lens system satisfies the following conditional expression $$-0.75 < SF_{1p} < -0.1 \quad (1)$$

where,
$SF_{1p}$ is defined as $SF_{1p} = (R_{1pf} + R_{1pr})/(R_{1pf} - R_{1pr})$, when
$R_{1pf}$ is a paraxial radius of curvature of a surface on an object side, of the positive lens in the first lens unit, and
$R_{1pr}$ is a paraxial radius of curvature of a surface on an image side, of the positive lens in the first lens unit,
and wherein the zoom lens system satisfies the following conditional expression $$0.2 < D_{1t}/f_t < 0.5 \quad (19)$$

where
$D_{1t}$ denotes an air space on an optical axis, between the second lens unit and the first lens unit at a telephoto end, and
$f_t$ denotes a focal length of the entire zoom lens system, at the telephoto end.

54. A zoom lens system comprising, in order from an object side:
a first lens unit having a positive refracting power;
a second lens unit having a negative refracting power; and
a third lens unit having a positive refracting power, wherein
at a time of zooming from a wide angle end to a telephoto end, each space between the lens units changes, and
the first lens unit comprises a negative lens and a positive lens, and the number of lenses in the first lens unit is two, and
the zoom lens system satisfies the following conditional expression $$38.0 < v_{d1p} - v_{d1n} \quad (2)$$

where,
$v_{d1p}$ denotes an Abbe's number for a d-line of the positive lens in the first lens unit, and
$v_{d1n}$ denotes an Abbe's number for a d-line of the negative lens in the first lens unit,
and wherein the zoom lens system satisfies the following conditional expression $$0.2 < D_{1t}/f_t < 0.5 \quad (19)$$

where
$D_{1t}$ denotes an air space on an optical axis, between the second lens unit and the first lens unit at a telephoto end, and
$f_t$ denotes a focal length of the entire zoom lens system, at the telephoto end.

55. A zoom lens system comprising in order from an object side:
a first lens unit having a positive refracting power;
a second lens unit having a negative refracting power; and
a third lens unit having a positive refracting power, wherein
at a time of zooming from a wide angle end to a telephoto end, each space between the lens units changes, and
the first lens unit comprises a negative lens and a positive lens, and the total number of lenses in the first lens unit is two, and
the zoom lens system satisfies the following conditional expression $$-0.75 < SF_{1p} < -0.1 \quad (1)$$

where,
$SF_{1p}$ is defined as $SF_{1p} = (R_{1pf} + R_{1pr})/(R_{1pf} - R_{1pr})$, when
$R_{1pf}$ is a paraxial radius of curvature of a surface on an object side, of the positive lens in the first lens unit, and
$R_{1pr}$ is a paraxial radius of curvature of a surface on an image side, of the positive lens in the first lens unit,
and wherein the first lens unit comprises a cemented doublet, which comprises the negative lens and the positive lens.

56. A zoom lens system comprising, in order from an object side:
a first lens unit having a positive refracting power;
a second lens unit having a negative refracting power; and
a third lens unit having a positive refracting power, wherein
at a time of zooming from a wide angle end to a telephoto end, each space between the lens units changes, and
the first lens unit comprises a negative lens and a positive lens, and the number of lenses in the first lens unit is two, and
the zoom lens system satisfies the following conditional expression $$38.0 < v_{d1p} - v_{d1n} \quad (2)$$

where,
$v_{d1p}$ denotes an Abbe's number for a d-line of the positive lens in the first lens unit, and
$v_{d1n}$ denotes an Abbe's number for a d-line of the negative lens in the first lens unit, and wherein the first lens unit comprises a cemented doublet, which comprises the negative lens and the positive lens.

57. A zoom lens system comprising in order from an object side:

a first lens unit having a positive refracting power;
a second lens unit having a negative refracting power; and
a third lens unit having a positive refracting power, wherein
at a time of zooming from a wide angle end to a telephoto end, each space between the lens units changes, and
the first lens unit comprises a negative lens and a positive lens, and the total number of lenses in the first lens unit is two, and
the zoom lens system satisfies the following conditional expression $$-0.75 < SF_{1p} < -0.1 \quad (1)$$

where, $SF_{1p}$ is defined as $SF_{1p} = (R_{1pf} + R_{1pr})/(R_{1pf} - R_{1pr})$, when
$R_{1pf}$ is a paraxial radius of curvature of a surface on an object side, of the positive lens in the first lens unit, and
$R_{1pr}$ is a paraxial radius of curvature of a surface on an image side, of the positive lens in the first lens unit,
and wherein the second lens unit comprises a negative lens and a positive lens, and the total number of lenses in the second lens unit is two.

58. A zoom lens system comprising, in order from an object side:

a first lens unit having a positive refracting power;
a second lens unit having a negative refracting power; and
a third lens unit having a positive refracting power, wherein
at a time of zooming from a wide angle end to a telephoto end, each space between the lens units changes, and
the first lens unit comprises a negative lens and a positive lens, and the number of lenses in the first lens unit is two, and
the zoom lens system satisfies the following conditional expression $$38.0 < \nu_{d1p} - \nu_{d1n} \quad (2)$$

where, $\nu_{d1p}$ denotes an Abbe's number for a d-line of the positive lens in the first lens unit, and
$\nu_{d1n}$ denotes an Abbe's number for a d-line of the negative lens in the first lens unit,
and wherein the second lens unit comprises a negative lens and a positive lens, and the total number of lenses in the second lens unit is two.

59. A zoom lens system comprising in order from an object side:

a first lens unit having a positive refracting power;
a second lens unit having a negative refracting power; and
a third lens unit having a positive refracting power, wherein
at a time of zooming from a wide angle end to a telephoto end, each space between the lens units changes, and
the first lens unit comprises a negative lens and a positive lens, and the total number of lenses in the first lens unit is two, and
the zoom lens system satisfies the following conditional expression $$-0.75 < SF_{1p} < -0.1 \quad (1)$$

where, $SF_{1p}$ is defined as $SF_{1p} = (R_{1pf} + R_{1pr})/(R_{1pf} - R_{1pr})$, when
$R_{1pf}$ is a paraxial radius of curvature of a surface on an object side, of the positive lens in the first lens unit, and
$R_{1pr}$ is a paraxial radius of curvature of a surface on an image side, of the positive lens in the first lens unit,
and wherein the total number of lenses in the third lens unit is not more than three.

60. A zoom lens system comprising, in order from an object side:

a first lens unit having a positive refracting power;
a second lens unit having a negative refracting power; and
a third lens unit having a positive refracting power, wherein
at a time of zooming from a wide angle end to a telephoto end, each space between the lens units changes, and
the first lens unit comprises a negative lens and a positive lens, and the number of lenses in the first lens unit is two, and
the zoom lens system satisfies the following conditional expression $$38.0 < \nu_{d1p} - \nu_{d1n} \quad (2)$$

where, $\nu_{d1p}$ denotes an Abbe's number for a d-line of the positive lens in the first lens unit, and
$\nu_{d1n}$ denotes an Abbe's number for a d-line of the negative lens in the first lens unit,
and wherein the total number of lenses in the third lens unit is not more than three.

* * * * *